US009469804B2

(12) United States Patent
Hernandez Altamirano et al.

(10) Patent No.: US 9,469,804 B2
(45) Date of Patent: Oct. 18, 2016

(54) FOAMING COMPOSITION WITH WETTABILITY MODIFYING AND CORROSION INHIBITORY PROPERTIES FOR HIGH TEMPERATURE AND ULTRA-HIGH SALINITY

(71) Applicant: INSTITUTO MEXICANO DEL PETROLEO, Mexico City (MX)

(72) Inventors: Raul Hernandez Altamirano, Mexico City (MX); Luis Silvestre Zamudio Rivera, Mexico City (MX); Violeta Yasmin Mena Cervantes, Mexico City (MX); Erick Emanuel Luna Rojero, Mexico City (MX); Enrique Serrano Saldana, Mexico City (MX); Jose Manuel Martinez Magadan, Mexico City (MX); Raul Oviedo Roa, Mexico City (MX); David Aaron Nieto Alvarez, Mexico City (MX); Eduardo Buenrostro Gonzalez, Mexico City (MX); Rodolfo Cisneros Devora, Mexico City (MX); Maria del Pilar Arzola Garcia, Mexico City (MX); Mirna Pons Jimenez, Mexico City (MX); America Elizabeth Mendoza Aguilar, Mexico City (MX); Sung Jae Ko Kim, Mexico City (MX); Jorge Francisco Ramirez Perez, Mexico City (MX); Tomas Eduardo Chavez Miyauchi, Mexico City (MX); Yosadara Ruiz Morales, Mexico City (MX)

(73) Assignee: INSTITUTO MEXICO DEL PETROLEO, Mexico City (MX)

( * ) Notice: Subject to any disclaimer, the term of this patent is extended or adjusted under 35 U.S.C. 154(b) by 15 days.

(21) Appl. No.: 14/089,280

(22) Filed: Nov. 25, 2013

(65) Prior Publication Data
US 2014/0151041 A1 Jun. 5, 2014

(30) Foreign Application Priority Data
Dec. 5, 2012 (MX) .................... MX/a/2012/014187

(51) Int. Cl.
| E21B 43/16 | (2006.01) |
| E21B 43/22 | (2006.01) |
| E21B 41/02 | (2006.01) |
| C09K 8/584 | (2006.01) |
| C09K 8/54 | (2006.01) |
| C09K 8/594 | (2006.01) |

(52) U.S. Cl.
CPC ............. *C09K 8/584* (2013.01); *C09K 8/594* (2013.01); *E21B 43/16* (2013.01)

(58) Field of Classification Search
CPC .......... C09K 8/68; C09K 8/035; C09K 8/38; C09K 8/467; C09K 8/584; C09K 8/602; C09K 2208/30; C09K 8/594; C09K 15/28; E21B 43/16; C11D 3/43; C11D 3/30
See application file for complete search history.

(56) References Cited

U.S. PATENT DOCUMENTS

| 3,939,911 A | 2/1976 | Maddox et al. |
| 4,039,336 A | 8/1977 | Sullivan et al. |
| 4,270,607 A | 6/1981 | Cardenas et al. |
| 4,607,695 A | 8/1986 | Weber |
| 4,703,797 A | 11/1987 | Djabbarah |
| 4,836,283 A | 6/1989 | Loza et al. |
| 4,900,458 A | 2/1990 | Schroeder et al. |
| 5,049,311 A | 9/1991 | Rasheed et al. |
| 5,084,210 A | 1/1992 | Teeters |
| 5,273,682 A | 12/1993 | Danzik |
| 5,275,744 A | 1/1994 | Ho |
| 5,295,540 A | 3/1994 | Djabbarah et al. |
| 5,542,474 A | 8/1996 | Djabbarah et al. |
| 5,785,895 A | 7/1998 | Martin et al. |
| 5,911,981 A | 6/1999 | Dahms et al. |
| 6,303,079 B1 | 10/2001 | Meyer |
| 6,475,431 B1 | 11/2002 | Naraghi et al. |
| 6,521,028 B1 | 2/2003 | Frenier |
| 6,828,281 B1 | 12/2004 | Hou et al. |
| 7,104,327 B2 | 9/2006 | Harris et al. |
| 7,134,497 B1 | 11/2006 | Chatterji et al. |
| 7,287,594 B1 | 10/2007 | Chatterji et al. |
| 7,373,977 B1 | 5/2008 | Berger et al. |
| 7,407,916 B2 | 8/2008 | Chatterji et al. |
| 7,629,299 B2 | 12/2009 | Berger et al. |
| 8,105,987 B2 | 1/2012 | Acosta et al. |
| 8,287,640 B2* | 10/2012 | Zamora ................ C04B 28/02 106/672 |
| 2006/0013798 A1 | 1/2006 | Henry et al. |
| 2009/0111716 A1* | 4/2009 | Hough .................. C09K 8/584 507/214 |
| 2009/0111717 A1 | 4/2009 | Campbell et al. |
| 2011/0071057 A1 | 3/2011 | Weerasooriya et al. |
| 2011/0138683 A1 | 6/2011 | Hernandez Altamirano et al. |

* cited by examiner

*Primary Examiner* — Zakiya W Bates
(74) *Attorney, Agent, or Firm* — Dickinson Wright PLLC

(57) ABSTRACT

A foaming composition with wettability-modifying and corrosion inhibitory properties is used to control the channeling of fluids in naturally fractured carbonate reservoirs, favorably alter the rock wettability in crude oil enhanced recovery processes and control uniform corrosion problems occurring in production rigs under high temperature and ultra-high salinity conditions by the synergistic effect resulting from the supramolecular interaction of alkyl amido propyl hydroxysultaines or alkyl hydroxysultaines with sodium alkyl hydroxysulfonates and sodium alkenyl sulfonates having the formula (1). The foaming compositions with wettability-modifying and corrosion inhibitory properties are tolerant to high concentrations of divalent ions such as calcium, magnesium, strontium and barium and are suitable for use in the reservoir, seawater and/or congenital water characteristic of the reservoir for transporting the crude oil from the reservoir.

36 Claims, 30 Drawing Sheets

| Concentration (ppm) | Time (h:min:sec) | Angle | Image |
|---|---|---|---|
| Blank | 1:00:00 | Θ = 0° | |
| 100 | 00:07:00 | Θ = 43° | |
| 250 | 00:07:00 | Θ = 37° | |
| 500 | 00:30:00 | Θ = 40° | |
| 1000 | 00:31:20 | Θ = 28° | |
| 2000 | 00:20:00 | Θ = 32° | |

Figure 20

| Concentration (ppm) | Time (h:min:sec) | Angle | Image |
|---|---|---|---|
| Blank | 24:00:00 | Θ = 0° |  |
| 100 | 00:10:30 | Θ = 51° |  |
| 250 | 00:11:06 | Θ = 55° |  |
| 500 | 00:34:00 | Θ = 56° |  |
| 1000 | 00:38:42 | Θ = 55° |  |
| 2000 | 00:27:30 | Θ = 58° |  |

FOAMING COMPOSITION WITH WETTABILITY MODIFYING AND CORROSION INHIBITORY PROPERTIES FOR HIGH TEMPERATURE AND ULTRA-HIGH SALINITY

CROSS-REFERENCE TO RELATED APPLICATION

This application claims the benefit and priority to Mexican application No. MX/a/2012/014187 with a filing date of Dec. 5, 2012, the disclosure of which is incorporated herein by reference in its entirety.

FIELD OF THE INVENTION

The present invention is directed to obtaining and using foaming compositions with wettability-modifying and corrosion inhibitory properties to control the channeling of fluids in naturally fractured carbonate reservoirs for the recovery of crude oil and other hydrocarbons. The foaming compositions alter the rock wettability in crude oil enhanced recovery processes and control uniform corrosion problems occurring in production rigs under high temperature and ultra-high salinity conditions. The foaming composition provides a synergistic effect resulting from the supramolecular interaction of alkyl amido propyl hydroxysultaines or alkyl hydroxysultaines with sodium alkyl hydroxysulfonates and sodium alkenyl sulfonates of Formula (1). The foaming compositions with wettability-modifying and corrosion inhibitory properties are tolerant to high concentrations of divalent ions such as calcium, magnesium, strontium and barium and for the fact that for its application in the reservoir, sea water and/or congenital water characteristic of the reservoir may be used as means of transportation.

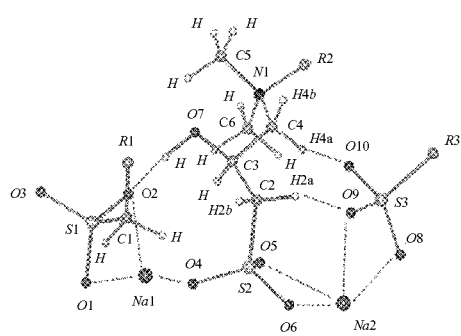

(1)

BACKGROUND OF THE INVENTION

One of the major technological challenges currently throughout the world in naturally fractured carbonate reservoirs (NFCR) with high-temperature and an ultra-high salinity condition is to increase the hydrocarbon recovery factor using chemical products. NFCRs are characterized for possessing low porosity, for having preferential flow areas, due to the existence of fractures and dissolution cavities and for exhibiting wettability to oil or intermediate ones. Therefore, chemical products used therein in order to increase the recovery factor must be able to control the channeling of fluids and to alter the rock wettability from oil-wettable to water-wettable. Moreover, if the NFCRs have conditions of high temperature and salinity, chemical products to be used in enhanced recovery processes are required to be tolerant to high salinities and divalent ions concentrations and to control corrosion problems occurring in the production rigs The traditional way to control the channeling of fluids in NFCRs has been by means of the use of foaming agents and/or gels [SPE 145718, 2011, Development of a new foam EOR model from laboratory and field data of the naturally fractured Cantarell Field; SPE 130655, 2010, High-temperature conformance field application through coiled tubing a successful case history; SPE 129840, 2010, Application of gas for mobility control in chemical EOR in problematic carbonate reservoirs] and the performance thereof is a function of the reservoir's temperature, salinity and concentration of divalent ions present in the injection water and/or formation water, and of the type of crude oil present in the reservoir. Furthermore, the benefits of using foaming agents with wettability-modifying properties that control gas channeling problems and increase the recovery factor in NFCRs has been recently demonstrated in Mexico [AIPM, 13-33, 2012, Control de movilidad del gas en el casquete en pozos del cameo Akal perteneciente al Complejo Cantarell; SPE 145718, 2011, Development of a new foam EOR model from laboratory and field data of the naturally fractured Cantarell Field;] and the development of foaming agents with enhanced stabilities with wettability-modifying properties and the ability to control corrosion problems occurring in production rigs has been established as a challenge.

The main chemical families of surfactants that have been used to generate foams and that have application in enhanced recovery processes include: 1) Alkyl aryl sulfonates (U.S. Pat. No. 5,273,682; Viscosity control additives for foaming mixtures), 2) Alkoxy alkyl benzenesulfonates (U.S. Pat. No. 5,049,311; Alkoxylated alkyl substituted phenol sulfonates compounds and compositions, the preparation thereof and their use in various applications), 3) Alpha olefin sulfonates (U.S. Pat. No. 4,607,695; High sweep efficiency steam drive oil recovery method), 4) Alkyl amido Betaines (U.S. Pat. No. 7,104,327; Methods of fracturing high temperature subterranean zones and foamed fracturing fluids therefor), 5) Alkyl amido hydroxysultaines (U.S. Pat. No. 7,407,916; Foamed treatment fluids and associated methods) and 6) Alkyl ether sulfates (Report DE-FC26-03NT15406 by the Department of Energy of the United States of America Surfactant-Based Enhanced Oil Recovery Processes and Foam Mobility Control). However, when the conditions of temperature in the reservoirs are elevated (higher than 70° C.), salinity is higher than 30,000 ppm of total solids and the concentration of divalent ions such as calcium and magnesium is higher than 2,000 ppm, the stability of the foam generated by this class of surfactants chemical families decreases drastically.

In order to increase the stability of foams and hence their tolerances to high concentrations of divalent ions and/or temperature, foaming agents' formulations with enhanced properties have been developed, including as the following:

U.S. Pat. No. 3,939,911 (Surfactant oil recovery process usable in high temperature formations containing water having high concentrations of polyvalent ions) describes a three-surfactant system applied to enhanced recovery processes in reservoirs with high temperature and formation water containing from 200 to 14,000 ppm of polyvalent ions dissolved, such as calcium or magnesium. The three-surfactant system is composed by: 1) A water-soluble salt of an alkyl or alkyl aryl sulfonate, wherein the alkyl chain can have from 5 to 25 carbon atoms, 2) A phosphate ester surfactant with an average molecular weight not exceeding 1,000 AMU and 3) A sulfobetaine-based surfactant having the structural formula (2) and wherein R is an alkyl group of 12 to 24 carbon atoms. The combination is stable up to a temperature of 107° C. and resistant to bacterial attacks and inhibits the formation of scale.

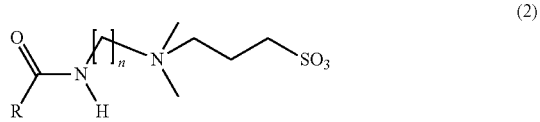

(2)

U.S. Pat. No. 4,703,797 (Sweep improvement in enhanced oil recovery) mentions a new enhanced method for sweeping during enhanced hydrocarbon recovery processes. The method comprises the generation of foam by means of dispersion of the displacement fluid in an aqueous solution containing a formulation of surfactants. Said surfactant formulation comprises a lignosulfate-based foaming agent and a foaming surfactant. The foaming surfactants that are mentioned include the group comprising anionic, non-ionic and amphoteric surfactants.

U.S. Pat. No. 5,295,540 (Foam mixture for steam and carbon dioxide drive oil recovery method) mentions a method based on foams to enhance hydrocarbon production in subterranean formations consisting of: 1) Injecting steam and produced fluids into the formation and 2) Injecting a mixture of steam, a non-condensable gas and an aqueous mixture of surfactant and polysaccharides. The surfactants mentioned that may be used include linear toluene sulfonates, alkyl aryl sulfonates, dialkyl aryl sulfonates, alpha olefin sulfonates and alpha olefin sulfonate dimers.

U.S. Pat. No. 5,542,474 (Foam mixture for carbon dioxide drive oil recovery method) refers to a foam-based method to enhance performance during the supply of steam or carbon dioxide in subterranean formations containing crude oil and that comprise at least a producing well and an injection well. The sweeping efficiency in the oil-recovery process by means of steam supply is enhanced by: 1) injecting steam until it starts to appear in the producing well and 2) Subsequently adding a mixture of steam, non-condensable gas and an aqueous solution of a surfactant-polypeptide. The aqueous surfactant-polypeptide solution forms stable foam with the formation oil at reservoir conditions. Surfactants used as base for the foaming agent include sodium and ammonium salts of sulfated alcohol ethoxylates, linear alcohol ethoxylates and linear toluene sulfonates.

enhanced when formulated with partially hydrolyzed polyacrylamide-based polymers or xanthan gum-type biopolymers. Furthermore, the article mentions that the stability of foams generated by twelve-carbon alpha olefin sulfonates is substantially increased when formulated with amine oxide-type surfactants.

U.S. Pat. No. 5,911,981 (Surfactant blends for generating stable wet foam) mentions a mixture of surfactants that generates stable spherical foams. The mixture of surfactants contains a non-ionic surfactant or an amphoteric surfactant as the primary foaming agent, and sufficient amounts of an acyl lactylate to increase the volume of the foam and to provide an excess of spherically-shaped foam for time periods of approximately forty minutes. The amphoteric surfactants that are mentioned include betaines, sultaines and aminosultaines and the use of cocodimethylpropylsultaine, stearyldimethylpropylsultaine, lauryl-bis (2 hydroxyethyl)propylsultaine and cocoamidopropyl hydroxysultaine is specifically mentioned.

U.S. Pat. No. 7,104,327 provides methods to fracture high-temperature subterranean zones and foamed aqueous and viscous fracturing fluids for this purpose. The fracturing fluid of said invention comprises water, a 2-acrylamide-2-methylpropane sulfonic acid terpolymer, acrylamide and acrylic acid or salts thereof, a gas, a foaming agent and a viscosity breaker to control and reduce the viscosity of the fracturing fluid. The foaming agent in said invention is selected from the group comprising $C_8$-$C_{22}$ alkyl amido betaine, alpha olefin sulfonate, taloil trimethyl ammonium chloride, $C_8$-$C_{22}$ alkyl ethoxylate sulfate and trimethyl coco ammonium chloride and special mention is made of cocoamidopropyl betaine as foaming agent.

The synergystic effect of alkyl amido propyl betaines with alkyl ether sodium sulfate and alkyl sodium sulfate-type anionic surfactants has been studied in literature (*Langmuir* 2000, 16, 1000-1013, *Langmuir* 2004, 20, 565-571, *Langmuir* 2004, 20, 5445-5453) and it primarily suggests the ability of alkyl amido propyl betaines to stabilize and to improve the rheological properties (viscosity) of foams generated by the anionic surfactants and that have application in shampoos and hair conditioners. Furthermore, the article "Synergistic sphere-to-rod micelle transition in mixed solutions of sodium dodecyl sulfate and cocoamidopropyl betaine" (*Langmuir* 2004, 20, 565-571) indicates that the synergistic effect between cocoamidopropyl betaine and dodecyl sodium sulfate is due to an electrostatic attraction between both surfactants' heads (3).

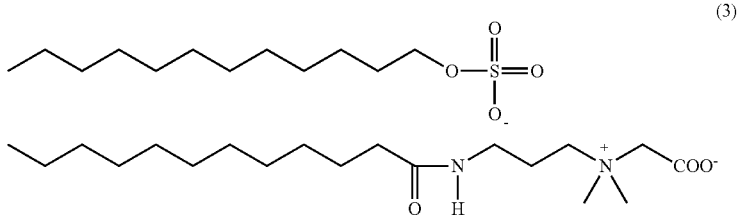

(3)

The article "Improving the foam performance for mobility control and improved sweep efficiency in gas flooding" (*Ind. Eng. Chem. Res.* 2004, 43, 4413-4421) mentions that the apparent stability and viscosity of a foam generated by alpha olefin sulfonates in brine having concentrations of 30,000 and 120,000 ppm of total solids dissolved is substantially U.S. Pat. No. 7,134,497 (Foamed treatment fluids and associated methods) mentions fluids for foamed treatments comprising water, a gas and a foam and mixtures of foam stabilizing surfactants comprising an alkali salt of an alkyl ether sulfate, wherein the alkali salt of the alkyl ether sulfate comprises an alkali salt of a $C_{6-10}$ alkyl ether sulfate and an alkali salt of a $C_4$ alkyl ether sulfate, an alkyl amidopropyl amphoteric surfactant selected from the group consisting of an alkyl amidopropyl hydroxysultaine, an alkyl amidopropyl betaine and a combination thereof, and an alkyl amidopropyl dimethylamine oxide. The patent comprises methods to generate fluids for foamed treatments and to introduce them in subterranean formations. Furthermore, U.S. Pat. No. 7,134,497 never mentions the use of sodium alkyl hydroxysulfonates and/or sodium alpha olefin sulfonates, or that the fluids for the foamed treatments have wettability modifying or corrosion inhibitory properties.

U.S. Pat. No. 7,287,594 (Foamed Treatment Fluids and Associated Methods) refers to treatment methods for subterranean formations using foamed fluids comprising water, a gas and a foam, and mixtures of foam stabilizing surfactants comprising a range of alkali salts of alkyl ether sulfates, wherein the alkyl group in each of the alkyl ether sulfates is in the range of 4 carbon atoms to 10 carbon atoms, an alkyl amido propyl hydroxysultaine or an alkyl amido propyl betaine and an alkyl amido propyl dimethylamine oxide. The patent does not mention the use of sodium alkyl hydroxy sulfonates and/or sodium alpha olefin sulfonates or that the foamed fluids have wettability-modifying or corrosion inhibitory properties.

U.S. Pat. No. 7,373,977 (Process for Oil Recovery Employing Surfactant Gels) protects a hydrocarbon recovery composition and process, which comprise injecting an aqueous solution into a hydrocarbon-containing formation through one or more injection wells, displacing the solution within the formation and recovering the hydrocarbon through one or more producing wells. The aqueous solution contains one or more amphoteric surfactants of the alkyl amido betaines-type (4) that form a viscoelastic surfactant gel that can reduce interfacial tension and increase injection fluid viscosity simultaneously in certain oils and brines. Viscoelastic gels are tolerant to multivalent electrolytes and cations and are particularly useful within reservoirs with middle to high temperature, high salinities, high concentrations of divalent ions and low porosity. The application mentions that the hydrocarbon-recovery compound contains one or more amphoteric surfactants selected for their ability to lower interfacial tension and to increase viscosity simultaneously, an aqueous medium, a secondary surfactant and, optionally, one or more polymers to provide residual viscosity. The patent application indicates that the secondary surfactant can be selected from the anionic, cationic or non-ionic group and that the polymer that provides residual viscosity is selected from the group of polyacrylamide, partially hydrolyzed polyacrylamide, xanthan gum, hydroxyethyl cellulose or guar gum. Additionally, the patent application mentions that the combination of alkyl amido betaines with secondary surfactants of the linear type sodium dodecyl benzene sulfonate and sodium arylalkyl xylene sulfonate reduces interfacial tension and increases the viscosity of the system.

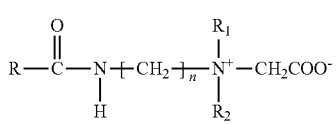

(4)

U.S. Pat. No. 7,407,916 (Foamed treatment fluids and associated methods) mentions fluids for foamed treatments containing water, a gas and a foam and mixtures of foam stabilizing surfactants comprising an alkali salt of an alkyl ether sulfate, wherein the alkali salt of the alkyl ether sulfate comprises an alkali salt of a $C_{6-10}$ alkyl ether sulfate and an alkali salt of a $C_4$ alkyl ether sulfate, an alkyl amido propyl amphoteric surfactant selected from the group comprising an alkyl amido propyl hydroxysultaine, an alkyl amido propyl betaine and a combination thereof, and an alkyl amido propyl dimethylamine oxide. The patent includes methods to generate fluids for foaming treatments and to introduce them in subterranean formations. Additionally, U.S. Pat. No. 7,407,916 never mentions the use of sodium alkyl hydroxysulfonates and/or sodium alpha olefin sulfonates, or that the fluids for foamed treatments have wettability modifying or corrosion inhibitory properties.

Mexican patent MX 297297 relates to an enhanced-stability foaming composition that controls gas channeling in naturally fractured carbonate reservoirs with high salinity and temperature conditions, by means of the synergistic effect resulting from the supramolecular interaction of sodium alpha olefin sulfonates with alkyl amido propyl betaines (5),

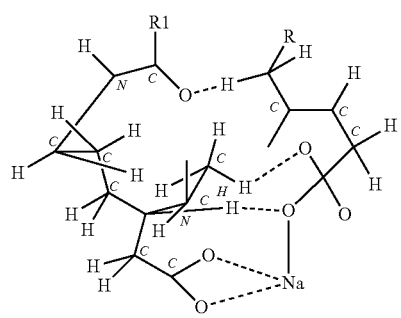

(5)

wherein R and R1 are independent linear or branched alkyl chains with a length ranging from 1 to 30 carbon atoms. The patent application mentions that the supramolecular complexes resulting from the interaction of sodium alpha olefin sulfonates with alkyl amido propyl betaines can be combined with anionic surfactants, preferably of the sodium 3-hydroxy-alkyl sulfonate-type, with cationic surfactants such as alkyl ammonium quaternary salts, preferably of the alkyl trimethyl ammonium chloride- or bromide-type, with divalent ions sequestrants, preferably itaconic acid-derived oligomers or copolymers and whose average molecular weight is within the range of 200 to 20,000 Daltons, with gels derived from copolymers selected from the group comprising polyacrylamides, partially hydrolyzed polyacrylamide, xanthan gum, Poly(itaconic acid), Poly(acrylic acid), Poly(itaconic acid-co-acrylic acid) poly(itaconates) and Poly(acrylates). Additionally, the patent application indicates that the enhanced-stability foaming compositions have applications in enhanced recovery and/or production assurance processes. The patent application does not mention using alkyl amido propyl hydroxysultaine or alkyl hydroxysultaine-based compositions or that these have applications as wettability modifiers and corrosion inhibitors.

Regarding the use as wettability modifiers with applications in enhanced recovery processes, specialized literature mentions that the main surfactant families that have been used are: 1) Tetra-alkyl ammonium quaternary salts (*Energy & Fuel* 2011, 25, 2083-2088; Combined Surfactant-Enhanced Gravity Drainage (SEGD) of Oil and the Wettability Alteration in Carbonates: The Effect of Rock Permeability and Interfacial Tension (IFT)), 2) Ethoxylated alcohols (*Energy & Fuel* 2002, 16, 1557-1564; An Evaluation of Spontaneous Imbibition of Water into Oil-Wet Carbonate Reservoir Cores Using a Nonionic and a Cationic Surfactant), 3) Alkyl ether sulfates alkaline salts (US Patent Publication 2011/0071057; Method of Manufacture and Use of Large Hydrophobe Ether Sulfate Surfactants in Enhanced Oil Recovery (EOR) Applications; Langmuir 2008, 24, 14099-14107; Mechanistic Study of Wettability Alteration Using Surfactants with Applications in Naturally Fractured Reservoirs), 4) Sodium alkyl aryl sulfonates (U.S. Pat. No. 4,836,283, Divalent Ion Tolerant Aromatic Sulfonates), 5) Internal sodium olefin sulfonates (SPE 115386, Recent Advances in Surfactant EOR), 6) Betaines (*Energy & Fuel* 2011, 25, 2551-2558; Wettability Alteration of Clay in Solid-Stabilized Emulsions).

Additionally, in order to increase the performance of wettability modifiers, formulations with enhanced properties have been developed, such as the following:

U.S. Pat. No. 4,270,607 (Emulsion Oil Recovery Process Usable in High Temperature, High Salinity Formations) mentions the fact that many formations contain water with high levels of salinity and/or concentrations of divalent ions such as calcium or magnesium, and additionally, they have temperatures ranging from 21° C. to 149° C. In addition, it indicates that most surfactants and polymers that are adequate for the generation of fluids or emulsions used in enhanced recovery operations do not perform adequately at high levels of salinity or hardness of the water, or do not tolerate the high temperatures found in many formations. Furthermore, it mentions that a viscous emulsion containing a water-soluble and/or dispersible alkyl aryl polyalkoxyalkylene sulfonate and a phase stabilizing additive such as water-soluble and/or dispersible petroleum sulfonate is an effective fluid to be injected in oil formations containing brines whose salinity is within the range of 70,000 to 220,000 ppm of total solids dissolved and where temperatures are as high as 149° C. The emulsion is a stable phase over a wide range of temperatures, formations and salinity and hardness values that can be found in water.

U.S. Pat. No. 6,828,281 (Surfactant Blends for Aqueous Solutions Useful for Improving Oil Recovery) mentions an aqueous fluid useful for liquid hydrocarbon recovery in subterranean reservoirs and where the aqueous fluid comprises an aqueous medium and a mixture of surfactants. The mixture of surfactants contains at least a polyisobutylene-based synthetic surfactant and a secondary surfactant selected from the group comprising sulfonated surfactants, alcohols and ionic surfactants. The surfactant mixture lowers interfacial tension between the hydrocarbon and the aqueous fluid.

US Patent Publication 2009/0111717 (Enhanced Oil Recovery Surfactant Formulation and Method of Making the Same) mentions enhanced hydrocarbon recovery formulations comprising: a) An alkyl aryl sulfonate, b) An isomerized olefin sulfonate, c) A solvent, d) A passivator and e) A polymer.

On the other hand, and due to the impact of the wettability phenomenon on enhanced recovery processes, different institutions and companies have worked at international level in the development of new chemical structures with enhanced properties, and as examples we can quote U.S. Pat. No. 7,629,299 (Process for Recovering Residual Oil Employing Alcohol Ether Sulfonates) and patent application MX/a/2010/012348 (Composición Base Liquidos Zwitteriónicos Geminales como Modificadores de la Mojabilidad en Procesos de Recuperación Mejorada del Petróleo).

With regard to the use as corrosion inhibitors with application in hydrocarbon exploitation and transportation processes, specialized literature mentions that the main chemical products families that have been used are: 1) 1-heteroalkyl-2-Alkyl Imidazolines (Patent MX 254565, Composición Inhibitoria de la Corrosion para Metales Ferrosos en Medios Ácidos; Patent MX 260049, ComposiciOn Inhibitoria de la Corrosión y el Ampollamiento por Hidrógeno para Metales Ferrosos en Medios Básicos), 2) Alkyl Amido Amines (Revista de la Sociedad Química de México 2002, 46, 4, 335-340, Control de la Corrosión de Acero al Carbón en Ambientes de Ácido Sulfhídrico por 1-(2-Hydroxietil)-2-Alquil-imidazolinas y sus correspondientes Precursores Amídicos; Applied Surface Science 2006, 252, 6, 2139-2152, Surface Analysis of Inhibitor Films Formed by Imidazolines and Amides on Mild Steel in an Acidic Environment), 3) Polyalkylene polyamines (U.S. Pat. No. 4,900,458, Polyalkylenepolyamines as Corrosion Inhibitors; U.S. Pat. No. 4,275,744, Derivatives of Polyalkylenepolyamines as Corrosion Inhibitors), 4) Acetylenic alcohols (U.S. Pat. No. 5,084,210, Corrosion inhibitors), 5) Diacetylenic alcohols (U.S. Pat. No. 4,039,336, Diacetylenic Alcohol Corrosion inhibitors), 6) Quaternary Ammonium Salts (U.S. Pat. No. 6,521,028, Low Hazard Corrosion Inhibitors and Cleaning Solutions Using Quaternary Ammonium Salts), 7) Bis-imidazolines (Patent MX 246603, Inhibidores de la Corrosión Multifuncionales, Biodegradables y de Baja Toxicidad) and 8) Bis-Quaternary Ammonium Salts (US Patent Publication 2006/0013798, Bis-Quaternary Ammonium Salt Corrosion Inhibitors).

In addition to this, and due to the impact that 1-heteroalkyl-2-Alkyl Imidazolines have had in the oil industry, several companies have managed to increase their water solubility by: 1) Performing their quaternization, thus generating quaternary salts (U.S. Pat. No. 6,475,431, Corrosion Inhibitors with Low Environmental Toxicity), 2) Introducing ethoxy groups in their structure (U.S. Pat. No. 5,785,895, Biodegradable Corrosion Inhibitors of Low Toxicity) and 3) Generating zwitterion ions through quaternization processes (U.S. Pat. No. 6,303,079, Corrosion Inhibitor Compositions).

Additionally, and due to the impact that the corrosion phenomenon has in the oil industry when there is high salinity and divalent ions concentrations, different institutions and companies have worked at international level in the development of new chemical structures with enhanced properties and as examples we can quote U.S. Pat. No. 8,105,987 (Corrosion Inhibitors for an Aqueous Medium) and US Patent Publication 2011/0138683 (Gemini Surfactants, Process of Manufacture and Use as Multifunctional Corrosion Inhibitors).

On the other hand, supramolecular chemistry is the part of chemistry that takes care of the study of systems that involve molecules or ions aggregates that are bound through non-covalent interactions, such as electrostatic interactions, hydrogen bonds, P—P interactions, dispersion interactions and hydrophobic effects. Supramolecular chemistry can be divided in two large areas: 1) Host-Guest Chemistry and 2) Self-assembly. The difference between these two large areas is a matter of size and form; where there is no significant difference in size and none of the species acts as host to the other, the non-covalent bonding between two or more species is termed self-assembly.

From the energetic point of view, supramolecular interactions are much weaker than covalent interactions, which fall in the energetic range of 150 to 450 Kj/mol for simple bonds. The non-covalent interactions energetic range goes from 2 kj/mol for dispersion interactions to up to 300 kj/mol for ion-ion interactions (Table 1), and the sum of several supramolecular interactions can produce highly stable supramolecular complexes.

TABLE 1

Supramolecular Interactions Strength

| Interaction | Strength (Kj/mol) |
|---|---|
| Ion-ion | 200-300 |
| Ion-dipole | 50-200 |
| Dipole-dipole | 5-50 |
| Hydrogen bond | 4-120 |
| Cation-p | 5-80 |
| p-p | 0-50 |
| Van der Waals | <5 |
| Hydrophobic | Related with the solvent-solvent interaction energy |

Computational chemistry is a tool that is widely used throughout the world to predict the stability and structure of chemical systems with enhanced potential properties and has found application at industrial level in the development of quantitative structure-activity relationship studies. Computational calculation methods that have been used for this purpose include molecular mechanics methods, quantum methods, which comprise semi-empiric and ab-initio methods, as well as the density functional theory methods. As examples in literature demonstrating the use of computational chemistry to accurately predict supramolecular interactions in chemical systems and/or thermodynamic and kinetic aspects of chemical processes, the following articles can be quoted: 1) Cornucopian Cylindrical Aggregate Morphologies from Self-Assembly of Amphiphilic Triblock Copolymer in Selective Media (*Journal of Physical Chemistry B*, 2005, 109, 21549-21555), 2) Density Functional Calculations, Synthesis, and Characterization of Two Novel Quadruple Hydrogen-Bonded Supramolecular Complexes (*Journal of Physical Chemistry A*, 2004, 108, 5258-5267), 3) Strong Decrease of the Benzene-Ammonium Ion Interaction upon Complexation with a Carboxylate Anion (*Journal of American Chemical Society*, 1999, 121, 2303-2306).

It is important to highlight that none of the aforementioned references addresses the generation and use of foaming compositions with wettability modifying and corrosion inhibitory properties that control the channeling of fluids in naturally fractured carbonate reservoirs, alter the wettability of the rock in a favorable way in crude oil enhanced recovery processes and control uniform corrosion problems occurring in production rigs under high temperature and ultra-high salinity conditions; by means of the synergistic effect resulting from the supramolecular interaction of alkyl amido propyl hydroxysultaines or alkyl amino hydroxysultaines with sodium alkyl hydroxyl sulfonates and sodium alpha olefin sulfonates; and that, to our knowledge, this is the first time that supramolecular complexes with the aforementioned properties have been developed worldwide. Additionally, the supramolecular complexes of the present invention generate foams that show superior stabilities with regard to those generated by products currently used for this purpose throughout the world.

SUMMARY OF THE INVENTION

The present invention is directed to foaming compositions to improve crude oil recovery in naturally fractured carbonate wells and reservoirs. The foaming compositions of the invention are used to control the channeling of fluids in naturally fractured carbonate reservoirs and change the rock's wettability for increasing oil recovery and to inhibit or reduce the corrosion of the well equipment. The foaming composition of the invention reduces corrosion and reduces pitting of ferrous metals and components of the well equipment. The foaming composition is stable at temperatures of up to 200° C. and pressures of up to 5500 psi.

The foaming composition of the invention is suitable for use in wells and reservoirs having a high salinity of up to 400,000 ppm sodium chloride and a concentration of divalent ions of up to 250,000 ppm. The foaming composition of the invention can be injected into a well to provide a concentration of the active foaming agent in an amount of 25-40,000 ppm based on the amount of the crude oil present. In an alternative embodiment, the foaming composition is introduced into the well or reservoir to provide concentration of the active foaming agent in an amount of 500 to 10,000 ppm based on the amount of the crude oil present.

The foaming composition of the invention comprises a supra molecular complex as an active component and foaming agent from alkyl amido propyl hydroxysultaines or alkyl hydroxysultaines with sodium alkyl hydroxysulfonates and sodium alkenyl sulfonates, having the following structural formula:

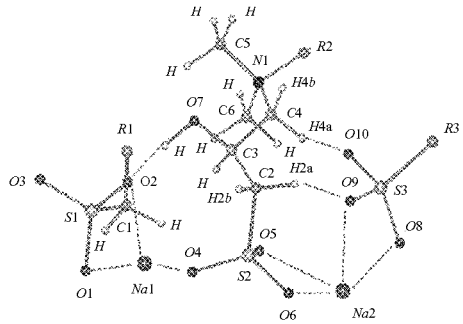

wherein R1, R2 and R3 are alkyl, alkenyl linear or branched chains and whose length ranges from 1 to 30 carbon atoms.

The foaming composition is effective for recovering crude oil, such as heavy crude oil, from oil wells and reservoirs and particularly naturally fractured carbonate reservoirs and sand or clay-like substrates. The foaming composition is particularly suitable for use in naturally fractured carbonate wells at high temperature and high salinity conditions. The foaming composition is stable and high salinity environments and stable at high concentrations of divalent ions.

The invention is further directed to a method of improving the recovery of crude oil, including heavy crude oil, from naturally fractured carbonate wells and reservoirs. The foaming composition of the invention is introduced into the well or reservoir with a displacement fluid or gas to displace the crude oil from the rock formation so that the crude oil can be recovered.

These and other aspects of the invention will become apparent from the following detailed description of the invention and the next drawings which discloses various embodiments of the invention.

BRIEF DESCRIPTION OF THE DRAWINGS

The contents of the figures of the present invention are briefly described below.

FIG. 20. Contact angle when the first drop starts to form at different concentrations of supramolecular complex described in example 19.

DETAILED DESCRIPTION OF THE INVENTION

Figure 1:
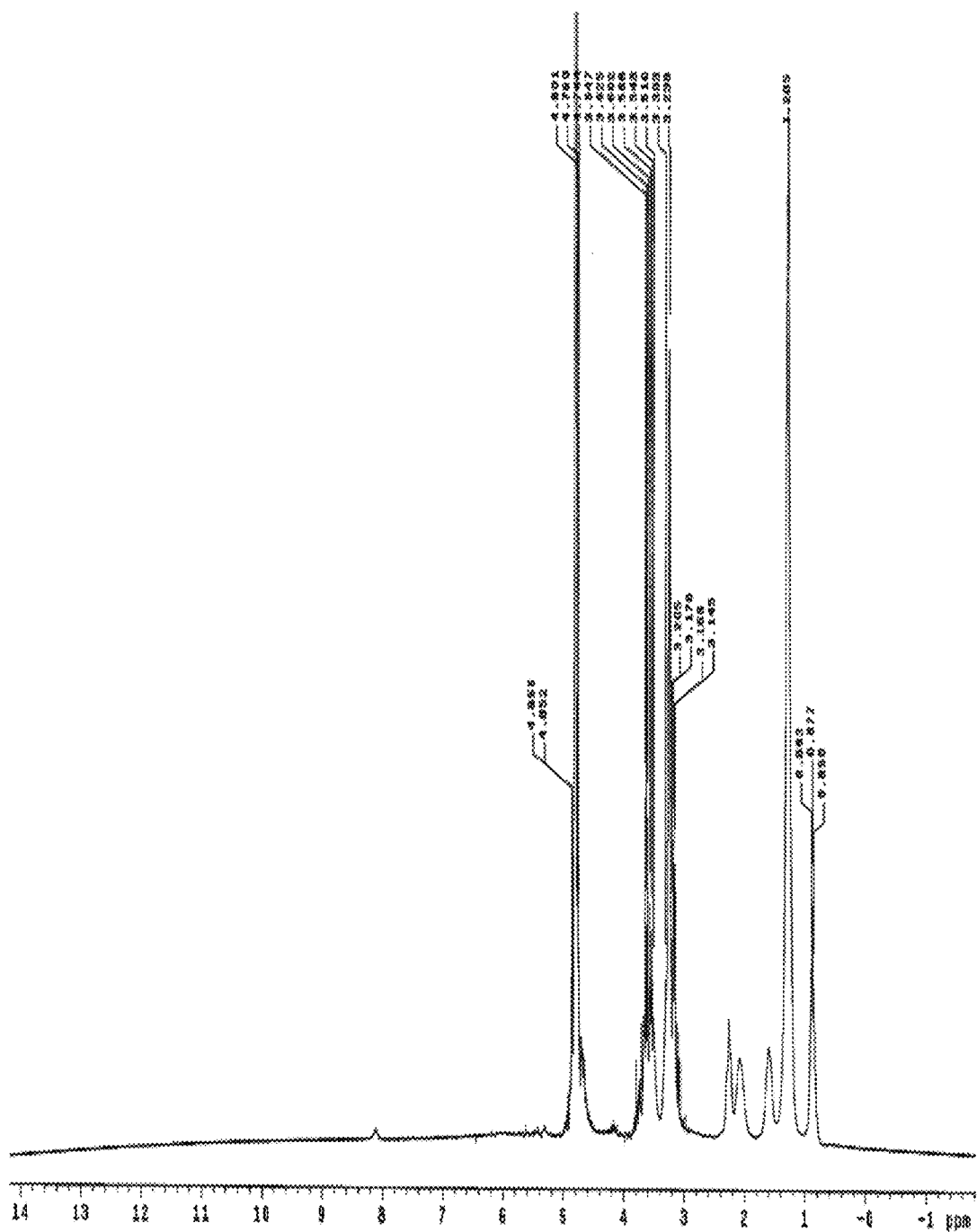
FIG. 1. Coco amido propyl hydrosultaine $^1$H Nuclear Magnetic Resonance Spectrum.
Figure 2:
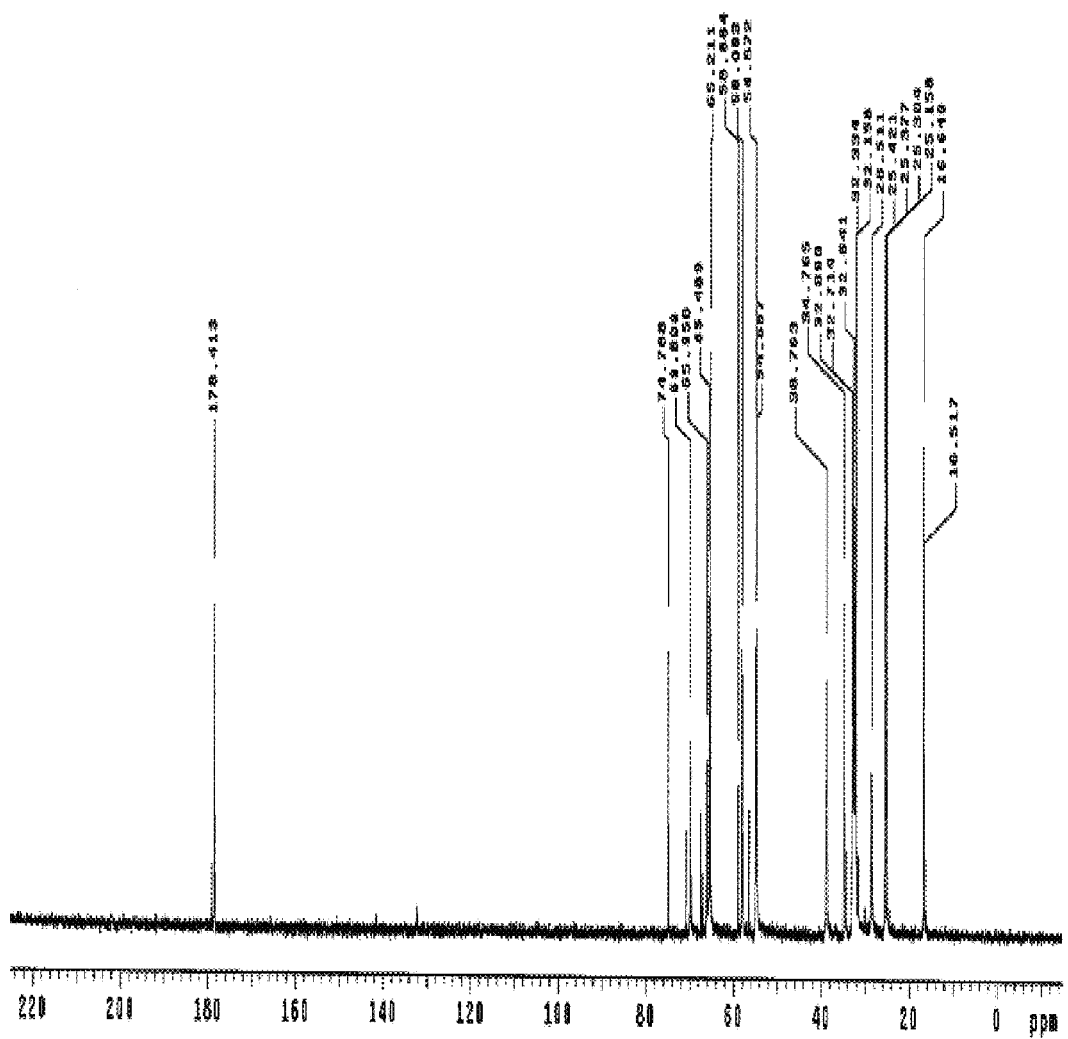
FIG. 2. Coco amido propyl hydrosultaine $^{13}$C Nuclear Magnetic Resonance Spectrum.
Figure 3:
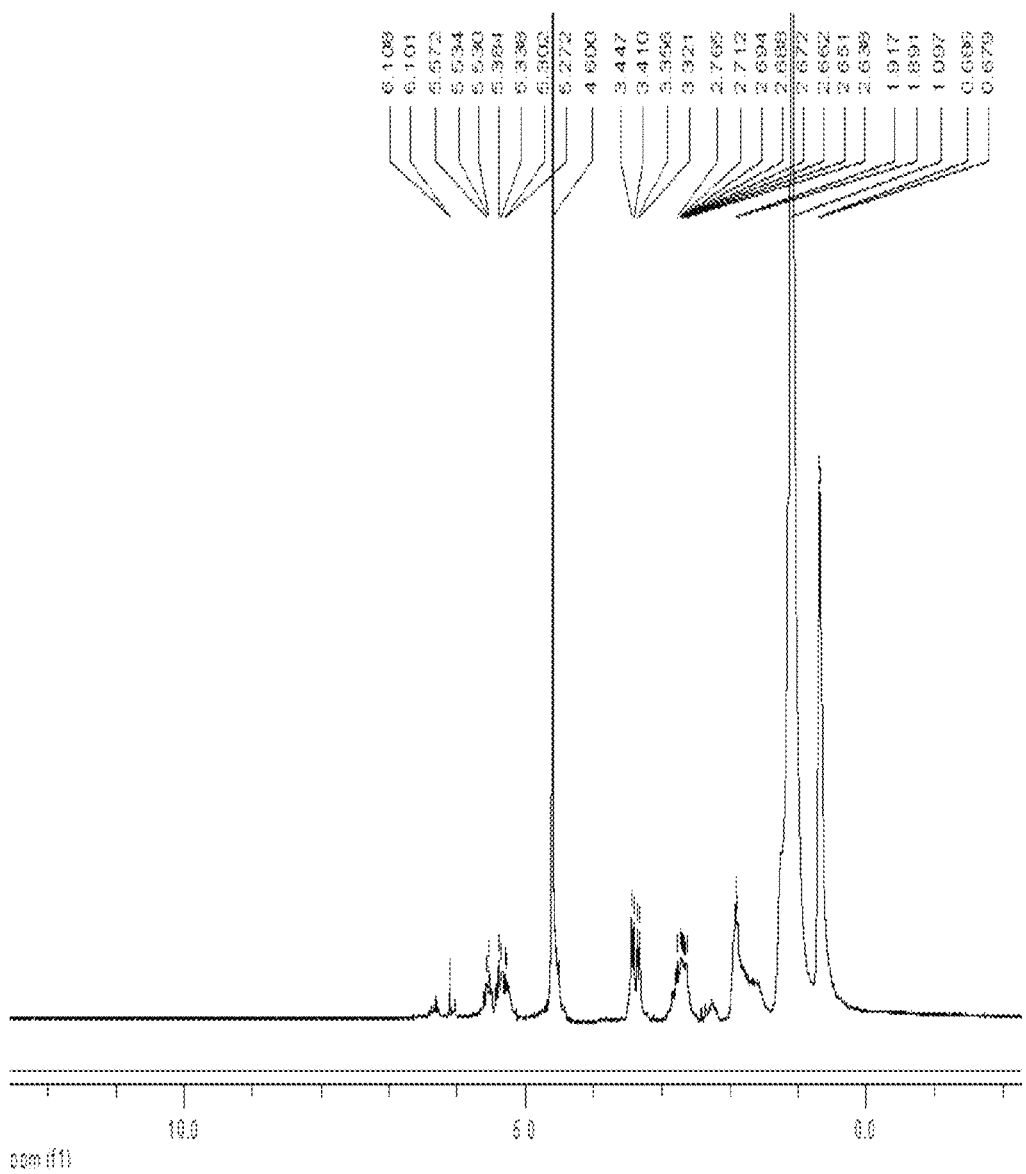
FIG. 3. Sodium 3-hydroxydodecane-1-sulfonate and sodium dodec-2-en-1-sulfonate mixture $^1$H Nuclear Magnetic Resonance Spectrum.
Figure 4:
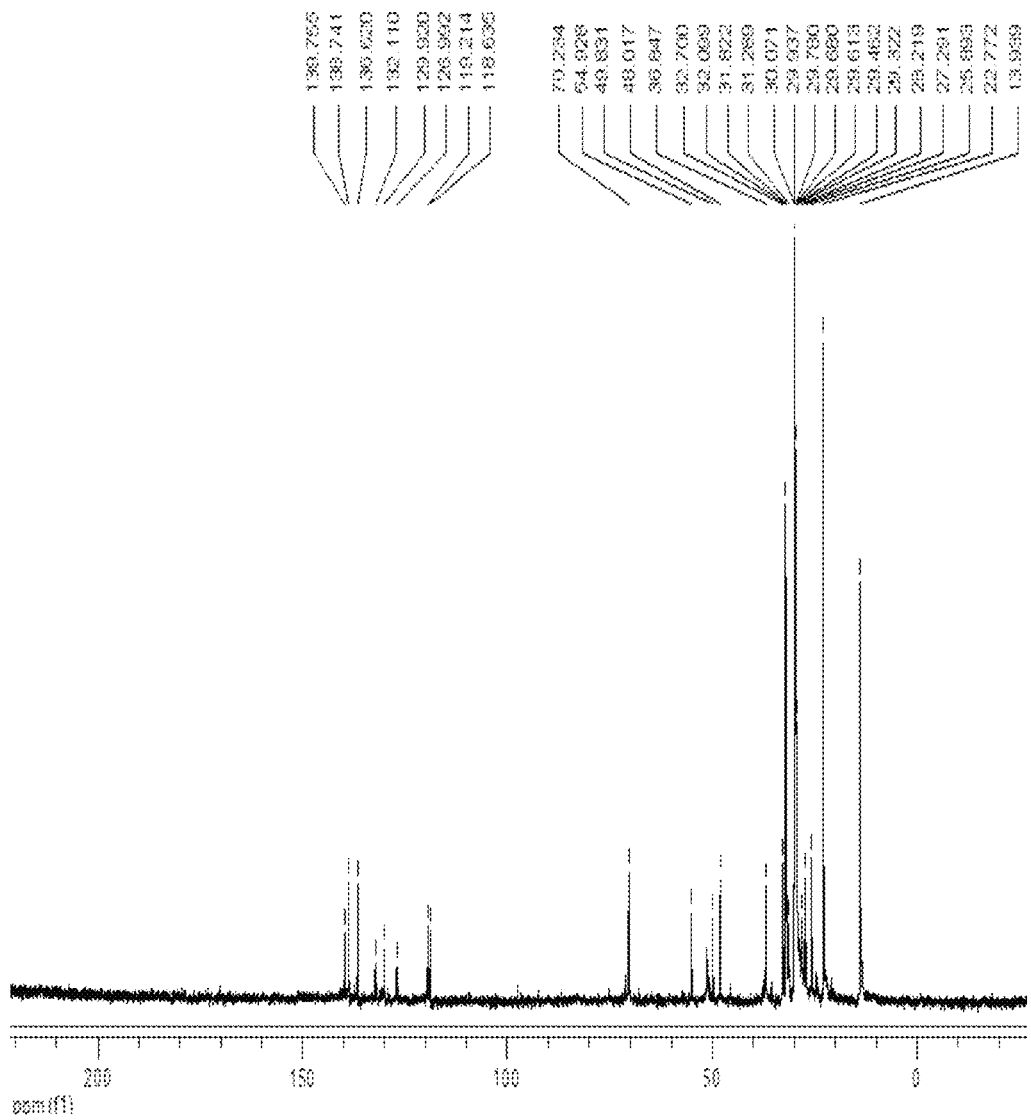
FIG. 4. Sodium 3-hydroxydodecane-1-sulfonate and sodium dodec-2-en-1-sulfonate mixture $^{13}$C Nuclear Magnetic Resonance Spectrum.
Figure 5:
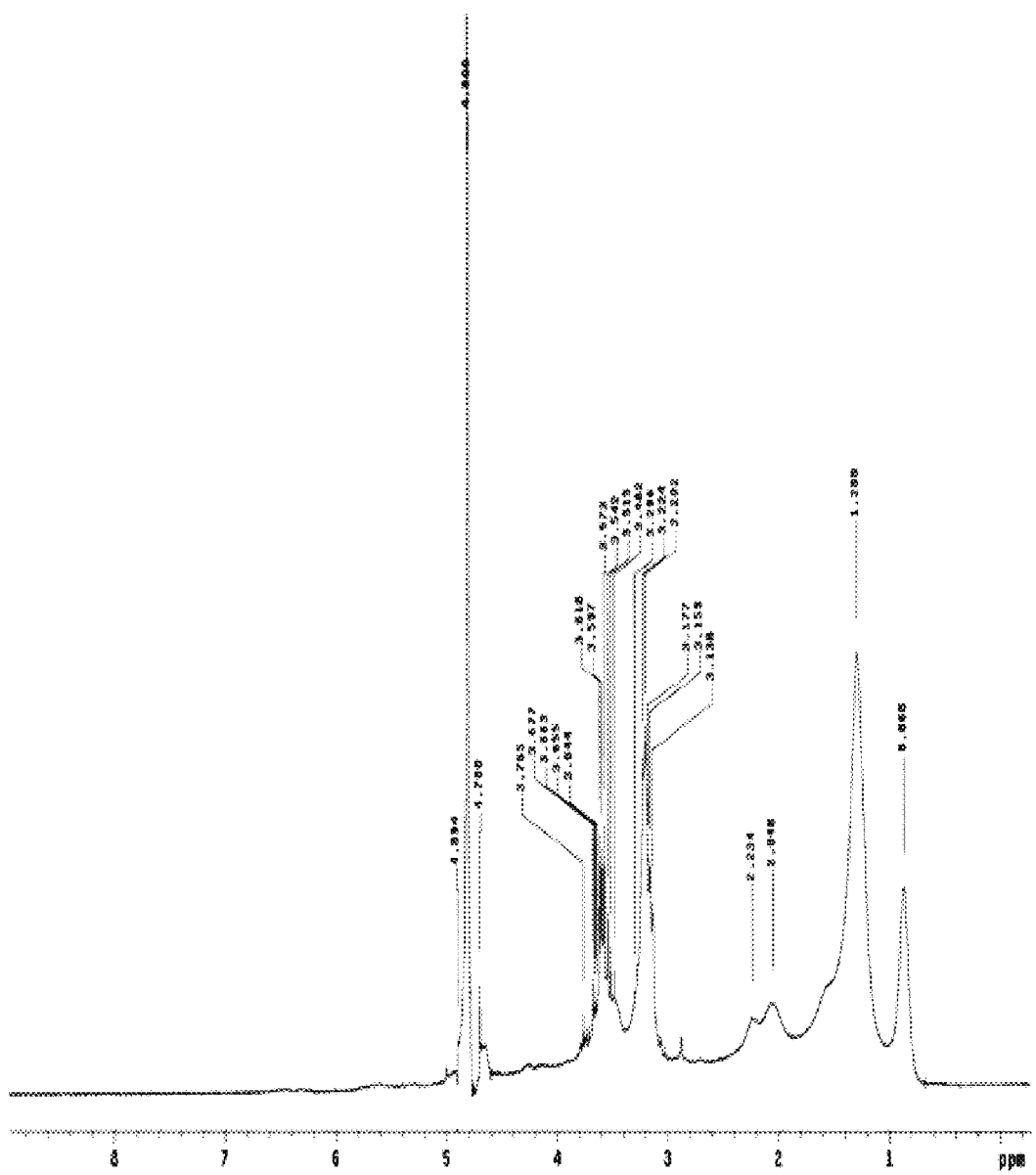
FIG. 5. $^1$H Nuclear Magnetic Resonance Spectrum of supramolecular complex described in example 19.
Figure 6:
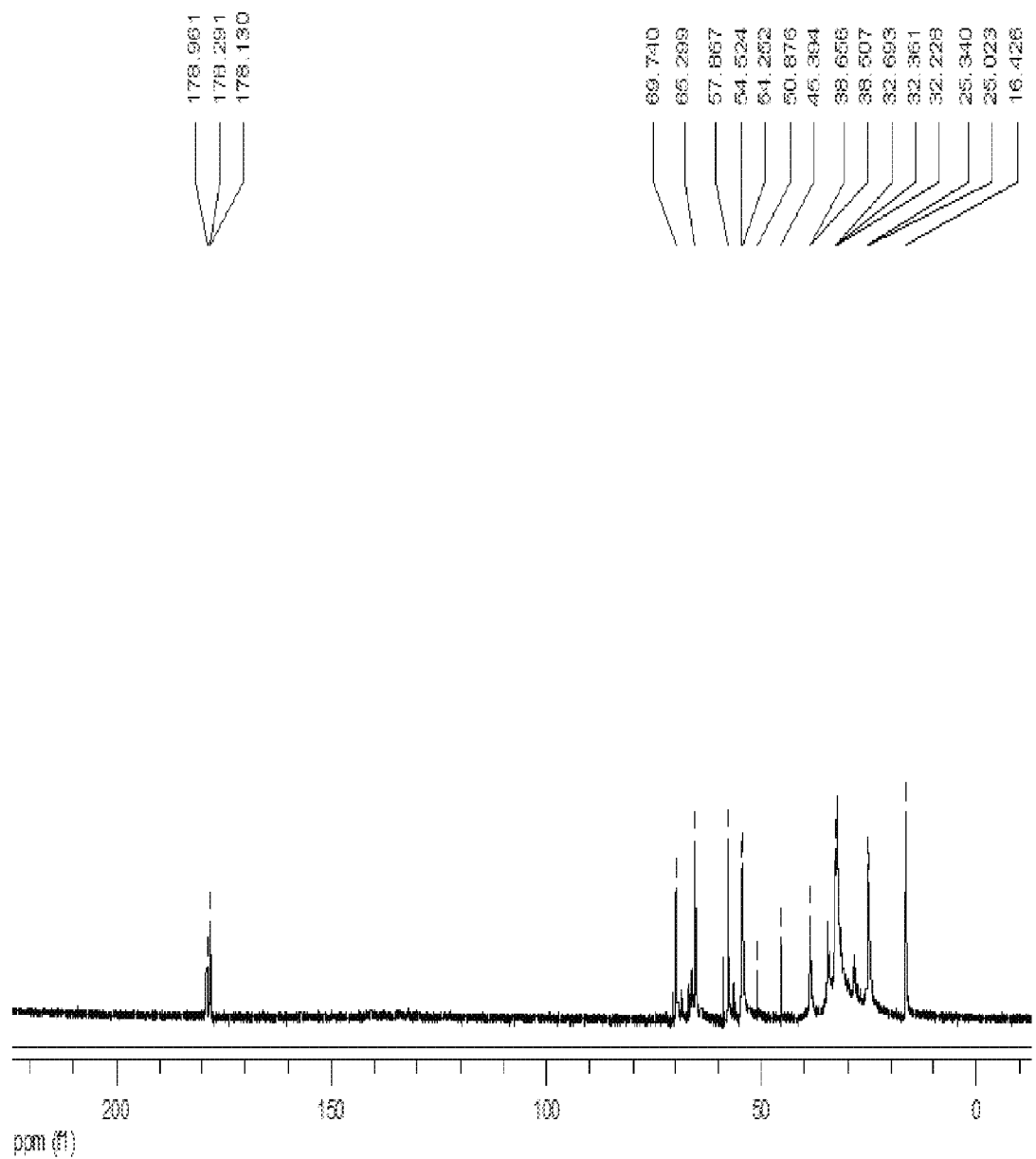
FIG. 6. $^{13}$C Nuclear Magnetic Resonance Spectrum of supramolecular complex described in example 19.

The present invention relates to the synergistic effect resulting from the supramolecular interaction of alkyl amido propyl hydroxysultaines or alkyl amino hydroxysultaines with sodium alkyl hydroxysulfonates and sodium alkenyl sulfonates and its application in the development of foaming compositions with enhanced stability that control the channeling of fluids in naturally fractured carbonate reservoirs with ultra-high salinity and high temperature conditions, alter the wettability of the rock in a favorable way to enhance crude oil recovery processes and control uniform corrosion problems that occur in production rigs.

The developed supramolecular complexes widely surpass commercial surfactants in terms of performance as foaming and wettability-modifying agents. The supramolecular complexes based on sodium alkenyl sulfonates, alkyl amido propyl hydroxysultaines or alkyl hydroxysultaines are characterized for being tolerant to brines with high concentrations of divalent ions such as calcium, magnesium, strontium and barium and for the fact that for its application to the reservoir, sea water and/or congenital water characteristic of the reservoir may be used as means of transportation.

The complex of the invention is obtained from alkyl amido propyl hydroxysultaines or alkyl hydroxysultaines with sodium alkyl hydroxysulfonates and sodium alkenyl sulfonates, and is characterized by the following structural formula:

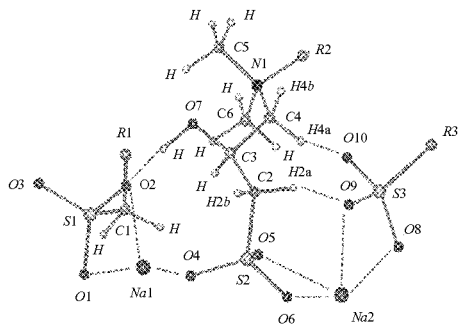

wherein R1, R2 and R3 are alkyl, alkenyl linear or branched chains and whose length ranges from 1 to 30 carbon atoms.

The invention is particularly directed to a composition for producing foams and to a foaming composition containing as an active foaming agent the complex of the invention. The foaming composition is suitable for injecting into wells and reservoirs to control the channeling of fluids in naturally fractured carbonate reservoirs and change the rock's wettability to improve the recovery of crude oil from the well or reservoir. The foaming composition is particularly suitable for use in naturally fractured carbonate wells and reservoirs and sandy-clay reservoirs. The foaming composition contains the complex of the invention in an amount to prevent or reduce corrosion and pitting of ferrous metals of the well equipment in contact with the injection fluid.

The foaming composition of the invention is typically an aqueous foaming composition obtained from the supramolecular complex of the invention in an aqueous medium. The foaming composition can also be obtained from the supramolecular complex in aqueous solvents, alcohols or mixtures thereof. The alcohols can be methanol, ethanol, isopropyl alcohol and mixtures thereof. The aqueous medium can be fresh water, seawater, water present in the well or reservoir and mixtures thereof. The foaming composition can include the supramolecular complex in an amount of 0.1 to 50.0% by weight based on the weight of the foaming composition. The foaming composition can also contain a corrosion inhibitor or foam stabilizer. The foam stabilizer can be itaconic acid and sodium vinyl sulfonate copolymers having an average molecular weight of 200 to 20,000 Da. The foam stabilizer can be included in an amount of 0.5 to 10% by weight based on the weight of the supramolecular complex. In further embodiments, the foaming composition can include a zwitterionic geminal liquid selected from the group consisting of bis-N-alkylpolyether or bis-N-alkenyl-polyether and bis-N-arylpolyether, bis-beta amino acids and salts thereof. The zwitterionic geminal liquid can be included in an amount of 0.5 to 10% by weight with respect to the amount of the supramolecular complex.

The foaming composition of the invention is stable at temperatures of up to 200° C. and pressures of up to 5500 psi. The foaming composition is also stable and high salinity environments of up to 400,000 ppm sodium chloride and 250,000 ppm of divalent ions.

The foaming composition of the invention is also suitable for use in a method of recovering crude oil from an oil well or reservoir by ejecting a foam obtained from the foaming composition into the well or reservoir at a pressure and amount to displace the crude oil from the rock formations. The foam containing the foaming composition is injected into the well where the foaming composition provides the supramolecular complex present at a concentration of 25-40,000 ppm based on the amount of the crude oil. In alternative embodiments, the foaming composition is injected into the well or reservoir to provide the supramolecular complex at a concentration of 500 to 10,000 ppm based on the amount of the crude oil. The foaming composition can be injected into the well followed by injecting a gas as a displacement fluid to recover the crude oil. The foaming composition and the injected gas can be introduced into an injection well and a production well or to a single well acting as an injection well and a production well. In one embodiment, a method of enhancing the hydrocarbon or crude oil recovery process from a well or naturally fractured reservoir introduces the foaming composition into a single well acting simultaneously as an injection well and production well by introducing the foaming composition into the high conductivity fracture zone, shutting down or stopping the producing well for a period of time and thereafter opening the well and recovering the crude oil. In one embodiment, a well can be closed for a period of about 69 days after injecting the supramolecular complex to enhance the crude oil recovery. The foaming composition can be introduced continuously into an injection well and forcing the foaming composition through the high conductivity fracture zones of the reservoir and thereafter recovering the crude oil or hydrocarbon through a producing well. In one embodiment, the foaming composition and a foaming gas are injected into the well under pressure to produce the foam in situ in the well. In other embodiments, the foam is generated from the foaming composition and then injected into the well.

The foaming composition can be used to produce a foam for injecting into an oil well or reservoir to recover the crude oil from the well or reservoir. The foam is produced from the foaming composition in an aqueous medium by the injection of a gas selected from nitrogen, oxygen, carbon dioxide, natural gas, methane, propane, butane or mixtures thereof and mixing under foaming conditions.

A foam can be generated from the foaming composition by adding the foaming composition to a foaming medium, which is typically an aqueous medium. The foaming composition is added to the aqueous medium in an amount to produce a stable foam. In one embodiment the foaming composition is mixed with the aqueous medium in a ratio of about 1:4 and mixed with a foaming agent, such as gas, under foaming conditions to produce the foam.

The foaming composition of the invention is obtained by mixing the alkyl amido propyl hydroxysultaines or alkyl hydroxysultaines with sodium alkyl hydroxysulfonates and sodium alkenyl sulfonates under conditions to form the supramolecular complex of Formula (1). In one embodiment, the foaming composition including supramolecular complex as the only foaming agent where the supramolecular complex consists essentially of the interaction of alkyl amido propyl hydroxysultaines or alkyl hydroxysultaines with sodium alkyl hydroxysulfonates and sodium alkenyl sulfonates.

For the development of the present invention a procedure was followed comprising the following stages: 1) Molecular design by means of computational chemistry, 2) Synthesis of supramolecular complexes, 3) Spectroscopic characterization of the supramolecular complexes and 4) Experimental evaluation of the foaming, wettability-modifying and corrosion inhibitory properties. The selection of the present methodology is based on the fact that the key point to solve the series of problems associated with the development of foaming agents with wettability-modifying and corrosion inhibitory properties that are tolerant to high salinity and divalent ions concentrations and able to endure high-temperature and pressure conditions is the understanding at molecular level of: 1) How to control the ionic exchange reaction between the foaming agent and the divalent ions present in the injection water and/or formation water; 2) How to generate dipole-dipole pairs between the agent with wettability-modifying properties and the polar compounds present in hydrocarbon so that these are able to alter the wettability of carbonate rocks from oil-wettable to water-wettable and 3) How to generate stable films, resulting from the interaction between the corrosion inhibitor and the corroded surfaces that are present in production rigs typical in the oil industry.

1) Molecular Design by Means of Computational Chemistry.

Before going into details, and for clarification purposes, it is worth mentioning that the current custom as the first stage of every process involving the development of chemical products with applications at industrial level is the design, by means of computational chemistry, of the molecules or supramolecular complexes that will have the potential ability to solve the problems of interest. This molecular design is intended to systematically direct the efforts aimed to the synthesis of new molecules or new supramolecular complexes with new enhanced properties.

Once established this, the first thing to establish in molecular design is how to control the ionic exchange reaction between the foaming agent and the divalent ions present in the injection water and/or formation water, and the first premise to consider is based on the fact that in order for the foaming phenomenon to take place, it is necessary that the foaming agent contains at least one atom of sodium or potassium and that this monovalent atom is substituted in traditional foaming agents by divalent ions, since the process is thermodynamically and kinetically favored as the temperature present in the system increases (Mexican patent MX 297297, Composición Espumante para Alta Temperatura y Salinidad), and thus it would be necessary to find a way to encapsulate the sodium or potassium atoms by means of supramolecular chemistry. In addition to this, it is documented in specialized literature that the sulfonate group is tolerant to high salinity and concentrations of dissolved divalent ions; therefore, it is present in a wide array of products with anti-scale properties (U.S. Pat. No. 5,092,404, Polyvinyl Sulfonate Scale Inhibitor; Industrial & Engineering Chemistry Research, 2011, 50, 5852-5861, Effect of Various Cations on the Formation of Calcium Carbonate and Barium Sulfate Scale with and without Scale Inhibitors), whereby, as second premise, it can be regarded that the presence of the sulfonate group in foaming agents will confer them tolerance to high salinity and divalent ions concentrations. Additionally, it is documented that in supramolecular chemistry, self-assembly processes can produce molecular cavities, which, depending on their structure, may be able to behave as receptors and generate inclusion complexes (Inorganic Chemistry, 2006, 45, 2553-2561, Boron Macrocycles Having a Calix-Like Shape. Synthesis, Characterization, X-ray Analysis, and Inclusion Properties; Chemical Communications. 2004, 24, 2834,2835, Boron-Nitrogen Macrocycles: A New Generation of calix[3]arenes), whereby, as third premise, it can be regarded that the supramolecular interaction of alkyl amido propyl hydroxysultaines or alkyl amino hydroxysultaines with sodium alkyl hydroxy sulfonates and sodium alpha olefin sulfonates will produce nanocavities, which in an aqueous medium will behave as receptors that capture gas and form inclusion complexes characterized by the fact that, in its polar portion, the sodium or potassium atoms from the sodium alkyl hydroxysulfonate and/or the sodium alkenyl sulfonate are encapsulated and, thereby, it will be possible to use them as high-performance foaming agents under conditions of high salinity, high concentrations of divalent ions and high temperatures In order to demonstrate the abovementioned premises, theoretical calculations were performed, where the self-assembly process between various alkyl amido propyl hydroxysultaines or alkyl hydroxysultaines with sodium alkyl hydroxysulfonates and sodium alkenyl sulfonates is simulated and the results obtained are described in the following examples:

Example 1

By means of computational chemistry, and using the MNDO/d semi-empirical method as theoretical level, the geometries of compounds sodium trans-dodec-2-en-1-sulfonate (sodium alkenyl sulfonate) 1, sodium 3-hydroxy-dodecyl-1-sulfonate (sodium alkyl hydroxy sulfonate) 2 and pentyl-amido-propyl-hydroxysultaine (alkyl amido propyl hydroxysultaine) 3, as well as the geometry of the supramolecular complex resulting from the interaction of the three mentioned compounds were optimized in the gas phase at 1:1:2 molecular ratios 4 (6).

The energetic results, the most relevant bond distances and the most important Mulliken atomic charges for the mentioned complexes and the corresponding supramolecular complex are shown in Tables 2, 3 and 4, respectively.

TABLE 2

Energy of compounds 1, 2, 3 and supramolecular complex 4 obtained with the MNDO/d semi-empiric method

| Compound or Complex | MNDO/d semi-empiric method | |
|---|---|---|
| | Total energy (kJ/mol) | Interaction Energy (kJ/mol) |
| 1 | −292,032.617 | |
| 2 | −325,951.549 | |
| 3 | −427,489.552 | |
| 4 | −1,473,226.736 | −263.466 |

Where:
1=sodium trans-dodec-2-en-1-sulfonate
2=sodium 3-hydroxy-dodecyl-1-sulfonate
3=pentyl-amido-propyl-hydroxysultaine
4=Supramolecular complex resulting from the interaction of sodium trans-dodec-2-en-1-sulfonate, sodium 3-hydroxydodecyl-1-sulfonate and pentyl-amido-propyl-hydroxysultaine at a molecular ratio of 1:1:2.

The analysis of Table 2 results shows that the formation of supramolecular complex 4 from the 1:1:2 molecular interaction of compounds 1, 2 and 3 would be strongly favored from the thermodynamic point of view. Additionally, the −263.340 kJ/mol interaction energy indicates that ion-ion-type supramolecular interactions and/or a combination of ion-dipole interactions and hydrogen bonds would be present.

TABLE 3

Main bond distances in compounds 1, 2, 3 y and supramolecular complex 4.
*Supramolecular complex molecular model

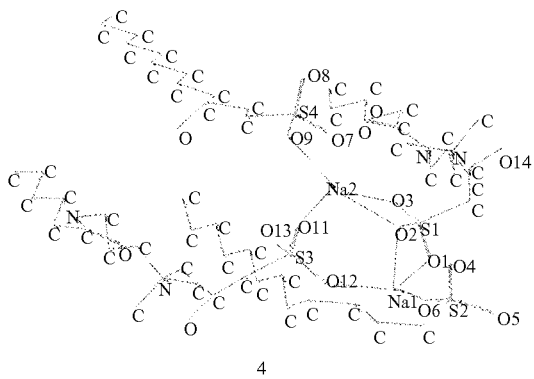

4

| Bond or interaction | Bond distance in the compound or complex (Å) | | | |
|---|---|---|---|---|
| | 1 | 2 | 3 | 4 |
| O1 . . . Na1 | | | | 2.520 |
| O2 . . . Na2 | | | | 2.407 |
| O2 . . . Na2 | | | | 3.672 |
| O3 . . . Na2 | | | | 2.247 |
| O6 . . . Na1 | 2.314 | | | 2.144 |
| O9 . . . Na2 | | 2.245 | | 2.330 |
| O11 . . . Na2 | | | | 2.244 |
| O12 . . . Na1 | | | | 2.270 |
| S1-O1 | | | 1.505 | 1.522 |
| S1-O2 | | | 1.510 | 1.530 |
| S1-O3 | | | 1.517 | 1.525 |
| S2-O4 | 1.495 | | | 1.515 |
| S2-O5 | 1.540 | | | 1.508 |
| S2-O6 | 1.540 | | | 1.535 |
| S3-O11 | | | 1.505 | 1.522 |
| S3-O12 | | | 1.510 | 1.523 |
| S3-O13 | | | 1.517 | 1.509 |
| S4-O7 | | 1.545 | | 1.534 |
| S4-O8 | | 1.501 | | 1.506 |
| S4-O9 | | 1.547 | | 1.535 |

*Hydrogen atoms were removed for better visualization

Table 3 results analysis shows that the 2.520, 2.407, 3.672, 2.247, 2.244 and 2.270 Å distances for interactions O1 . . . Na1, O2 . . . Na1, O2 . . . Na2, O3 . . . Na2, O11 . . . Na2 and O12 . . . Na1 are smaller than the sum of the Van der Waals Radius for the oxygen (Van der Waals Radius of 1.52 Å) and sodium atoms (Van der Waals Radius of 2.27 Å) and are typical of structures containing Na—O coordination bonds and sulfonate groups (*Crystal Growth & Design* 2006, 6[2], 514-518). Additionally, a nanocavity is observed in supramolecular complex 4, which could act as gas receptor and generate inclusion complexes that would behave as foaming agents in aqueous media. Furthermore, this complex 4 shows that the sodium atoms have been encapsulated and therefore the new foaming agents must be tolerant to brines containing large quantities of divalent ions and to high temperatures.

Table 4 results analysis shows that the Mulliken atomic charge on Na1 sodium atom of supramolecular complex 4 is reduced by 0.136 units with regard to the charge that this atom has in sodium trans-dodec-2-en-1-sulfonate (sodium alkenyl sulfonate) 1, whereas the atomic charges from oxygen atoms O1, O2 and O12 suffer a decrease of 0.104, 0.126 and 0.103 units, with regard to the pentyl-amido-propyl-hydroxysultaine (alkyl amido hydroxysultaine); this significant change in the Mulliken atomic charges confirms that in supramolecular complex 4, sodium atom Na1 is coordinated with oxygen atoms O1, O2 and O12 and encapsulated between the two pentyl-amido-propyl-hydroxysultaine (alkyl amido hydroxysultaine) 3 molecules and the sodium trans-dodec-2-en-1-sulfonate (sodium alkenyl sulfonate) 1 molecule. Furthermore, Table 3 results show that the Mulliken atomic charge on the Na2 sodium atom from supramolecular complex 4 is reduced by 0.301 units with regard to the charge that this atom has in sodium 3-hydroxy-dodecyl-1-sulfonate (sodium alkyl hydroxy sulfonate) compound 2, whereas the atomic charges from oxygen atoms O2, O3 and O11 suffer a decrease of 0.126, 0.086 and 0.077 units, with regard to pentyl-amido-propyl-hydroxysultaine (alkyl amido propyl hydroxysultaine) 3; this significant change in the Mulliken atomic charges confirms that in supramolecular complex 4, the sodium atom Na2 is coordinated with oxygen atoms O2, O3 and O11 and encapsulated between the two pentyl amido propylhydroxysultaine (alkyl amido hydroxysultaine) 3 molecules and the sodium hydroxy-dodecyl-1-sulfonate (sodium alkyl hydroxy sulfonate) 2 molecule. In addition to this, Table 4 results confirm that a nanocavity is present in supramolecular complex 4, which could act as gas receptor and produce inclusion complexes that would behave as foaming agents in aqueous media.

Example 2

By means of computational chemistry, and using the MNDO/d semi-empirical method as theoretical level, the geometries of compounds sodium trans-tetraec-2-en-1-sulfonate (sodium alkenyl sulfonate) 5, sodium 3-hydroxy-tetradecyl-sulfonate 6 (sodium alkyl hydroxy sulfonate) and undecyl amido propyl hydroxysultaine (alkyl amido hydroxy sultaine) 7, as well as the geometry of the supramolecular complex resulting from the interaction of the three mentioned compounds were optimized in the gas phase at 1:1:2 molecular ratios 8 (7).

The energetic results, the most relevant bond distances and the most important Mulliken atomic charges for said complexes and the corresponding supramolecular complex are shown in Tables 5, 6 and 7, respectively.

The analysis of Table 5 results shows that the formation of supramolecular complex 8 from the 1:1:2 molecular interaction of compounds 5, 6 and 7 would be strongly favored from the thermodynamic point of view. Additionally, the −264.160 kJ/mol interaction energy indicates that ion-ion-type supramolecular interactions and/or a combination of ion-dipole interactions and hydrogen bonds would be present.

TABLE 4

Mulliken atomic charges of compounds 1, 2, 3 and supramolecular complex 4.
*Supramolecular complex molecular model

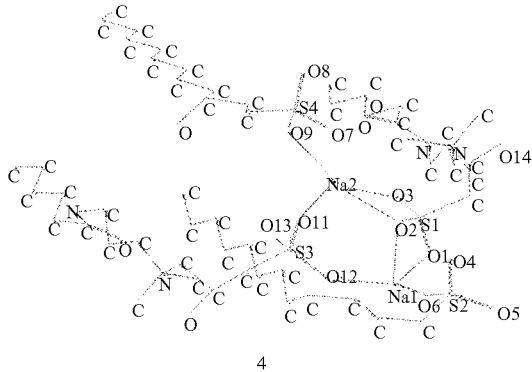

4

*Hydrogen atoms were removed for better visualization

| Atom | Compound or complex atomic charge (e) | | | |
|---|---|---|---|---|
| | 1 | 2 | 3 | 4 |
| O1 | | | −0.908 | −0.804 |
| O2 | | | −0.950 | −0.824 |
| O3 | | | −0.879 | −0.793 |
| O4 | −0.837 | | | −0.933 |
| O5 | −0.820 | | | −0.890 |
| O6 | −0.839 | | | −0.829 |
| O7 | | −0.845 | | −0.849 |
| O8 | | −0.842 | | −0.875 |
| O9 | | −0.850 | | −0.821 |
| O11 | | | −0.879 | −0.802 |
| O12 | | | −0.908 | −0.805 |
| O13 | | | −0.950 | −0.910 |
| Na1 | 0.477 | | | 0.341 |
| Na2 | | 0.619 | | 0.318 |
| S1 | | | 2.217 | 2.244 |
| S2 | 2.220 | | | 2.253 |
| S3 | | | 2.217 | 2.291 |
| S4 | | 2.227 | | 2.225 |

TABLE 5

Energy of compounds 5, 6, 7 and supramolecular complex 8 obtained with the MNDO/d semi-empiric method.

| | MNDO/d semi-empiric method | |
|---|---|---|
| Compound or Complex | Total energy (kJ/mol) | Interaction Energy (kJ/mol) |
| 5 | −322,083.2158 | |
| 6 | −355,986.611 | |
| 7 | −517,854.9422 | |
| 8 | −1,714,043.871 | −264.160 |

Where:

5=sodium trans-tetradec-2-en-1-sulfonate

6=sodium 3-hydroxy-tetradecyl-1-sulfonate

7=undecyl-amido-propyl-hydroxysultaine

8=Supramolecular complex resulting from the interaction of sodium trans-tetradec-2-en-1-sulfonate, sodium 3-hydroxy-tetradecyl-1-sulfonate and undecyl-amido-propyl-hydroxysultaine at a 1:1:2 molecular ratio.

TABLE 6

Main bond distances in compounds 5, 6, 7 and in supramolecular compound 8.
*Supramolecular complex 8 molecular model

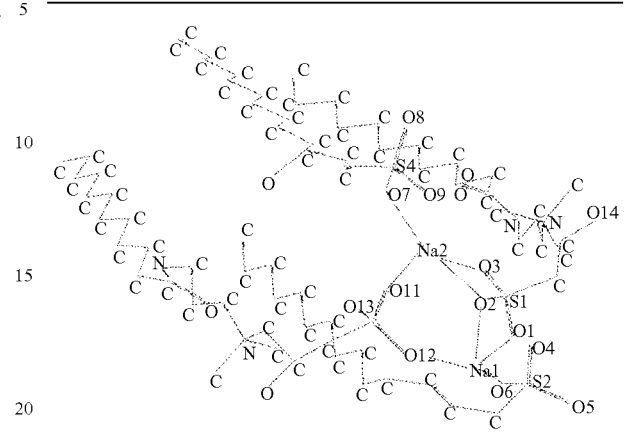

*Hydrogen atoms were removed for better visualization

| Bond or interaction | Bond distance in compound or complex (Å) | | | |
|---|---|---|---|---|
| | 5 | 6 | 7 | 8 |
| O1 ... Na1 | | | | 2.519 |
| O2 ... Na2 | | | | 2.407 |
| O2 ... Na2 | | | | 3.681 |
| O3 ... Na2 | | | | 2.247 |
| O6 ... Na1 | 2.312 | | | 2.144 |
| O9 ... Na2 | | 2.245 | | 2.328 |
| O11 ... Na2 | | | | 2.243 |
| O12 ... Na1 | | | | 2.273 |
| S1-O1 | | | 1.505 | 1.522 |
| S1-O2 | | | 1.517 | 1.523 |
| S1-O3 | | | 1.525 | 1.525 |
| S2-O4 | 1.495 | | | 1.515 |
| S2-O5 | 1.541 | | | 1.508 |
| S2-O6 | 1.540 | | | 1.535 |
| S3-O11 | | | 1.525 | 1.526 |
| S3-O12 | | | 1.517 | 1.523 |
| S3-O13 | | | 1.505 | 1.509 |
| S4-O7 | | 1.547 | | 1.535 |
| S4-O8 | | 1.501 | | 1.506 |
| S4-O9 | | 1.545 | | 1.534 |

Table 6 results analysis shows that the 2.519, 2.407, 3.681, 2.247, 2.243 and 2.273 Å distances for interactions O1 ... Na1, O2 ... Na1, O2 ... Na2, O3 ... Na2, O11 ... Na2 and O12 ... Na1 are smaller than the Van der Waals Radii sum for the oxygen (Van der Waals Radius of 1.52 Å) and sodium (Van der Waals Radius of 2.27 Å) atoms and are typical of structures containing Na—O coordination bonds and sulfonate groups (*Crystal Growth & Design* 2006, 6[2], 514-518). Additionally, as in complex 4 molecular model, supramolecular complex 8 shows the presence of a nanocavity and that the sodium atoms have been encapsulated; therefore, the new foaming agents should be tolerant to brines containing high quantities of divalent ions and to high temperatures.

The analysis of Table 4 results shows that the Mulliken atomic charge on the Na1 sodium atom of supramolecular complex 8 is reduced by 0.136 units with regard to the charge that this atom has in sodium trans-tetradec-2-en-1-sulfonate (sodium olefin sulfonate) compound 5, whereas the atomic charges from oxygen atoms O1, O2 and O12 suffer a 0.104, 0.127 and 0.145 units decrease, with regard to the undecyl-amido-propyl-hydroxysultaine (alkyl amido hydroxysultaine); this significant change in the Mulliken atomic charges confirms that in supramolecular complex 8, sodium atom Na1 is coordinated with oxygen atoms O1, O2 and O12 and encapsulated between the two undecyl-amido-propyl-hydroxysultaine (alkyl amido hydroxysultaine) 7 molecules and the sodium trans-tetradec-2-en-1-sulfonate (sodium alkenyl sulfonate) 5 molecule. Furthermore, Table 7 results show that the Mulliken atomic charge on the Na2 sodium atom from supramolecular complex 8 is reduced by 0.301 units with regard to the charge that this atom has in sodium 3-hydroxy-tetradecyl-1-sulfonate (sodium hydroxy alkyl sulfonate) compound 6, whereas the atomic charges from oxygen atoms O2, O3 and O11 suffer a decrease of 0.127, 0.086 and 0.077 units, with regard to undecyl-amido-propyl-hydroxysultaine (alkyl amido propyl hydroxysultaine) 7; this significant change in the Mulliken atomic charges confirms that in supramolecular complex 8, the sodium atom Na2 is coordinated with oxygen atoms O2, O3 and O11 and encapsulated between the two undecyl-amido-propyl-hydroxysultaine (alkyl amido hydroxysultaine) 7 molecules and the sodium hydroxy-tetradecyl-1-sulfonate (sodium alkyl hydroxy sulfonate) 6 molecule. In addition to this, Table 7 results confirm that a nanocavity is present in supramolecular complex 8, which might act as gas receptor and generate inclusion complexes that would behave as foaming agents in aqueous media.

Example 3

By means of computational chemistry, and using the MNDO/d semi-empirical method as theoretical level, the geometries of compounds sodium trans-dodec-2-en-1-sulfonate (sodium alkenyl sulfonate) 9, sodium 3-hydroxy-dodecyl-sulfonate 10 (sodium alkyl hydroxy sulfonate) and pentyl amido propyl hydroxysultaine (alkyl amido hydroxysultaine) 11, as well as the geometry of the supramolecular complex resulting from the interaction of the three aforementioned compounds were optimized in the gas phase at 1:1:1 molecular ratios 12 (8).

The energetic results, the most relevant bond distances and the main Mulliken atomic charges for said complexes and the corresponding supramolecular complex are shown in tables 8, 9 and 10, respectively.

Table 8 results analysis shows that the formation of supramolecular complex 12 from the 1:1:1 molecular interaction of compounds 9, 10 and 11 would be strongly favored from the thermodynamic point of view. Additionally, the −201.987 kJ/mol interaction energy indicates that ion-ion-type supramolecular interactions and/or a combination of ion-dipole interactions and hydrogen bonds would be present.

TABLE 7

Main Mulliken atomic charges in compounds 5, 6, 7 and supramolecular complex 8.
*Supramolecular complex molecular model

8

| | Atomic charge in the compound or complex (e) | | | |
|---|---|---|---|---|
| Atom | 5 | 6 | 7 | 8 |
| O1 | | | −0.907 | −0.803 |
| O2 | | | −0.951 | −0.824 |
| O3 | | | −0.879 | −0.793 |
| O4 | −0.819 | | | −0.933 |
| O5 | −0.838 | | | −0.890 |
| O6 | −0.839 | | | −0.829 |
| O7 | | −0.849 | | −0.822 |
| O8 | | −0.843 | | −0.875 |
| O9 | | −0.846 | | −0.849 |
| O11 | | | −0.879 | −0.802 |
| O12 | | | −0.951 | −0.806 |
| O13 | | | −0.907 | −0.910 |
| Na1 | 0.477 | | | 0.341 |
| Na2 | | 0.618 | | 0.317 |
| S1 | | | 2.218 | 2.244 |
| S2 | 2.220 | | | 2.253 |
| S3 | | | 2.218 | 2.291 |
| S4 | | 2.226 | | 2.225 |

*Hydrogen atoms were removed for better visualization.

TABLE 8

Energy of compounds 9, 10 and 11 and supramolecular complex 12 obtained with the MNDO/d semi-empiric method.

| | MNDO/d semi-empiric method | |
|---|---|---|
| Compound or Complex | Total energy (kJ/mol) | Interaction Energy (kJ/mol) |
| 9 | −291893.0889 | |
| 10 | −325795.815 | |
| 11 | −427285.3045 | |
| 12 | −1045675.705 | −201.987 |

Where:

9=sodium trans-dodec-2-en-1-sulfonate

10=sodium 3-hydroxy-dodecyl-1-sulfonate

11=pentyl-amido-propyl-hydroxysultaine

12=Supramolecular complex resulting from the interaction of sodium trans-dodec-2-en-1-sulfonate, sodium 3-hydroxy-dodecyl-1-sulfonate and pentyl-amido-propyl-hydroxysultaine at a 1:1:1 molecular ratio.

TABLE 9

Main bond distances in compounds 9, 10, 11 and
supramolecular complex 12.
*Supramolecular complex molecular model

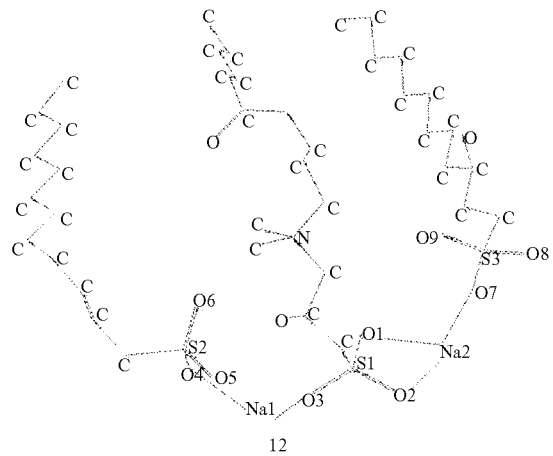

12

| Bond or interaction | Bond distance in the compound or complex (Å) | | | |
| --- | --- | --- | --- | --- |
|  | 9 | 10 | 11 | 12 |
| O1 ... Na2 |  |  |  | 2.414 |
| O2 ... Na2 |  |  |  | 2.377 |
| O3 ... Na1 |  | 2.245 |  | 2.163 |
| O4 ... Na1 |  |  |  | 2.357 |
| O7 ... Na2 | 2.314 |  |  | 2.090 |
| S1-O1 |  |  | 1.505 | 1.526 |
| S1-O2 |  |  | 1.517 | 1.526 |
| S1-O3 |  |  | 1.525 | 1.525 |
| S2-O4 |  | 1.495 |  | 1.541 |
| S2-O5 |  | 1.540 |  | 1.539 |
| S2-O6 |  | 1.540 |  | 1.507 |
| S3-O7 |  |  | 1.545 | 1.542 |
| S3-O8 |  |  | 1.501 | 1.506 |
| S3-O9 |  |  | 1.547 | 1.515 |

*Hydrogen atoms were removed for better visualization.

Table 9 results analysis shows that the 2.414, 2.377 and 2.163 Å distances for interactions O1 ... Na2, O2 ... Na2 and O3 ... Na1 are smaller than the Van der Waals Radius sum for the oxygen (Van der Waals Radius of 1.52 Å) and sodium (Van der Waals Radius of 2.27 Å) atoms and are typical of structures containing Na—O coordination bonds and sulfonate groups (*Crystal Growth & Design* 2006, 6[2], 514-518). Additionally, supramolecular complex 12 shows that the sodium atoms have been encapsulated and, therefore, the new foaming agents should be tolerant to brines containing high quantities of divalent ions and to high temperatures, in addition to the fact that in order to generate nanocavities, a dimerization process of supramolecular complex 12 would be required.

Table 10 results analysis shows that the Mulliken atomic charge on the Na1 sodium atom from supramolecular complex 12 is reduced by 0.019 units with regard to the charge that this atom has in sodium trans-dodec-2-en-1-sulfonate (sodium alkenyl sulfonate) compound 9, whereas the atomic charge from oxygen atom O3 suffers a decrease of 0.073 units, with regard to pentyl-amido-propyl-hydroxysultaine (alkyl amido hydroxysultaine) 11; this significant change in the Mulliken atomic charges confirms that in supramolecular complex 12, sodium atom Na1 is coordinated with oxygen atom O3. Additionally, Table 10 results show that the Mulliken atomic charge on sodium atom Na2 from supramolecular complex 12 is reduced by 0.152 units with regard to the charge that this atom has in sodium 3-hydroxy-dodecyl-1-sulfonate (sodium hydroxy alkyl sulfonate) compound 10, whereas oxygen atoms O1 and O2 atomic charges suffer a decrease of 0.092 and 0.144 units, with regard to pentyl-amido-propyl-hydroxysultaine (alkyl amido propyl hydroxysultaine) 11; this significant change in the Mulliken atomic charges confirms that in supramolecular complex 8, sodium atom Na2 is coordinated with oxygen atoms O1 and O2. Furthermore, supramolecular complex 12 confirms the fact that in order to generate nanocavities, a dimerization process of the same supramolecular complex 12 would be required.

TABLE 10

Main Mulliken atomic charges in compounds 9, 10, 11
and in supramolecular complex 12.
*Supramolecular complex molecular model

12

| Atom | Atomic charge in the compound or complex (e) | | | |
| --- | --- | --- | --- | --- |
|  | 9 | 10 | 11 | 12 |
| O1 |  |  | −0.908 | −0.816 |
| O2 |  |  | −0.950 | −0.806 |
| O3 |  |  | −0.879 | −0.806 |
| O4 | −0.837 |  |  | −0.856 |
| O5 | −0.820 |  |  | −0.830 |
| O6 | −0.839 |  |  | −0.880 |
| O7 |  | −0.845 |  | −0.847 |
| O8 |  | −0.842 |  | −0.877 |
| O9 |  | −0.850 |  | −0.931 |
| Na1 | 0.477 |  |  | 0.458 |
| Na2 |  | 0.619 |  | 0.467 |
| S1 |  |  | 2.217 | 2.258 |
| S2 | 2.220 |  |  | 2.223 |
| S3 |  | 2.227 |  | 2.258 |

*Hydrogen atoms were removed for better visualization.

Example 4

By means of computational chemistry, and using the MNDO/d semi-empirical method as theoretical level, the geometries of compounds sodium trans-dodec-1-en-1-sulfonate (sodium alkenyl sulfonate) 13, sodium 3-hydroxy-dodecyl-1-sulfonate (sodium alkyl hydroxy sulfonate) 14 and pentyl amido propyl hydroxysultaine (alkyl amido hydroxysultaine) 15, as well as the geometry of the supramolecular complex resulting from the interaction of the three aforementioned compounds were optimized in the gas phase at 1:1:2 molecular ratios 16 (9).

(9)

The energetic results, the most relevant bond distances and the main Mulliken atomic charges for said complexes and the corresponding supramolecular complex are shown in Tables 11, 12, and 13, respectively.

TABLE 11

Energy of compounds 13, 14 and 15 and supramolecular complex 16 obtained with the MNDO/d semi-empiric method

| Compound or Complex | MNDO/d semi-empiric method | |
|---|---|---|
| | Total energy (kJ/mol) | Interaction Energy (kJ/mol) |
| 13 | −292,043.925 | |
| 14 | −325,951.549 | |
| 15 | −427,489.552 | |
| 16 | −1,473,273.901 | −299.323 |

Where:
13=sodium trans-dodec-1-en-1-sulfonate
14=sodium 3-hydroxy-dodecyl-1-sulfonate
15=pentyl-amido-propyl-hydroxysultaine
16=Supramolecular complex resulting from the interaction of sodium trans-dodec-1-en-1-sulfonate, sodium 3-hydroxy-dodecyl-1-sulfonate and pentyl-amido-propyl-hydroxysultaine at a 1:1:2 molecular ratio.

Table 11 results analysis shows that the formation of supramolecular complex 16 from the 1:1:2 molecular interaction of compounds 13, 14 and 15 would be strongly favored from the thermodynamic point of view. Additionally, the −299.323 kJ/mol interaction energy indicates that ion-ion-type supramolecular interactions and/or a combination of ion-dipole interactions and hydrogen bonds would be present.

Table 12 results analysis shows that the 2.247, 2.235, 2.214 and 2.178 Å distances for interactions O1 . . . Na1, O3 . . . Na2, O11 . . . Na2 and O12 . . . Na1 are smaller than the Van der Waals Radii sum for the oxygen (Van der Waals Radius of 1.52 Å) and sodium (Van der Waals Radius of 2.27 Å) atoms and are typical of structures containing Na—O coordination bonds and sulfonate groups (*Crystal Growth & Design* 2006, 6[2], 514-518).

TABLE 12

Main bond distances in compounds 13, 14, 15 and supramolecular complex 16.
*Supramolecular complex molecular model

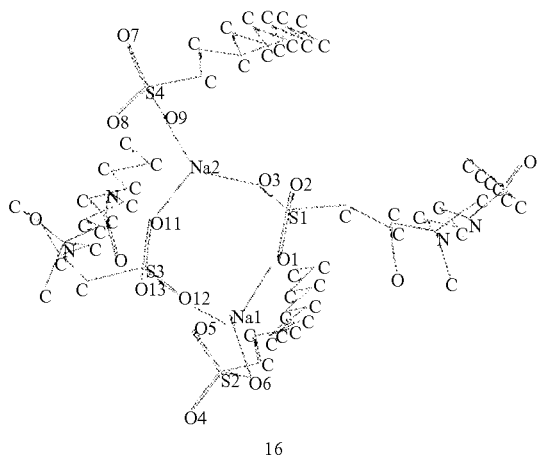

16

| Bond or interaction | Bond distance in the compound or complex (Å) | | | |
|---|---|---|---|---|
| | 13 | 14 | 15 | 16 |
| O1 . . . Na1 | | | | 2.247 |
| O3 . . . Na2 | | | | 2.235 |
| O6 . . . Na1 | 2.237 | | | 2.310 |
| O9 . . . Na2 | | 2.245 | | 2.130 |
| O11 . . . Na2 | | | | 2.214 |
| O12 . . . Na1 | | | | 2.178 |
| S1-O1 | | | 1.505 | 1.524 |
| S1-O2 | | | 1.510 | 1.510 |
| S1-O3 | | | 1.517 | 1.520 |
| S2-O4 | 1.501 | | | 1.505 |
| S2-O5 | 1.548 | | | 1.537 |
| S2-O6 | 1.547 | | | 1.536 |
| S3-O11 | | | 1.510 | 1.530 |
| S3-O12 | | | 1.505 | 1.526 |
| S3-O13 | | | 1.517 | 1.501 |
| S4-O7 | | 1.501 | | 1.505 |
| S4-O8 | | 1.545 | | 1.516 |
| S4-O9 | | 1.547 | | 1.538 |

*Hydrogen atoms were removed for better visualization

Additionally, supramolecular complex 16 reveals the presence of a nanocavity, which might act as gas receptor and generate inclusion complexes that would behave as foaming agents in aqueous media. Additionally, said complex 16 shows that the sodium atoms have been encapsulated, whereby the new foaming agents should be tolerant to brines containing large quantities of divalent ions and to high temperatures. Table 4 results analysis shows that the Mulliken atomic charge on supramolecular complex 16 sodium atom Na1 is reduced by 0.309 units with regard to the charge that this atom has in sodium trans-dodec-1-en-1-sulfonate (sodium alkenyl sulfonate) compound 13, whereas the atomic charges from oxygen atoms O1 and O12 suffer a 0.067 and 0.100 units decrease, with regard to pentyl amido propyl hydroxysultaine (alkyl amido hydroxysultaine) 15; this significant change in the Mulliken atomic charges confirms that in supramolecular complex 16, sodium atom Na1 is coordinated with oxygen atoms O1 and O12 and encapsulated between the two pentyl amido propyl hydroxysultaine (alkyl amido hydroxysultaine) 15 molecules and the sodium trans-dodec-1-en-1-sulfonate (sodium alkenyl sulfonate) 13 molecule. Furthermore, Table 13 results show that the Mulliken atomic charge on supramolecular complex 16 sodium atom Na2 is reduced by 0.221 units with regard to the charge that this atom has in sodium 3-hydroxy-dodecyl-1-sulfonate (sodium alkyl hydroxy sulfonate) compound 14, whereas the atomic charges from oxygen atoms O3 and O11 suffer a decrease of 0.158 and 0.051 units, with regard to pentyl amido propyl hydroxysultaine (alkyl amido propyl hydroxysultaine) 15; this significant change in the Mulliken atomic charges confirms that in supramolecular complex 16, sodium atom Na2 is coordinated with oxygen atoms O3 and O11 and encapsulated between the two pentyl-amido-propyl-hydroxysultaine (alkyl amido hydroxysultaine) 15 molecules and the sodium 3-hydroxy-dodecyl-1-sulfonate (sodium alkyl hydroxy sulfonate) 14 molecule. In addition to this, Table 13 results confirm the presence of a nanocavity in supramolecular complex 16, which might act as gas receptor and generate inclusion complexes that would behave as foaming agents in aqueous media.

TABLE 13

Mulliken atomic charges of compounds 13, 14, 15 are supramolecular complex 16.
*Supramolecular complex molecular model

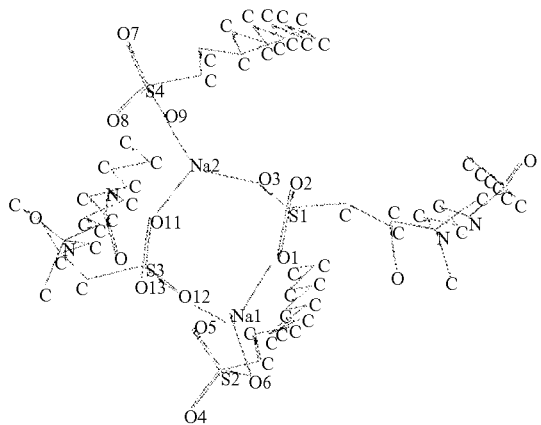

16
Atomic charge of compound or complex (e)

| Atom | 13 | 14 | 15 | 16 |
|---|---|---|---|---|
| O1 | | | −0.879 | −0.812 |
| O2 | | | −0.908 | −0.901 |
| O3 | | | −0.950 | −0.792 |
| O4 | −0.852 | | | −0.877 |
| O5 | −0.858 | | | −0.870 |
| O6 | −0.854 | | | −0.827 |
| O7 | | −0.842 | | −0.879 |
| O8 | | −0.845 | | −0.939 |
| O9 | | −0.850 | | −0.835 |
| O11 | | | −0.879 | −0.828 |
| O12 | | | −0.908 | −0.808 |
| O13 | | | −0.950 | −0.851 |
| Na1 | 0.609 | | | 0.300 |
| Na2 | | 0.619 | | 0.398 |
| S1 | | | 2.217 | 2.273 |
| S2 | 2.296 | | | 2.283 |
| S3 | | | 2.217 | 2.275 |
| S4 | | 2.227 | | 2.256 |

*Hydrogen atoms were removed for better visualization.

Example 5

By means of computational chemistry, and using the MNDO/d semi-empirical method as theoretical level, the geometry of compounds sodium trans-dodec-1-en-1-sulfonate (sodium alkenyl sulfonate) 17, sodium 2-hydroxy-dodecyl-1-sulfonate (sodium alkyl hydroxy sulfonate) 18 and pentyl amido propyl hydroxysultaine (alkyl amido hydroxysultaine) 19, as well as the geometry of the supramolecular complex resulting from the interaction of the three aforementioned compounds, were optimized in the gas phase at 1:1:2 molecular ratios 20 (10).

(10)

The energetic results, the most relevant bond distances and the main Mulliken atomic charges for said complexes and the corresponding supramolecular complex are shown in Tables 14, 15 and 16, respectively.

Table 14 results analysis shows that the formation of supramolecular complex 20 from the 1:1:2 molecular interaction of compounds 17, 18 and 19 would be strongly favored from the thermodynamic point of view. Additionally, the −291.521 kJ/mol interaction energy indicates that ion-ion-type supramolecular interactions and/or a combination of ion-dipole interactions and hydrogen bonds would be present.

TABLE 14

Energy of compounds 17, 18 and 19 and supramolecular complex 20 obtained with the MNDO/d semi-empiric method

| | MNDO/d semi-empiric method | |
|---|---|---|
| Compound or Complex | Total energy (kJ/mol) | Interaction Energy (kJ/mol) |
| 17 | −292,099.739 | |
| 18 | −326,010.249 | |
| 19 | −427,571.250 | |
| 20 | −1,473,544.009 | −291.521 |

Where:
17=sodium trans-dodec-1-en-1-sulfonate
18=sodium 2-hydroxy-dodecyl-1-sulfonate
19=pentyl-amido-propyl-hydroxysultaine
20=Supramolecular complex resulting from the interaction of sodium trans-dodec-1-en-1-sulfonate, sodium 2-hydroxy-dodecyl-1-sulfonate and pentyl-amido-propyl-hydroxysultaine at a 1:1:2 molecular ratio.

The analysis of Tables 15 and 16 results indicates that supramolecular complex 20 shows a nanocavity and that the sodium atoms have been encapsulated and, therefore, it might act as gas receptor and generate inclusion complexes that, in aqueous media, would behave as foaming agents tolerant to brines containing large quantities of divalent ions and to high temperatures.

Example 6

By means of computational chemistry, and using the MNDO/d semi-empirical method as theoretical level, the geometries of compounds sodium trans-dodec-1-en-1-sulfonate (sodium alkenyl sulfonate) 21, sodium 2-hydroxy-dodecyl-1-sulfonate (sodium alkyl hydroxy sulfonate) 22 and decyl hydroxysultaine (alkyl amido hydroxysultaine) 23, as well as the geometry of supramolecular complex resulting from the interaction of the three aforementioned compounds were optimized in the gas phase at 1:1:2 molecular ratios 24 (11).

TABLE 15

Main bond distances in compounds 17, 18, 19 and in supramolecular complex 20.
*Supramolecular complex molecular model

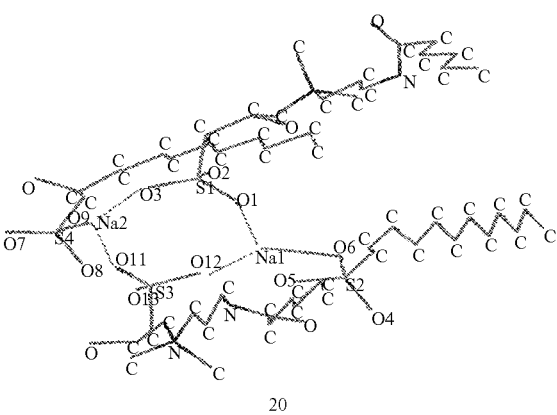

20

| | Bond distance in the compound or complex (Å) | | | |
|---|---|---|---|---|
| Bond or interaction | 17 | 18 | 19 | 20 |
| O1 . . . Na1 | | | | 2.247 |
| O3 . . . Na2 | | | | 2.235 |
| O6 . . . Na1 | | 2.237 | | 2.310 |

TABLE 15-continued

| | | | |
|---|---|---|---|
| O9 ... Na2 | | 2.245 | 2.130 |
| O11 ... Na2 | | | 2.214 |
| O12 ... Na1 | | | 2.178 |
| S1-O1 | | 1.505 | 1.524 |
| S1-O2 | | 1.510 | 1.510 |
| S1-O3 | | 1.517 | 1.520 |
| S2-O4 | 1.501 | | 1.505 |
| S2-O5 | 1.548 | | 1.537 |
| S2-O6 | 1.547 | | 1.536 |
| S3-O11 | | 1.510 | 1.530 |
| S3-O12 | | 1.505 | 1.526 |
| S3-O13 | | 1.517 | 1.501 |
| S4-O7 | 1.501 | | 1.505 |
| S4-O8 | 1.545 | | 1.516 |
| S4-O9 | 1.547 | | 1.538 |

*Hydrogen atoms have been removed for better visualization

TABLE 16

Mulliken atomic charges of compounds 17, 18, 19 and supramolecular complex 20.
*Supramolecular complex molecular model

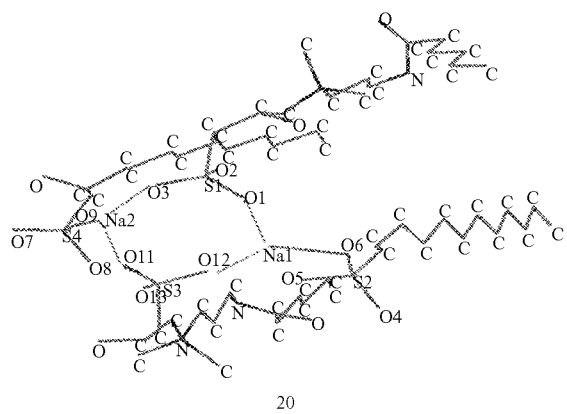

| | Compound or complex atomic charge (e) | | | |
|---|---|---|---|---|
| Atom | 17 | 18 | 19 | 20 |
| O1 | | | −0.879 | −0.812 |
| O2 | | | −0.908 | −0.898 |
| O3 | | | −0.950 | −0.790 |
| O4 | −0.852 | | | −0.877 |
| O5 | −0.858 | | | −0.870 |
| O6 | −0.854 | | | −0.827 |
| O7 | | −0.849 | | −0.874 |
| O8 | | −0.849 | | −0.936 |
| O9 | | −0.845 | | −0.835 |
| O11 | | | −0.879 | −0.828 |
| O12 | | | −0.908 | −0.809 |
| O13 | | | −0.950 | −0.851 |
| Na1 | 0.609 | | | 0.301 |
| Na2 | | 0.621 | | 0.395 |
| S1 | | | 2.217 | 2.274 |
| S2 | 2.296 | | | 2.283 |
| S3 | | | 2.217 | 2.275 |
| S4 | | 2.229 | | 2.256 |

*Hydrogen atoms have been removed for better visualization

The energetic results, the most relevant bond distances and the main Mulliken atomic charges for said complexes, as well as the corresponding supramolecular complex are shown in Tables 17, 18 and 19, respectively.

TABLE 17

Energy of compounds 21, 22, 23 and supramolecular complex 24 obtained with the semi-empiric method MNDO/d

| | Semi-empiric method MNDO/d | |
|---|---|---|
| Compound or Complex | Total energy (kJ/mol) | Interaction Energy (kJ/mol) |
| 21 | −292,099.739 | |
| 22 | −326,010.249 | |
| 23 | −392,976.201 | |
| 24 | −1,404,343.201 | −280.811 |

Where:
21=sodium trans-dodec-1-en-1-sulfonate
22=sodium 2-hydroxy-dodecyl-1-sulfonate
23=decyl-hydroxysultaine
24=Supramolecular complex resulting from the interaction of sodium trans-dodec-1-en-1-sulfonate, sodium 2-hydroxy-dodecyl-1-sulfonate and decyl-hydroxysultaine at a 1:1:2 molecular ratio.

The analysis of Table 17 results shows that the formation of supramolecular complex 24 from the 1:1:2 molecular interaction of compounds 21, 22 and 23 would be strongly favored from the thermodynamic point of view. Additionally, the −280.811 kJ/mol interaction energy indicates that ion-ion-type supramolecular interactions and/or a combination of ion-dipole interactions and hydrogen bonds would be present.

The analysis of Tables 18 and 19 results indicates that supramolecular complex 24 has a nanocavity and that the sodium atoms have been encapsulated and, therefore, it could act as gas receptor and generate inclusion complexes that, in aqueous media, would behave as foaming agents tolerant to brines containing large quantities of divalent ions and to high temperatures.

Once demonstrated by means of computational chemistry that the alkyl amido propyl hydroxysultaines or alkyl hydroxysultaines self-assembly process with sodium alkyl hydroxy sulfonates and sodium alkenyl sulfonates is thermodynamically favored and generates supramolecular complexes presenting nanocavities, by means of molecular simulation, the ability of these nanocavities to behave as receptors of gases that are used throughout the world to generate foams with application in enhanced recovery processes and/or mobility control was then determined, and the results obtained in the cases of methane, propane, nitrogen and carbon dioxide are the following:

Example 7

By means of computational chemistry, and using the MNDO/d semi-empirical method as theoretical level, the geometry of the molecular complex resulting from the interaction of compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl amido propyl hydroxysultaine (alkyl amido hydroxysultaine) 27 were optimized in the gas phase at 1:1:2 molecular ratios 28, as were the geometry of methane 29 and the geometry of the inclusion complex 30 generated by the interaction of complex 28 with methane 29 (12), and the energetic results obtained for the inclusion process (13) are shown in Table 20.

The analysis of table 20 results shows that the formation of supramolecular complex 30 by the interaction of nanocavity 28 with methane 29 would be favored from the thermodynamic point of view. Additionally, the −5.814 kJ/mol interaction energy indicates Van der Waals-type supramolecular interactions would be present and hence, supramolecular complex 28 might be used as foaming agent to control fluid channeling problems in wells where methane is used as gas to generate foam.

TABLE 18

Main bond distances in compounds 21, 22, 23 and in supramolecular complex 24.
*Supramolecular complex molecular model

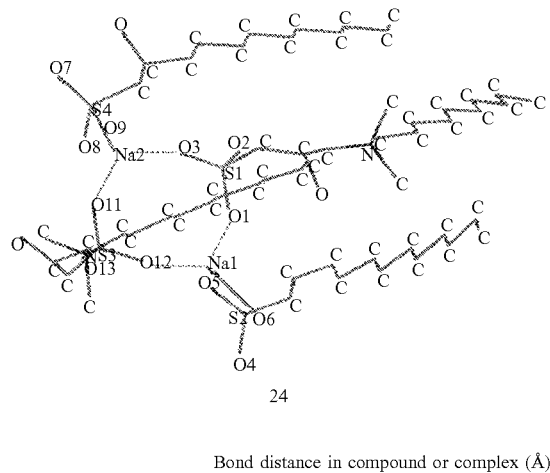

24

| Bond or interaction | Bond distance in compound or complex (Å) | | | |
|---|---|---|---|---|
| | 21 | 22 | 23 | 24 |
| O1 . . . Na1 | | | | 2.247 |
| O3 . . . Na2 | | | | 2.225 |
| O6 . . . Na1 | 2.237 | | | 2.310 |
| O9 . . . Na2 | | 2.245 | | 2.123 |
| O11 . . . Na2 | | | | 2.218 |
| O12 . . . Na1 | | | | 2.181 |
| S1-O1 | | | 1.505 | 1.524 |
| S1-O2 | | | 1.510 | 1.524 |
| S1-O3 | | | 1.517 | 1.519 |
| S2-O4 | 1.501 | | | 1.506 |
| S2-O5 | 1.548 | | | 1.537 |
| S2-O6 | 1.547 | | | 1.535 |
| S3-O11 | | | 1.510 | 1.529 |
| S3-O12 | | | 1.505 | 1.526 |
| S3-O13 | | | 1.517 | 1.501 |
| S4-O7 | | 1.501 | | 1.504 |
| S4-O8 | | 1.545 | | 1.514 |
| S4-O9 | | 1.547 | | 1.538 |

*Hydrogen atoms were removed for better visualization

TABLE 19

Mulliken atomic charges of compounds 21, 22, 23 and supramolecular complex 24.
*Supramolecular complex molecular model

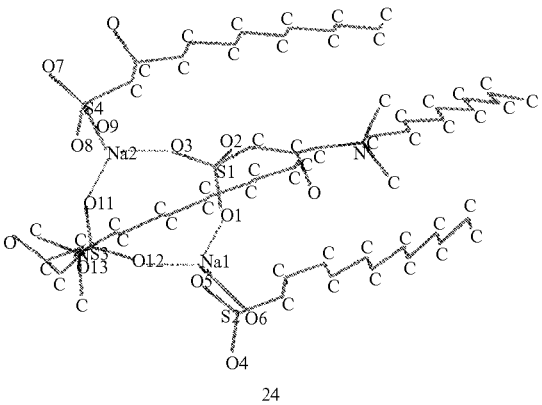

24

| | Compound or complex atomic charge (e) | | | |
|---|---|---|---|---|
| Atom | 21 | 22 | 23 | 24 |
| O1 | | | −0.878 | −0.811 |
| O2 | | | −0.907 | −0.899 |
| O3 | | | −0.952 | −0.789 |
| O4 | −0.852 | | | −0.879 |
| O5 | −0.858 | | | −0.868 |
| O6 | −0.854 | | | −0.826 |
| O7 | | −0.849 | | −0.875 |
| O8 | | −0.849 | | −0.932 |
| O9 | | −0.845 | | −0.837 |
| O11 | | | −0.878 | −0.827 |
| O12 | | | −0.907 | −0.809 |
| O13 | | | −0.952 | −0.852 |
| Na1 | 0.609 | | | 0.303 |
| Na2 | | 0.621 | | 0.396 |
| S1 | | | 2.218 | 2.273 |
| S2 | 2.296 | | | 2.281 |
| S3 | | | 2.218 | 2.274 |
| S4 | | 2.229 | | 2.257 |

*Hydrogen atoms were removed for better visualization

TABLE 20

Supramolecular complex 28, compound 29 and inclusion complex 30 energies obtained with the MNDO/d semi-empiric method

| | MNDO/d semi-empiric method | |
|---|---|---|
| Compound or Complex | Total energy (kJ/mol) | Interaction Energy (kJ/mol) |
| 28 | −1,246,965.736 | |
| 29 | −17,871.020 | |
| 30 | −1,264,842.57 | −5.814 |

Where:
28=Supramolecular complex resulting from the sodium trans-non-2-en-1-sulfonate, sodium 3-hydroxy-hexyl-1-sulfonate and ethyl-amido-propyl-hydroxysultaine interaction at a 1:1:2 molecular ratio.
29=methane
30=Inclusion complex resulting from the interaction of supramolecular complex 28 with methane 29.

Example 8

By means of computational chemistry, and using the MNDO/d semi-empirical method as theoretical level, the geometry of the molecular complex resulting from the interaction of the compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl amido propyl hydroxysultaine (alkyl amido hydroxysultaine) 27 was optimized in the gas phase at 1:1:2 molecular ratios 28, as were the geometry of carbon dioxide 31 and the geometry of inclusion complex 32 generated by the interaction of complex 28 with carbon dioxide 31 (14), and the energetic results obtained for the inclusion process (15) are shown in Table 21.

The analysis of Table 21 results shows that the formation of inclusion complex 32 by the interaction of nanocavity 28 with carbon dioxide 31 would be favored from the thermodynamic point of view. Additionally, the −4.952 kJ/mol interaction energy indicates that Van der Waals-type supramolecular interactions would be present and, therefore, supramolecular complex 28 might be used as foaming agent to control fluid channeling problems in wells where carbon dioxide is used as gas to generate foam.

TABLE 21

Supramolecular complex 28, compound 31 and inclusion complex 32 energies obtained with the MNDO/d semi-empiric method

| Compound or Complex | MNDO/d semi-empiric method | |
|---|---|---|
| | Total energy (kJ/mol) | Interaction Energy (kJ/mol) |
| 28 | −1,246,965.736 | |
| 31 | −74,544.802 | |
| 32 | −1,321,515.490 | −4.952 |

Where:
28=Supramolecular complex resulting from the interaction of sodium trans-non-2-en-1-sulfonate, sodium 3-hydroxy-hexyl-1-sulfonate and ethyl-amido-propyl-hydroxy-sultaine at a 1:1:2 molecular ratio.
31=Carbon dioxide
32=Inclusion complex resulting from the interaction of supramolecular complex 28 with carbon dioxide 31.

Example 9

By means of computational chemistry, and using the MNDO/d semi-empirical method as theoretical level, the geometry of the molecular complex resulting from the interaction of the compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl amido propyl hydroxysultaine (alkyl amido hydroxysultaine) 27 was optimized in the gas phase at 1:1:2 molecular ratios 28, as were the geometry of nitrogen 33 and the geometry of inclusion complex 34 generated by the interaction of complex 28 with nitrogen 33 (16), and the energetic results obtained for the inclusion process (17) are shown in Table 22.

The analysis of Table 22 results shows that the formation of inclusion complex 34 from the interaction of nanocavity 28 with nitrogen 31 would be favored from the thermodynamic point of view. Additionally, the −3.827 kJ/mol interaction energy indicates that Van der Waals-type supramolecular interactions would be present and, therefore, supramolecular complex 28 might be used as foaming agent to control fluid channeling problems in wells where nitrogen is used as gas to generate foam.

TABLE 22

Supramolecular complex 28, compound 33 and inclusion complex 34 energies obtained with the MNDO/d semi-empiric method

| Compound or Complex | MNDO/d semi-empiric method | |
|---|---|---|
| | Total energy (kJ/mol) | Interaction Energy (kJ/mol) |
| 28 | −1,246,965.736 | |
| 33 | −40,027.922 | |
| 34 | −1,286,997.484 | −3.827 |

Where:
28=Supramolecular complex resulting from the interaction of sodium trans-non-2-en-1-sulfonate, sodium 3-hydroxy-hexyl-1-sulfonate and ethyl-amido-propyl-hydroxy-sultaine at a 1:1:2 molecular ratio.
33=Nitrogen
34=Inclusion complex resulting from the interaction of supramolecular complex 28 with nitrogen 33.

Example 10

By means of computational chemistry, and using the MNDO/d semi-empirical method as theoretical level, the geometry of the molecular complex resulting from the interaction of the compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl-amido-propyl-hydroxysultaine (alkyl amido hydroxysultaine) 27 was optimized in the gas phase at 1:1:2 molecular ratios 28, as were the geometry of n-propane 35 and the geometry of inclusion complex 36 generated by the interaction of complex 28 with n-propane 35 (18), and the energetic results obtained for the inclusion process (19) are shown in Table 23.

Table 23 results analysis shows that the formation of inclusion complex 36 by the interaction of nanocavity 28 with n-propane 35 would be favored from the thermodynamic point of view. Additionally, the −12.172 kJ/mol interaction energy indicates that Van der Waals-type supramolecular interactions would be present and that, therefore, supramolecular complex 28 might be used as foaming agent to control fluid channeling problems in wells where n-propane is used as gas to generate foam.

TABLE 23

Supramolecular complex 28, compound 35 and inclusion complex 36 energies obtained with the MNDO/d semi-empiric method

| Compound or Complex | MNDO/d semi-empiric method | |
|---|---|---|
| | Total energy (kJ/mol) | Interaction Energy (kJ/mol) |
| 28 | −1,246,965.736 | |
| 35 | −48,096.517 | |
| 36 | −1,295,074.424 | −12.178 |

Where:
28=Supramolecular complex resulting from the interaction of sodium trans-non-2-en-1-sulfonate, sodium 3-hydroxy-hexyl-1-sulfonate and ethyl-amido-propyl-hydroxy-sultaine at a 1:1:2 molecular ratio.
35=n-propane
36=Inclusion complex resulting from the interaction of supramolecular complex 28 with n-propane 35.

Once demonstrated by means of computational chemistry that the self-assembly process of alkyl amido propyl hydroxysultaines or alkyl hydroxysultaines with sodium alkyl hydroxy sulfonates and sodium alkenyl sulfonates is thermodynamically favored and generates supramolecular complexes with nanocavities able to act as receptors of gases that are used throughout the world to generate foams with application in enhanced recovery and/or mobility control processes, using molecular simulation, the ability of said supramolecular complexes to sequester divalent ions such as calcium, magnesium, strontium or barium was determined, with the following results obtained for calcium chloride:

Example 11

By means of computational chemistry, and using quantum methods that employ the Density Functional Theory and the LDA-VWN functional, in a water-solvated medium (dielectric constant 78.54), the geometry of supramolecular complex resulting from the interaction of compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl amido propyl hydroxysultaine (alkyl amido hydroxysultaine) 27 was optimized at 1:1:1 molecular ratios 37, as were the geometry of $CaCl_2$ 38 and the geometry of supramolecular complex 39 generated by the interaction of 2 units from supramolecular complex 37 with $CaCl_2$ 38 (20) and the energetic results obtained for the $CaCl_2$ 38 sequestration process (21) are shown in Table 24.

TABLE 24

Supramolecular complex 37, compound 38 and $CaCl_2$-sequestering process-derived compound 39 energies obtained with the Density Functional Theory and the LDA-VWN functional in a water-solvated medium.

| | Density functional theory, LDA-VWN functional | |
|---|---|---|
| Compound or Complex | Total energy (kJ/mol) | Interaction Energy (kJ/mol) |
| 37 | −20,815,001.92 | −173.212 |
| 38 | −4,186,513.623 | |
| 39 | −25,001,688.75 | |

Where:
37=Supramolecular complex resulting from the interaction of sodium trans-non-2-en-1-sulfonate, sodium 3-hydroxy-hexyl-1-sulfonate and ethyl-amido-propyl-hydroxysultaine at a 1:1:1 molecular ratio.
38=Calcium chloride
39=Supramolecular complex generated by the interaction of 2 units from supramolecular complex 37 with $CaCl_2$.

The analysis of Table 24 results shows that the formation of supramolecular complex 39 by the interaction of two units from supramolecular complex 37 with calcium chloride 38 would be favored from the thermodynamic point of view. Additionally, the −173.212 kJ/mol interaction energy indicates that in the calcium ions sequestering process by supramolecular complex 37, ion-dipole-type supramolecular interactions would be present and thus, in an aqueous medium, supramolecular complex 37 molecular weight would increase as a function of the concentration of divalent ions present in the solution. This aspect is relevant in enhanced recovery processes where the use of surfactants and brines with high contents of divalent ions is intended in order to increase the recovery factor, since with supramolecular complex 37 the viscosity of the brine could be significantly increased, thereby reducing the mobility of the displacing fluid and thus generating a larger hydrocarbon volumetric sweep.

Example 12

By means of computational chemistry, and using quantum methods that employ the Density Functional Theory and the GGA-PBE functional, in a water-solvated medium (dielectric constant 78.54), the geometry of supramolecular complex resulting from the interaction of compounds sodium trans-non-2-en-1-sulfonate (sodium alkenyl sulfonate) 25, sodium 3-hydroxy-hexyl-1-sulfonate 26 (sodium alkyl hydroxy sulfonate) and ethyl amido propyl hydroxysultaine (alkyl amido hydroxysultaine) 27 was optimized at 1:1:2 molecular ratios 28, as were the geometry of $CaCl_2$ 38 and the geometry of supramolecular complex 40 generated by the interaction of 2 units from supramolecular complex (nanocavity) 28 with $CaCl_2$ 38 (22) and the energetic results obtained for the $CaCl_2$ 38 sequestration process (23) are shown in Table 25.

The analysis of Table 25 results shows that the formation of supramolecular complex 40 by the interaction of two units from supramolecular complex 28 with calcium chloride 38 would be favored from the thermodynamic point of view. Additionally, the −278.010 kJ/mol interaction energy indicates that in the calcium ions sequestration process by supramolecular complex 28, ion-dipole-type supramolecular interactions would be present and, therefore, in an aqueous medium, supramolecular complex 28 molecular weight would increase as a function of the concentration of divalent ions present in the solution.

TABLE 25

Supramolecular complex 28, compound 38 and $CaCl_2$ 40-sequestration process-derived complex energies obtained with the Density Functional Theory and the GGA-PBE functional in a water-solvated medium.

| | Density functional theory, GGA-PBE functional | |
|---|---|---|
| Compound or Complex | Total energy (kJ/mol) | Interaction Energy (kJ/mol) |
| 28 | −12,793,323.940 | −278.010 |
| 38 | −4,197,515.942 | |
| 40 | −29,784,441.830 | |

Where:
28=Supramolecular complex resulting from the interaction of sodium trans-non-2-en-1-sulfonate, sodium 3-hydroxy-hexyl-1-sulfonate and ethyl-amido-propyl-hydroxysultaine at a 1:1:1 molecular ratio.
38=Calcium chloride.
40=Supramolecular complex generated by the interaction of 2 units from supramolecular complex 28 with $CaCl_2$.

Once demonstrated by means of computational chemistry that the supramolecular complexes resulting from the self-assembly process of alkyl amido propyl hydroxysultaines or alkyl hydroxysultaines with sodium alkyl hydroxysulfonates and sodium alkenyl sulfonates have the ability to sequester divalent ions, such as calcium, and that this aspect impacts by increasing their molecular weight as a function of the concentration of divalent ions present in the solution, by means of molecular simulation, the ability of said molecular complexes to alter the wettability of carbonate rocks such as limestone and dolomite was then determined. For this purpose, the fact that the polar organic compounds present in heavy organic fractions of hydrocarbon, such as asphaltenes and resins, are responsible for carbonate rocks being wettable to oil is considered (International-Mexican Congress on Chemical Reaction Engineering; Ixtapa-Zihuatanejo, Guerrero, Mexico, Jun. 10-15, 2012, 162-163; Abstract: Theoretical and Experimental Study of Ion-Dipole Pair Formation and its Impact on Spontaneous Water Imbibition Processes in Fractured Carbonate Reservoirs) and that in order for the wettability of the rock to be altered it is required that, thermodynamically, the supramolecular complexes object of this invention displace said fractions from the surface of the rock. Additionally, to represent the asphaltenes or resins, average molecular structure models that globally represent their physicochemical properties are used (Energy & Fuels, 2000, 14, 6-10, Asphaltenes: Structural Characterization, Self-Association, and Stability Behavior; García-Martínez; J.; Tesis de Maestría. 2004; Una aproximación a la estructura molecular de asfaltenos separados de aceites crudos mexicanos; Facultad de Estudios Superiores Cuautitlán de la Universidad Nacional Autónoma de México; México).

Example 13

By means of computational chemistry, and using quantum methods that employ the Density Functional Theory and the LDA-VWN functional, in a water-solvated medium (dielectric constant 78.54), the geometry of supramolecular complex resulting from the interaction of compounds sodium trans-dodec-2-en-1-sulfonate (sodium alkenyl sulfonate) 41, sodium 3-hydroxy-dodecyl-1-sulfonate 42 (sodium alkyl hydroxysulfonate) and undecyl amido propyl hydroxysultaine (alkyl amido hydroxysultaine) 43 was optimized at 1:1:1 molecular ratios 44, as were the geometry of calcite ($CaCO_3$) surface 45 and the geometry of adsorption product 46 generated by the interaction of supramolecular complex 44 with calcite ($CaCO_3$) surface 45 (24) and the energetic results obtained for the adsorption process of supramolecular complex 44 on calcite ($CaCO_3$) surface 45 (25) are shown in table 26.

The analysis of table 26 results shows that the adsorption process of supramolecular complex 44 on calcite ($CaCO_3$) surface 45 is favored from the thermodynamic point of view.

TABLE 26

Energetic results obtained for the adsorption process of supramolecular complex 44 on calcite surface ($CaCO_3$) 45 obtained with the Density Functional Theory and the LDA-VWN functional in a water-solvated medium.

| Compound or Complex | Density functional theory, LDA-VWN functional | |
|---|---|---|
| | Total energy (kJ/mol) | Interaction Energy (kJ/mol) |
| 44 | −11123870.531 | −813.541 |
| 45 | −295713262.347 | |
| 46 | −306837946.420 | |

Where:
44=Supramolecular complex resulting from the interaction of sodium trans-dodec-2-en-1-sulfonate, sodium 3-hydroxy-dodecyl-1-sulfonate and undecyl-amido-propyl-hydroxysultaine at a 1:1:1 molecular ratio.
45=Calcite ($CaCO_3$) surface.
46=Adsorption product generated by the interaction of supramolecular complex 44 with calcite ($CaCO_3$) surface 45.

Example 14

By means of computational chemistry, and using quantum methods that employ the Density Functional Theory and the LDA-VWN functional, the geometry of a molecular structure model of asphaltene representing the characteristics of a heavy oil from the Sea Region in Mexico (García-Martínez; J.; Tesis de Maestría. 2004; Una aproximación a la estructura molecular de asfaltenos separados de aceites crudos mexicanos; Facultad de Estudios Superiores Cuautitlán de la Universidad Nacional Autónoma de México; México) 47, the geometry of calcite ($CaCO_3$) surface 45 and the geometry of adsorption product 48 generated by the interaction of asphaltene molecular structure model 47 with calcite ($CaCO_3$) surface 45 (26) were optimized in a water-solvated medium (dielectric constant 78.54), and the energetic results obtained for the adsorption process of asphaltene molecular structure model 47 on calcite ($CaCO_3$) (27) are shown in Table 27.

TABLE 27

Energetic results for the adsorption process of an asphaltene molecular surface model 47 on calcite ($CaCO_3$) surface 45 obtained with the Density Functional Theory and functional LDA-VWN in a water-solvated medium.

| Compound or Complex | Density functional theory, LDA-VWN functional | |
|---|---|---|
| | Total energy (kJ/mol) | Interaction Energy (kJ/mol) |
| 45 | −295713262.347 | −789.798 |
| 47 | −7,229,540.274 | |
| 48 | −302943592.420 | |

Where:
45=Calcite ($CaCO_3$) surface.
47=Asphaltene molecular structure model representing the characteristics of a heavy oil from the Sea Region in Mexico.
48=Adsorption product generated by the interaction of asphaltene molecular structure model 47 with calcite ($CaCO_3$) surface 45.

The analysis of table 27 results shows that the adsorption process of asphaltene molecular structure model 47 on calcite ($CaCO_3$) surface 45 is favored from the thermodynamic point of view.

Example 15

By means of computational chemistry, and using quantum methods that employ the Density Functional Theory and the LDA-VWN functional, the geometry of water 49, the geometry of calcite ($CaCO_3$) surface 45 and the geometry of adsorption product 50 generated by the interaction of water 49 with calcite ($CaCO_3$) surface 45 (28) were optimized in a water-solvated medium (dielectric constant 78.54), and the energetic results obtained for the adsorption process of water 49 on calcite ($CaCO_3$) surface 45 (29) are shown in Table 28.

TABLE 28

Energetic results for the adsorption process of water 49 on calcite (CaCO₃) surface 45 obtained with the Density Functional Theory and the LDA-VWN functional in a water-solvated medium.

| | Density functional theory, LDA-VWN functional | |
|---|---|---|
| Compound or Complex | Total energy (kJ/mol) | Interaction Energy (kJ/mol) |
| 45 | −295713262.347 | −113.236 |
| 49 | −199,362.156 | |
| 50 | −295,912,737.700 | |

Where:
45=Calcite ($CaCO_3$) surface.
49=Molecular structure of the water
50=Adsorption product generated by the interaction of water 49 with calcite ($CaCO_3$) surface 45.

The analysis of Table 28 results shows that the adsorption process of water 49 on calcite ($CaCO_3$) surface 45 is favored from the thermodynamic point of view.

A comparison of the adsorption results obtained by means of molecular simulation in the cases of supramolecular complex 44, the asphaltene molecular structure model representing the characteristics of a heavy oil from the Sea Region in Mexico 47 and water 49 on calcite ($CaCO_3$) surfaces 45 indicates that, thermodynamically, supramolecular complex 44 would displace asphaltene 47 from calcite ($CaCO_3$) surface 45 and thus, it would have the capability to alter the wettability of the rock; additionally, observations also reveal that asphaltene 47 would have the capability to displace water 49 from calcite ($CaCO_3$) surface 45 and this fact is consistent with the theory existing in the oil industry, that initially, in the porous medium (carbonate rock) there was water and that it was displaced by hydrocarbon over the years due to thermodynamic processes.

Once demonstrated by means of computational chemistry that the supramolecular complexes resulting from the self-assembly process of alkyl amido propyl hydroxysultaines or alkyl hydroxysultaines with sodium alkyl hydroxysulfonates and sodium alkenyl sulfonates have the ability to alter the wettability of the rock from oil-wettable to water-wettable, by means of molecular simulation, the capability of said molecular complexes to reduce the viscosity of heavy hydrocarbons with high contents of asphaltenes was then determined. To this end, the fact is considered that in order to reduce the viscosity of these hydrocarbons it is necessary to weaken the supramolecular interactions responsible for the aggregation of asphaltenes and for this it is required that the viscosity reducers form with them a guest-host complex, wherein the guest is the viscosity reducer and the host is the asphaltenes. The results obtained in the case of supramolecular complex 44 are the following:

Example 16

By means of computational chemistry, and using quantum methods that employ the Density Functional Theory and the LDA-VWN functional, the geometry of supramolecular complex resulting from the interaction of compounds sodium trans-dodec-2-en-1-sulfonate (sodium alkenyl sulfonate) 41, sodium 3-hydroxy-dodecyl-1-sulfonate 42 (sodium alkyl hydroxysulfonate) and undecyl amido propyl hydroxysultaine (alkyl amido hydroxysultaine) 43 was optimized in a water-solvated medium (dielectric constant 78.54) at 1:1:1 molecular ratios 44, as were the geometry of a dimer resulting from the interaction of two molecular structures from an asphaltene model representing the characteristics of a heavy oil from the Sea Region in Mexico 51 and the geometry of guest-host complex 52 generated by the interaction of supramolecular complex 44 with asphaltene dimer 51 (30), and the energetic results obtained for the guest-host complex 52 (31) formation process are shown in Table 29.

The analysis of Table 29 results shows that guest-host complex 52 formation process is favored from the thermodynamic point of view and, therefore, it is possible that supramolecular complex 44 may be used as viscosity reducer in heavy crude oils.

TABLE 29

Energetic results obtained with the Density Functional Theory and the LDA-VWN functional in a water-solvated medium for guest-host complex 52 formation process by the interaction of supramolecular complex 44 with asphaltene dimer 51

| | Density functional theory, LDA-VWN functional | |
|---|---|---|
| Compound or Complex | Total energy (kJ/mol) | Interaction Energy (kJ/mol) |
| 44 | −1,112,3870.531 | −474.783 |
| 51 | −14460253.447 | |
| 52 | −25687110.211 | |

Where:
44=Supramolecular complex resulting from the interaction of sodium trans-dodec-2-en-1-sulfonate, sodium 3-hydroxy-dodecyl-1-sulfonate and undecyl-amido-propyl-hydroxysultaine at a 1:1:1 molecular ratio.
51=Dimer from the interaction of two asphaltene molecular structure models representing the characteristics of a heavy oil from the Sea Region in Mexico
52=Guest-host complex generated by the interaction of supramolecular complex 44 with asphaltene dimer 51.

Once demonstrated, by means of computational chemistry, that the supramolecular complexes resulting from the self-assembly process of alkyl amido propyl hydroxysultaines or alkyl hydroxysultaines with sodium alkyl hydroxysulfonates and sodium alkenyl sulfonates have the ability to generate foams, alter the wettability of the rock, and reduce the viscosity of heavy crude oils, by means of molecular simulation, the capability of said molecular complexes to act as corrosion inhibitors in typical environments occurring in the oil industry was then determined. To this end, the fact is considered that for a product to act as a corrosion inhibitor, it has to form a protecting film on the metallic surface that is to be protected and that under the operating conditions present in the oil industry, the surfaces generated due to electrochemical processes and that have to be protected against corrosion consist mainly of hematite and/or pyrite (*Revista de la Sociedad Química de México* 2002, 46[4], 335-340; *Langmuir* 1996, 12, 6419-6428). The results obtained as corrosion inhibitor for supramolecular complex 56 resulting from the interaction of compounds sodium trans-non-2-en-1-sulfonate (sodium alkenyl sulfonate) 53, sodium 3-hydroxy-hexyl-1-sulfonate 54 (sodium alkyl hydroxysulfonate) and ethyl amido propyl hydroxysultaine (alkyl amido hydroxysultaine) 55 at 1:1:1 molecular ratios are the following:

Example 17

By means of computational chemistry, and using quantum methods that employ the Density Functional Theory and the LDA-VWN functional, the geometry of supramolecular complex resulting from the interaction of compounds sodium trans-non-2-en-1-sulfonate (sodium alkenyl sulfonate) 53, sodium 3-hydroxy-hexyl-1-sulfonate 54 (sodium alkyl hydroxysulfonate) and ethyl amido propyl hydroxysultaine (alkyl amido hydroxysultaine) 55 was optimized in a water-solvated medium (dielectric constant 78.54) at 1:1:1 molecular ratios 56, as was the geometry of hematite (a-$Fe_2O_3$) surface 57 and the geometry of adsorption product 58 generated by the interaction of supramolecular complex 56 with hematite (a-$Fe_2O_3$) surface 57 (32), and the energetic results obtained for the adsorption process of supramolecular complex 56 on hematite (a-$Fe_2O_3$) surface 57 (33) are shown in Table 30.

TABLE 30

Energetic results for the adsorption process of supramolecular complex 56 on hematite ($\alpha$-$Fe_2O_3$) surface 57 obtained with the Density Functional Theory and the LDA-VWN functional in a water-solvated medium.

| Compound or Complex | Density functional theory, LDA-VWN functional | |
|---|---|---|
| | Total energy (kJ/mol) | Interaction Energy (kJ/mol) |
| 56 | −9,281,383.014 | −3,443.136397 |
| 57 | −74,372,646.45 | |
| 58 | −83,657,472.61 | |

Where:

56=Supramolecular complex resulting from the interaction of sodium trans-non-2-en-1-sulfonate, sodium 3-hydroxy-hexyl-1-sulfonate and ethyl amido propyl hydroxysultaine (alkyl amido hydroxysultaine) at 1:1:1 molecular ratios.

57=Hematite (a-$Fe_2O_3$) surface

58=Adsorption product generated by the interaction of supramolecular complex 56 with hematite (a-$Fe_2O_3$) surface 57.

The analysis of Table 30 results shows that the adsorption process of supramolecular complex 56 on hematite (a-$Fe_2O_3$) surface 57 is favored from the thermodynamic point of view and, therefore, the formation of the protective film is spontaneous and supramolecular 56 might be used as corrosion inhibitor in environments that are characteristic of the oil industry.

Example 18

By means of computational chemistry, and using quantum methods that employ the Density Functional Theory and the LDA-VWN functional, the geometry of supramolecular complex resulting from the interaction of compounds sodium trans-non-2-en-1-sulfonate (sodium alkenyl sulfonate) 53, sodium 3-hydroxy-hexyl-1-sulfonate 54 (sodium alkyl hydroxy sulfonate) and ethyl-amido-propyl-hydroxysultaine (alkyl amido-hydroxysultaine) 55 was optimized in a water-solvated medium (dielectric constant 78.54) at 1:1:1 molecular ratios 56, as were the geometry of pyrite ($Fe_2S$) surface 59 and the geometry of adsorption product 60 generated by the interaction of supramolecular complex 56 with pyrite ($Fe_2S$) surface 59 (34), and the energetic results obtained for the adsorption process of supramolecular complex 56 on pyrite ($Fe_2S$) surface 59 (35) are shown in Table 31.

TABLE 31

Energetic results for the adsorption process of supramolecular complex 56 on pyrite ($Fe_2S$) surface 59 obtained with the Density Functional Theory and the LDA-VWN functional in a water-solvated medium.

| Compound or Complex | Density functional theory, LDA-VWN functional | |
|---|---|---|
| | Total energy (kJ/mol) | Interaction Energy (kJ/mol) |
| 56 | −9,281,383.014 | −2,609.009 |
| 59 | −289276093.932 | |
| 60 | −298560085.955 | |

Where:

56=Supramolecular resulting from the interaction of sodium trans-non-2-en-1-sulfonate, sodium 3-hydroxy-hexyl-1-sulfonate and ethyl amido propyl hydroxysultaine (alkyl amido hydroxysultaine) at 1:1:1 molecular ratios.

59=Pyrite ($Fe_2S$) surface.

60=Adsorption product generated by the interaction of supramolecular complex 56 with pyrite ($Fe_2S$) surface 59.

The analysis of Table 31 results shows that the adsorption process of supramolecular complex 56 on pyrite ($Fe_2S$) surface 59 is favored from the thermodynamic point of view and thus the formation of the protecting film is spontaneous and supramolecular complex 56 might be used as corrosion inhibitor in environments that are characteristic of the oil industry.

A comparison of the adsorption results obtained by means of molecular simulation for supramolecular complex 56 on hematite (a-$Fe_2O_3$) 57 and pyrite ($Fe_2S$) 59 surfaces indicates that the protecting film that supramolecular complex 56 would form on the hematite (a-$Fe_2O_3$) surface would be more stable than the film that it would form on pyrite ($Fe_2S$) surface 59 and that in both types of surfaces, supramolecular complex 56 might be used as corrosion inhibitor.

2) Supramolecular Complexes Synthesis.

The supramolecular complexes derived from the present invention are obtained according to the synthesis procedure (36) that consists in mixing sodium alkyl hydroxysulfonates, sodium alkenyl sulfonates with alkyl amido propyl hydroxysultaines or alkyl hydroxysultaines at room temperature and atmospheric pressure.

The molar ratio at which supramolecular complexes are formed is within the ranges of 1:1:7 to 7:7:1, respectively, with molar ratios within the range of 1:1:2 to 1:2:4 being preferred.

The formation of supramolecular complexes from sodium alkyl hydroxysulfonates, sodium alkenyl sulfonates with alkyl amido propyl hydroxysultaines or alkyl hydroxysultaines can be carried out in water, brines, alcohols or a water-alcohols mixture, with the aqueous medium being preferred. The supramolecular complex can be an aqueous mixture where the aqueous phase is water, seawater, brine or water present in the rock formations. The final concentration by weight of the supramolecular complexes in the mixture may vary from 0.1% to 50%, preferably within the range of 20% to 50% by weight.

Sodium Alkyl Hydroxyl Sulfonates+Sodium Alkenyl Sulfonates+Alkyl Amido Propylhydroxysultaines or Alkyl Hydroxysultaines→Supramolecular Complexes (36)

Sodium alkenyl sulfonates useful for the present invention include sodium but-2-en-1-sulfonate, sodium pent-2-en-1- sulfonate, sodium hex-2-en-1-sulfonate, sodium hept-2-en-1-sulfonate, sodium oct-2-en-1-sulfonate, sodium non-2-en-1-sulfonate, sodium dec-2-en-1-sulfonate, sodium undec-2-en-1-sulfonate, sodium dodec-2-en-1-sulfonate, sodium tetradec-2-en-1-sulfonate, sodium hexadec-2-en-1-sulfonate, sodium octadec-2-en-1-sulfonate, sodium eicos-2-en-1-sulfonate, sodium docos-2-en-1-sulfonate, sodium tetracos-2-en-1-sulfonate, sodium hexacos-2-en-1-sulfonate, sodium octacos-2-en-1-sulfonate and the mixture of two or more of these sodium alkenyl-sulfonates.

Sodium alkyl hydroxysulfonates useful for the present invention include sodium 3-hydroxybutane-1-sulfonate, sodium 3-hydroxypentane-1-sulfonate, sodium 3-hydroxyhexane-1-sulfonate, sodium 3-hydroxyheptane-1-sulfonate, sodium 3-hydroxyoctane-1-sulfonate, sodium 3-hydroxynonane-1-sulfonate, sodium 3-hydroxydecane-1-sulfonate, sodium 3-hydroxyundecane-1-sulfonate, sodium 3-hydroxydodecane-1-sulfonate, sodium 3-hydroxytetradecane-1-sulfonate, sodium 3-hydroxyhexadecane-1-sulfonate, sodium 2-hydroxybutane-1-sulfonate, sodium 2-hydroxypentane-1-sulfonate, sodium 2-hydroxyhexane-1-sulfonate, sodium 2-hydroxyheptane-1-sulfonate, sodium 2-hydroxyoctane-1-sulfonate, sodium 2-hydroxynonane-1-sulfonate, sodium 2-hydroxydecane-1-sulfonate, sodium 2-hydroxyundecane-1-sulfonate, sodium 2-hydroxydodecane-1-sulfonate, sodium 2-hydroxytetradecane-1-sulfonate and sodium 2-hydroxyhexadecane-1-sulfonate, sodium 2-hydroxyoctadecane-1-sulfonate, sodium 2-hydroxyeicosane-1-sulfonate, sodium 2-hydroxydocosane-1-sulfonate, sodium 2-hydroxytetracosane-1-sulfonate, sodium 2-hydroxyhexacosane-1-sulfonate, sodium 2-hydroxyoctacosane-1-sulfonate and the mixture of two or more of these sodium alkyl hydroxysulfonates.

Alkyl amido propyl hydroxysultaines useful for the present invention include ethyl-amido-propyl-hydroxysultaine, propyl-amido-propyl-hydroxysultaine, butyl-amido-propyl-hydroxysultaine, pentyl-amido-propyl-hydroxysultaine, hexyl-amido-propyl-hydroxysultaine, heptyl-amido-propyl-hydroxysultaine, octyl-amido-propyl-hydroxysultaine, nonyl-amido-propyl-hydroxysultaine, decyl-amido-propyl-hydroxysultaine, undecyl-amido-propyl-hydroxysultaine, dodecyl-amido-propyl-hydroxysultaine, tetradecyl-amido-propyl-hydroxysultaine, hexadecyl-amido-propyl-hydroxysultaine, octadecyl-amido-propyl-hydroxysultaine, coco-amido-propyl hydroxysultaine, octadecyl-hydroxysultaine, eucosyl-hydroxysultaine, docosyl-hydroxysultaine, tetracosyl-hydroxysultaine, hexacosyl-hydroxysultaine, octacosyl-hydroxysultaine and mixtures of two or more of these alkyl amido propyl hydroxysultaines.

Alkyl hydroxysultaines useful for the present invention include ethyl-hydroxysultaine, propyl-hydroxysultaine, butyl-hydroxysultaine, pentyl-hydroxysultaine, hexyl-hydroxysultaine, heptyl-hydroxysultaine, octyl-hydroxysultaine, nonyl-hydroxysultaine, decyl-hydroxysultaine, undecyl-hydroxysultaine, dodecyl-hydroxysultaine, tetradecyl-hydroxysultaine, hexadecyl-hydroxysultaine, coco-hydroxysultaine, eucosyl-amido-propyl hydroxysultaine, docosyl-amido-propyl hydroxysultaine, tetracosyl-amido-propyl hydroxysultaine, hexacosyl-amido-propyl hydroxysultaine, octacosyl-amido-propyl hydroxysultaine and mixtures of two or more of these alkyl hydroxysultaines.

The following examples will serve to illustrate the synthesis of the molecular complexes object of the present invention.

Example 19

In a 1000 mL two-neck round bottom flask supplied with a magnetic stirrer and a thermometer, 160.6 g of distilled water, 250.0 g of an aqueous solution containing 43.5% by weight (0.278 mol) of coco-amido-propyl-hydroxysultaine were mixed at room temperature and atmospheric pressure stirring vigorously with 81.0 g of an aqueous solution containing 47.8% by weight of a mixture of sodium 3-hydroxydodecane-1-sulfonate and sodium dodec-2-en-1-sulfonate, and which is characterized for having 47.4% by weight (0.0636 mol) of sodium 3-hydroxydodecane-1-sulfonate and 52.6% by weight (0.0753 mol) of sodium dodec-2-en-1-sulfonate. The mixture is stirred vigorously for 8 hours in order to produce 490.7 g of an amber-colored viscous liquid containing 30% by weight of the supramolecular complexes that are characterized for having as basic structural formula the one indicated in (36) and where R1 corresponds to the 2-hydroxyundecyl radical, R2 corresponds to the coco-amido-propyl radical and R3 corresponds to the dodec-2-enyl radical.

Example 20

In a 1000 mL two-neck round bottom flask supplied with a magnetic stirrer and a thermometer, 165.3 g of distilled water, 198 g of an aqueous solution containing 43.5% by weight (0.220 mol) of coco-amido-propyl-hydroxysultaine were mixed at room temperature and atmospheric pressure stirring vigorously with 128.5 g of an aqueous solution containing 47.8% by weight of a mixture of sodium 3-hydroxydodecane-1-sulfonate and sodium dodec-2-en-1-sulfonate, and which is characterized for containing 47.4% by weight (0.100 mol) of sodium 3-hydroxydodecane-1-sulfonate and 52.6% by weight (0.120 mol) of sodium dodec-2-en-1-sulfonate. The mixture is stirred vigorously for 8 hours in order to produce 490.4 g of an amber-colored viscous liquid containing 30% by weight of supramolecular complexes that are characterized for having as basic structural formula the one indicated in (36) and wherein R1 corresponds to the 2-hydroxyundecyl radical, R2 corresponds to the coco-amido-propyl radical and R3 corresponds to the dodec-2-enyl radical.

Example 21

In a 1000 mL two-neck round bottom flask supplied with a magnetic stirrer and a thermometer, 224.1 g of distilled water, 250 g of an aqueous solution containing 49% by weight (0.380 mol) of dodecyl-hydroxysultaine were mixed at room temperature and atmospheric pressure stirring vigorously with 110.9 g of an aqueous solution containing 47.8% by weight of a mixture of sodium 3-hydroxydodecane-1-sulfonate and sodium dodec-2-en-1-sulfonate, and which is characterized for containing 47.4% by weight (0.087 mol) of sodium 3-hydroxydodecane-1-sulfonate and 52.6% by weight (0.100 mol) of sodium dodec-2-en-1-sulfonate. The mixture is stirred vigorously for 8 hours in order to produce 584.8 g of an amber-colored viscous liquid containing 30% by weight of the supramolecular complexes that are characterized for having as basic structural formula the one indicated in (36) and wherein R1 corresponds to the 2-hydroxyundecyl radical, R2 corresponds to the dodecyl radical and R3 corresponds to the dodec-2-enyl radical.

3) Spectroscopic Characterization of the Supramolecular Complexes.

Example 22

Spectroscopic characterization through Magnetic Nuclear Resonance of $^1$H and $^{13}$C and Infrared of the supramolecular complex resulting from the interaction of coco-amido-propyl hydroxysultaine, sodium 3-hydroxydodecane-1-sulfonate and sodium dodec-2-en-1-sulfonate, whose synthesis process was described in example 19, and that is characterized for having as basic structural formula the one indicated in (36) and wherein R1 corresponds to the 2-hydroxyundecyle radical, R2 corresponds to the coco-amido-propyl radical and R3 corresponds to the dodec-2-enyl radical.

In the nuclear magnetic resonance $^1$H spectrum obtained in deuterated water from supramolecular complexes described in example 19, the following characteristic signs are observed: 1) multiple signals in the 3.14 to 3.29 interval for methyl protons H5 and H6 and 2) multiple signals in the 3.48 to 3.77 ppm interval for methylene protons H2 and H4 and methynic proton H3; whereas in the nuclear magnetic resonance $^1$H spectrum of the coco-amido-propyl hydroxysultaine used as raw material, the following characteristic signs are observed: 1) multiple signals in the interval of simple signals for methyl protons H5 and H6 in the 3.13 to 3.30 ppm interval, 2) multiple signals in the 3.51 to 3.67 interval for methylene protons H2 and H4 and methynic proton H3. The lack of protection suffered by methylene protons H2 and H4 and methynic proton H3 in the supramolecular complexes with regard to those present in coco-amido-propyl hydroxysultaine, indicates the existence of interactions that give rise to the supramolecular complexes object of the present invention (36).

In the supramolecular complexes nuclear magnetic resonance $^{13}$C spectrum, the following characteristic signs are observed: 1) a single signal for methynic carbon C3 that contains the hydroxyl group at 72.2 ppm, 2) single signals at the 62.6 to 67.4 ppm interval for methylene carbons C2 and C4, 3) single signals at the 51.7 to 52.1 ppm interval for methyl carbons C5 and C6, whereas in the nuclear magnetic resonance $^{13}$C spectrum of the coco-amido-propyl hydroxysultaine used as raw material, the following characteristic signals are observed: 1) a single signal for methynic carbon C3 that contains the hydroxyl group at 74.8 ppm, 2) single signals at the 62.6 to 67.4 ppm interval for methylene carbons C2 and C4, 3) single signals at the 54.7 to 54.9 ppm interval for methyl carbons C5 and C6. The protection experienced by methynic carbon C3 that contains the hydroxyl group in the supramolecular complexes with regard to those in coco-amido-propyl hydroxysultaine, indicates the existence of interactions that give rise to the supramolecular complex object of the present invention (36).

The infrared (IR) spectrum of example 19 supramolecular complexes was obtained by means of ATR and it shows the following main vibration bands: 1) A symmetric, intense, wide tension band at 1648 cm$^{-1}$ assigned to the vibration of the amide carbonyl group, 2) An asymmetric, intense, wide tension band at 1550 cm$^{-1}$ assigned to the amide carbonyl group vibration, 3) An asymmetric, intense, wide tension band at 1175 cm$^{-1}$ assigned to the sulfonate group vibration and 4) A symmetric middle-intensity tension band at 1037 cm$^{-1}$ assigned to sulfonate group vibration. Additionally, in the IR spectrum of the coco-amido-propyl hydroxysultaine used as raw material, the following characteristic signals are observed: 1) A symmetric, intense, wide tension band at 1641 cm$^{-1}$ assigned to the amide carbonyl group vibration, 2) An asymmetric, intense, wide tension band at 1549 cm$^{-1}$ assigned to the amide carbonyl group vibration, 3) An asymmetric, intense, wide tension band at 1189 cm$^{-1}$ assigned to the sulfonate group vibration and 4) A symmetric, middle-intensity tension band at 1039 cm$^{-1}$ assigned to the sulfonate group vibration.

The variations observed in the vibration frequencies of the amide and sulfonate groups in the supramolecular complexes with regard to those obtained in the coco-amido-propyl hydroxysultaine used as raw material, confirms the existence of interactions that give rise to the supramolecular complexes (36) object of the present invention.

Figure 7:
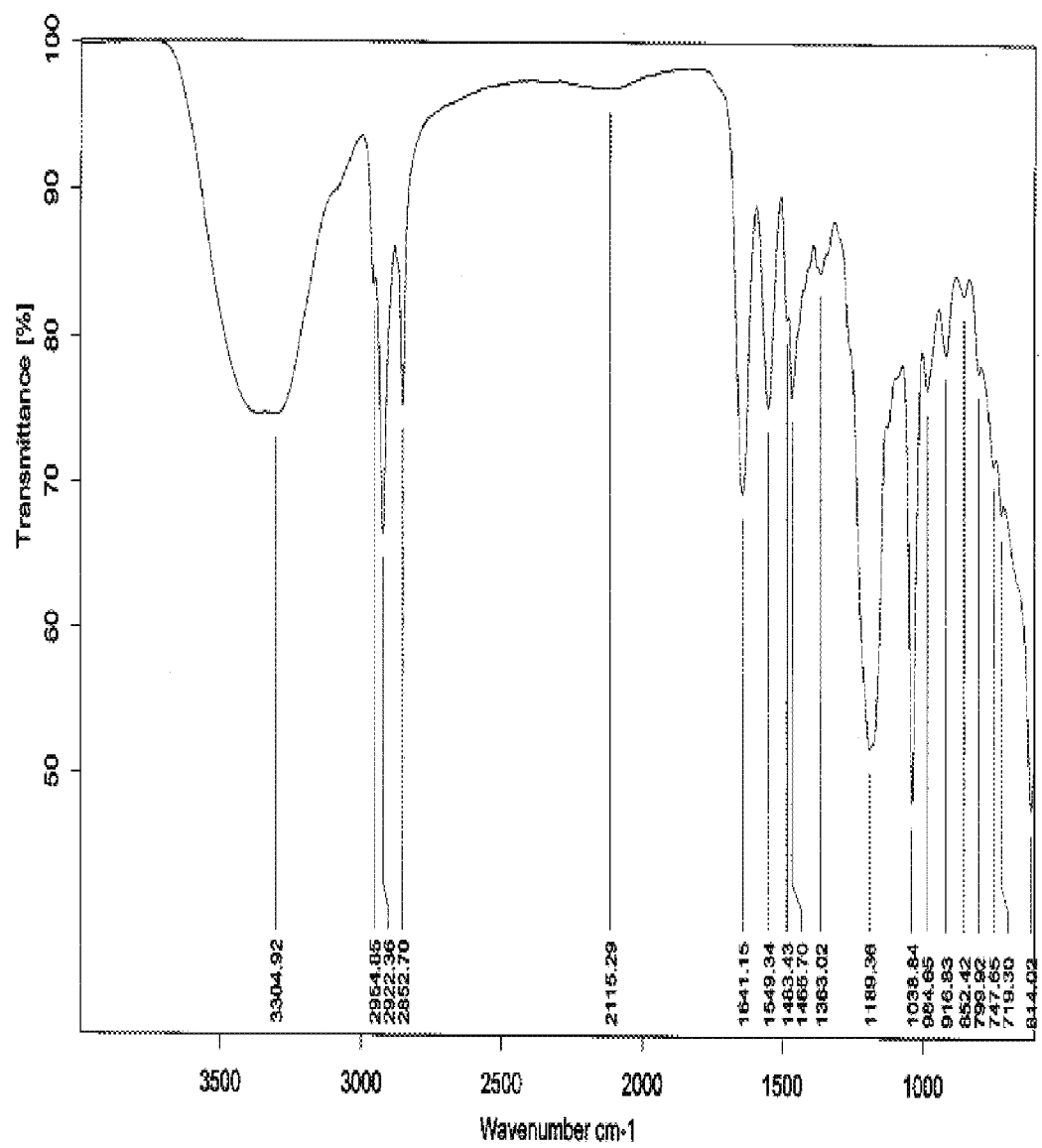
FIG. 7. Coco amido propyl hydrosultaine Infrared Spectrum.
Figure 8:
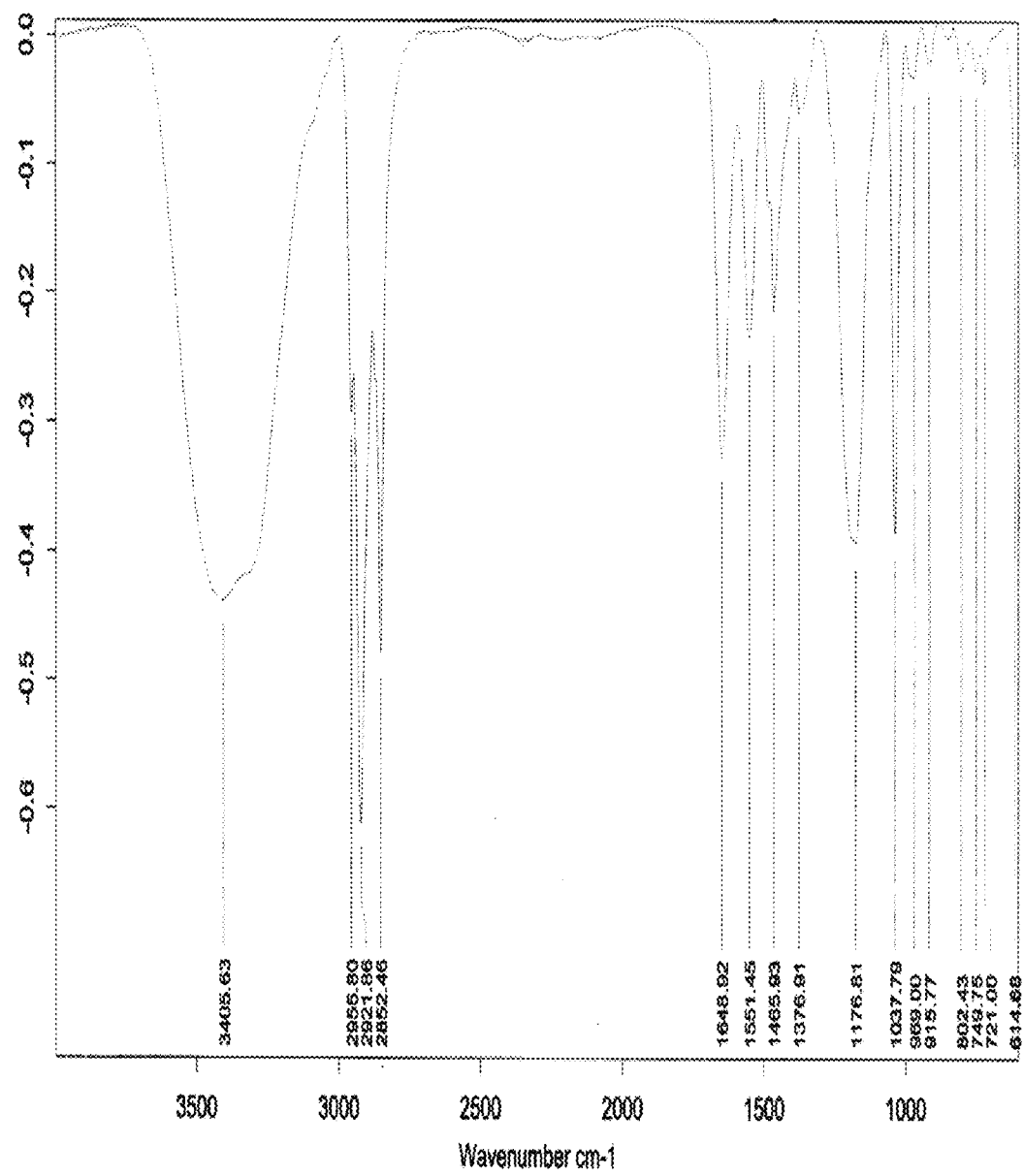
FIG. 8. Infrared Spectrum of supramolecular complex described in example 19.

Figures No. 1, 2, 3 and 4 show the typical NMR $^1$H and $^{13}$C spectra of the coco-amido-propyl hydroxysultaine and the sodium 3-hydroxydodecane-1-sulfonate and sodium dodec-2-en-1-sulfonate-mixture raw materials, respectively, Figures No. 5 and 6 show the NMR $^1$H y $^{13}$C spectra of supramolecular complexes (36) described in Example 19, and FIGS. 7 and 8 show the Infrared spectra of coco-amido-propyl hydroxysultaine and supramolecular complexes (36) described in Example 19, respectively.

4) Evaluation of the Supramolecular Complexes Experimental Performance.

The performance as foaming, wettability modifiers and corrosion inhibitors in environments of ultra-high salinity and high temperature of the supramolecular complexes resulting from the interaction of sodium alkyl hydroxy sulfonates, sodium alkenyl sulfonates with alkyl amido propyl hydroxysultaines or alkyl hydroxysultaines (36) was determined using several experimental tests, which are described below.

I) Phase Stability Evaluation in Brines with Ultra-High Salinity and High Contents of Divalent Ions.

Example 23

A phase stability study was carried out for the supramolecular complexes object of the present invention, described in Examples 19, 20 and 21 and whose basic structural formula is indicated in (36).

All the products were assessed at concentration of 0.2% by weight, dissolved in different waters with high salinity and concentrations of divalent ions, through the measurement of turbidity in NTU (Nephelometric Turbidity Units). This value indicates how turbid or clear a solution/chemical product is and the higher the value, the more turbid the solution is.

The measurement is based on applying the nephelometric technique by using a photometer. The standard method is based on the comparison of the amount of light dispersed by the colloidal particles present in a sample of water with the intensity of the light emerging across the same sample.

Table 32 shows the compositions of the brines that were used in the phase stability assessment of the supramolecular complexes described in Examples 19, 20 and 21 and Table 33 shows the results obtained at the corresponding evaluation at room temperature. It is worth mentioning that in order to pass this test, a value 30 NTU should not be exceeded.

The analysis of Table 33 indicates that supramolecular complexes described in Examples 19, 20 and 21 are soluble and tolerant to levels of salinity and hardness ranging from 32803 to 253859 ppm and from 6420 to 87700 ppm, respectively.

In order to demonstrate the technological advantage of using the supramolecular complexes object of the present invention (36), in brines with ultra-high salinities, phase stability comparative tests were conducted with regard to the raw materials used for the synthesis thereof and with the supramolecular complexes described in the Mexican patent MX 297297. The results are shown in Table 34.

TABLE 32

|  | BRINE 1 | BRINE 2 pH | BRINE 3 |
|---|---|---|---|
|  | 8.33 mg/L | 7.33 mg/L | 6.38 mg/L |
| CATIONS |  |  |  |
| SODIUM | 11742 | 44223.39 | 59809.5 |
| CALCIUM | 448 | 12720 | 31880 |
| MAGNESIUM | 1288.4 | 826.54 | 1944.8 |
| STRONTIUM | 6.9 | 710 | 1450 |
| BARIUM | 0.2 | 1.84 | 25.3 |
| ANIONS |  |  |  |
| CHLORIDES | 19900 | 92800 | 154000 |
| SULFATES | 3650 | 225 | 300 |
| CARBONATES | 13.2 | 0 | 0 |
| BICARBONATES | 84.2 | 256.2 | 148.84 |
| Total hardness as $CaCO_3$ | 6420 | 35200 | 87700 |
| Salinity as NaCl | 32803.9 | 152974.9 | 253859.1 |

TABLE 33

| CHEMICAL PRODUCT | BRINE 1 TURBIDITY (NTU) | BRINE 2 TURBIDITY (NTU) | BRINE 3 TURBIDITY (NTU) |
|---|---|---|---|
| Blank or reference | 1.6 | 1.9 | 3.8 |
| Supramolecular complexes described in Example 19 | 6.0 | 6.5 | 8.5 |
| Supramolecular complexes described in Example 20 | 6.0 | 9.0 | 25 |
| Supramolecular complexes described in Example 21 | 7.8 | 8.1 | 9.1 |

TABLE 34

| CHEMICAL PRODUCT | BRINE 1 TURBIDITY (NTU) | BRINE 2 TURBIDITY (NTU) | BRINE 3 TURBIDITY (NTU) |
|---|---|---|---|
| Mixture of Sodium 3-hydroxydodecane-1-sulfonate and sodium dodec-2-en-1-sulfonate | 1.02 | 5.94 | 53 |
| Coco amido-propyl hydroxysultaine | 1.09 | 1.68 | 3.9 |
| Coco-amido propyl betaine-, sodium alpha olefin sulfonate- and dodecyl trimethyl ammonium chloride-derived complex.[1] | 27.4 | 93 | 145.0 |
| Coco-amido propyl betaine-, sodium alpha olefin sulfonate-, dodecyl trimethyl ammonium chloride- and poly(itaconic acid)-derived complex.[2] | 13.9 | 7.2 | 40.8 |

[1,2] Mexican patent MX 297297

Table 34 analysis indicates that the mixture of sodium 3-hydroxydodecane-1-sulfonate and sodium dodec-2-en-1-sulfonate and supramolecular complexes from Mexican patent MX 297297 show phase stability problems at salinities from 253859 ppm on and levels of hardness from 87700 ppm on (see Table 32). Additionally, a comparison of Tables No. 33 and 34 results demonstrates the advantage of using the supramolecular complexes (36) object of the present invention in brines with ultra-high salinities and high levels of hardness.

On the other hand, in order to determine the effect on the supramolecular complexes (36) phase stability of the addition of the corrosion inhibitors based on zwitterionic geminal liquids described in US patent application 2011/0138683 A1, viscosifying agents of the poly-(sodium acrylamide-co-2-acrylamido-2-methyl-1-propanesulfonate)-type, viscosifying agents such as terpolymers based on acrylamide/N-vinyl pyrrolidone/2-acrylamido-2-methy-1-propane sodium sulfonate and foam stabilizers based on itaconic acid- and sodium vinyl sulfonate-derived copolymers (Hernández-Altamirano, Raúl; Tesis de Doctorado 2010; Desarrollo de productos químicos multifuncionales con aplicación potencial en la solución de problemáticas de corrosión, incrustación, asfaltenos y recuperación mejorada de hydrocarburos que se presentan en la industria petrolera; Instituto Mexicano del Petróleo; México), the formulations shown in Table 35 were then prepared and their phase stability was assessed, with the results shown in Table 36.

Table 36 analysis indicates that the addition to supramolecular complexes (36) of the corrosion inhibitors based on zwitterionic geminal liquids described in the US patent application 2011/0138683 A1, viscosifying agents of the poly-(sodium acrylamide-co-2-acrylamido-2-methyl-1-propane sulfonate)-type, viscosifying agents such as terpolymers based on acrylamide/N-vinyl pyrrolidone/2-acrylamido-2-methy-1-propane sodium sulfonate and foam stabilizers based on itaconic acid- and sodium vinyl sulfonate-derived copolymers does not generate any phase stability problem.

TABLE 35

| Formulation | Composition | % weight |
|---|---|---|
| 1 | Supramolecular complexes described in Example 19 | 75.00 |
|  | Poly-(sodium acrylamide-co-2-acrylamido-2-methyl-1-propanesulfonate) | 25.00 |
| 2 | Supramolecular complexes described in Example 19 | 75.00 |
|  | Terpolymers based on acrylamide/N-vinyl pyrrolidone/2-acrylamido-2-methy-1-propane sodium sulfonate | 25.00 |
| 3 | Supramolecular complexes described in Example 19 | 95.75 |
|  | Zwitterionic geminal liquids | 4.25 |
| 4 | Supramolecular complexes described in Example 19 | 91.50 |
|  | Itaconic acid- and sodium vinyl sulfonate-derived copolymers | 8.50 |

TABLE 36

| CHEMICAL PRODUCT | BRINE 1 TURBIDITY (NTU) | BRINE 2 TURBIDITY (NTU) | BRINE 3 TURBIDITY (NTU) |
|---|---|---|---|
| Formulation 1 | 9.1 | 17 | 14.5 |
| Formulation 2 | 11.0 | 21 | 26.5 |
| Formulation 3 | 10.5 | 18 | 25.1 |
| Formulation 4 | 8.7 | 7.3 | 6.5 |

II) Supramolecular Complexes Foaming Properties Experimental Assessment.

The assessment of the foaming capability of the supramolecular complexes resulting from the interaction of sodium alkyl hydroxysulfonates, sodium alkenyl sulfonates and alkyl amido propyl hydroxysultaines or alkyl hydroxysultaines object of the present invention (36) was performed using two different tests: a) Measurement of foam stability at atmospheric conditions (Foaming test at atmospheric pressure), b) Measurement of foam stability at high pressure, high temperature and ultra-high salinity conditions (Foaming test at high pressure) and c) Determination of rheological properties.

a) Foaming Test at Atmospheric Pressure.

Figure 9:
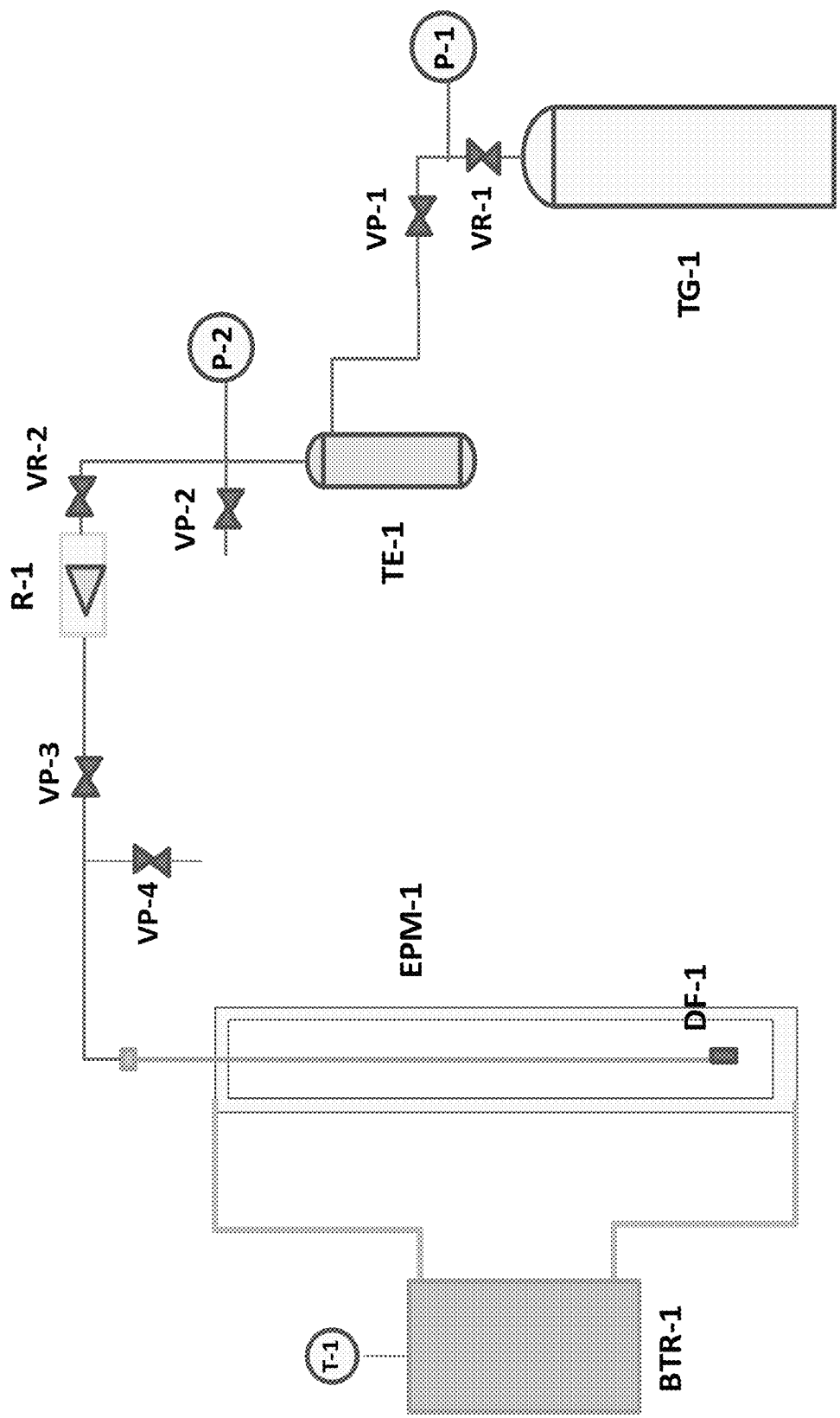
FIG. 9. System used in foam generation tests comprising the following parts: gas cylinder (TG-1), foam meter tube (EPM-1), spear coupled to 0.5µ diffuser (DF-1), flow meter with a 0 to 150 cm$^3$/min capacity. (R-1), thermal bath with recirculation (BTR-1), set of valves to control the flow of gas (VR-1, VP-1, VP-2, VR-2, VP-3, VP-4), temperature and pressure dials (T-1, P-1 y P2).

The system used to generate foam at high pressure is a modification of the system described in Mexican patent MX 297297 and it is designed to assess the stability of foams generated by surfactants at temperatures up to 75° C. and it is shown in FIG. 9.

The foaming system consists of three sub-systems, with the first one being the body of the foam meter, which comprises two concentric glass tubes. The external tube measures 1.35 m high with a diameter of 0.0762 m, and the inner tube is 1.15 m high, with a diameter of 0.0508 m. The solution to be evaluated (brine plus chemical product) is charged in the inner tube and the generation and confinement of the foam is carried out, whereas the function of the external tube is to hold the heating fluid whereby the temperature of the test is controlled. The second sub-system is the one that controls the flow of gas and comprises a storage tank whereby the gas discharge pressure is regulated and a second stabilization tank of smaller dimensions is intended to contribute to the regulation of the flow of gas and prevent condensate entrainment. The gas line has a three-valve set intended to control the direction and magnitude of the flow of gas: the first is a venting valve connected to the stabilization tank; next, there is a flow valve, which allows for the gas to be fed into a calibrated flow-meter (maximum flow, 100 cm$^3$/min), and finally, there is a three-way valve intended to control the admittance of gas to the foam meter body, as well as to open the system to the atmosphere. At the end of this sub-system, there is a stainless steel tubing section or spear with a diffuser or disperser (which can be made out of glass or steel) coupled to its lower end, through which the gas is injected to the liquid phase in order to distribute the flow of gas homogeneously and to achieve a monodisperse foam texture.

Finally, the third sub-system is the one that controls the temperature in the ring-shaped space by means of the flow of heating oil controlled by a digital recirculation thermal bath.

In order to carry out the measurement of the stability of the foam and its foaming capability, a process was developed comprising the following 18 stages: 1) Preparing the study solution at the concentration required by the analysis, 2) Verifying the cleanness of the inner glass tube, 3) Turning on the thermal bath and fixing a temperature of 70° C. (this process lasts approximately 1 hour), 4) Opening the gas tank valves, 5) Purging the valves from both the gas tank and the foam meter, 6) Assuring that the pressure is at 50 psi, 7) Injecting 60 ml of the solution to be studied using a syringe and a hose, 8) Introducing and centering the steel spear and leaving it for 10 minutes in order for its temperature to be homogeneous, 9) Connecting the gas line to the spear, 10) Placing a heating band at the top of the foam meter in order to prevent vapor condensation, 11) Recording the initial height of the liquid, 12) Opening the gas inlet valve, 13) Opening the rotameter and controlling the flow until reaching 50 and maintaining it, 14) Starting the chronometer as soon as the first gas bubble appears in the liquid, 15) After 45 seconds, closing the gas inlet valve and measuring the height of the foam (maximum height) and the fluid, as well as restarting the chronometer, 16) Performing measurements of the heights of the foam and the fluid every minute for 10 minutes in order to determine the drainage rate and the quality of the foam, 17) Recording the heights of foam and fluid every 10 minutes until the height of the foam reaches 30% of its maximum height and, 18) Determining the stability percentage of the foam at each time-point and based on this, constructing a diagram of foam stability over time.

Foam stability is defined as the variation of the initial height of the foam with regard to time and it is determined according to equations 1 and 2.

$$H_t - H_L = H_e \qquad \text{(Equation 1)}$$

Where:
$H_e$=foam height
$H_L$=solution height
$H_t$=experiment total height

The experiment is concluded when 30% of foam stability is reached. The calculation to obtain the stability of the foam is the following:

$$\frac{H_e}{H_{eMAX}} \times 100 = E \qquad \text{(Equation 2)}$$

Where:
$H_e$=foam height
$H_{eMAX}$=foam maximum height
E=Foam stability

Where $H_{eMAX}$ is the $H_e$ calculated at 45 seconds of the experiment.

A study was carried out on the phase stability of the supramolecular complexes object of the present invention, described in Examples 19, 20 and 21 and whose basic structural formula is indicated in (36).

Based on the described methodology, the determination of stability of the foam generated by the supramolecular complexes object of the present invention, described in Examples 19, 20 and 21 and whose basic structural formula is indicated in (36) was carried out and the results obtained are presented in the following examples:

Example 24

The stabilities of the foams generated by the supramolecular complexes described in examples 19, 20 and 21 and whose basic structural formula is described in (36), were assessed by means of the foaming test at atmospheric pressure, at a temperature of 70° C., using a brine containing 32804 ppm of total solids dissolved, out of which 1736 ppm corresponded to divalent ions (Calcium and Magnesium), total hardness as $CaCO_3$ of 6420 ppm and a concentration of supramolecular complexes at 0.2% by weight and using nitrogen gas ($N_2$) to generate the foam.

The composition of the brine used to dilute the supramolecular complex is shown in Table 37.

TABLE 37

|  | BRINE 1 mg/L |
|---|---|
| CATIONS |  |
| SODIUM | 11742.1 |
| CALCIUM | 448 |
| MAGNESIUM | 1288.4 |
| ANIONS |  |
| CHLORIDES | 19900 |
| SULFATES | 3650 |

TABLE 37-continued

|  | BRINE 1 mg/L |
|---|---|
| CARBONATES | 13.2 |
| BICARBONATES | 84.2 |
| TOTAL HARDNESS AS CaCO$_3$ | 6420 |
| SALINITY AS NaCl | 32803.9 |

The time established to attain each parameter (foam and liquid height) was 45 seconds and the minimum foam stability percentage recorded was 30%.

Figure 10:
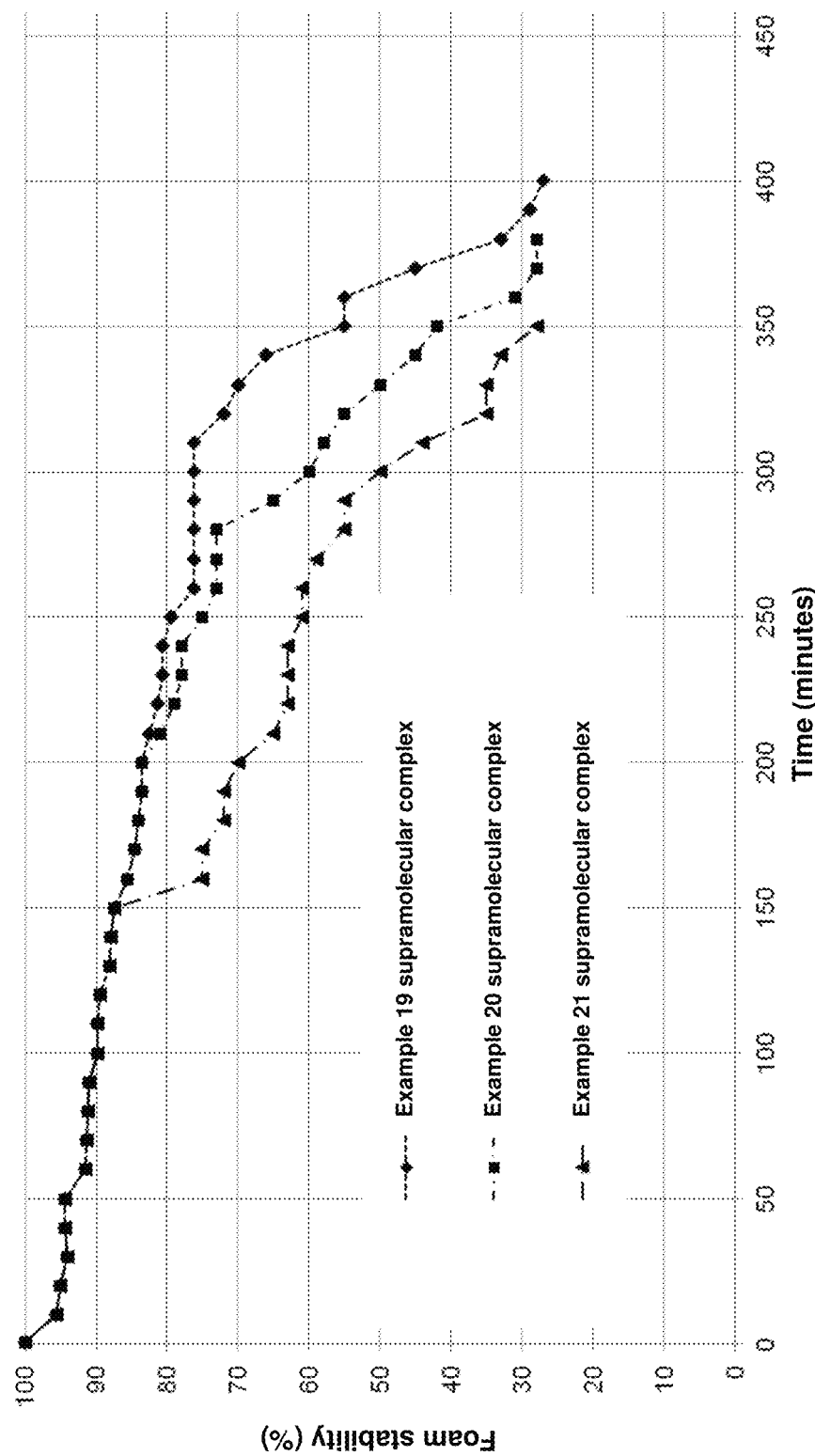
FIG. 10. Stability behavior of the foam at 1 kg/cm$^2$ and 70° C. dependent on time, prepared with the brine described in example 23 at 0.2% by weight of supramolecular complexes described in examples 19, 20 and 21.

FIG. 10 shows the time versus stability graph of the foam obtained with supramolecular complexes described in Examples 19, 20 y 21 and whose basic structural formula is indicated in (36), which reveals that the minimum stability of 30% is reached in a time of 385, 360 and 345 minutes, respectively.

In order to demonstrate that the supramolecular complexes offer technological advantages when used as foaming agents with regard to the raw materials used for their synthesis and with the supramolecular complexes described in Mexican patent MX 297297, the stabilities of foams generated under the same conditions mentioned in Example 24 were determined.

Example 25

A study was carried out on the stability of the foam of cocoamido propyl hydroxysultaine, of the mixture of sodium 3-hydroxydodecane-1-sulfonate and sodium dodec-2-en-1-sulfonate and of supramolecular complexes from Mexican patent MX297297.

Figure 11:
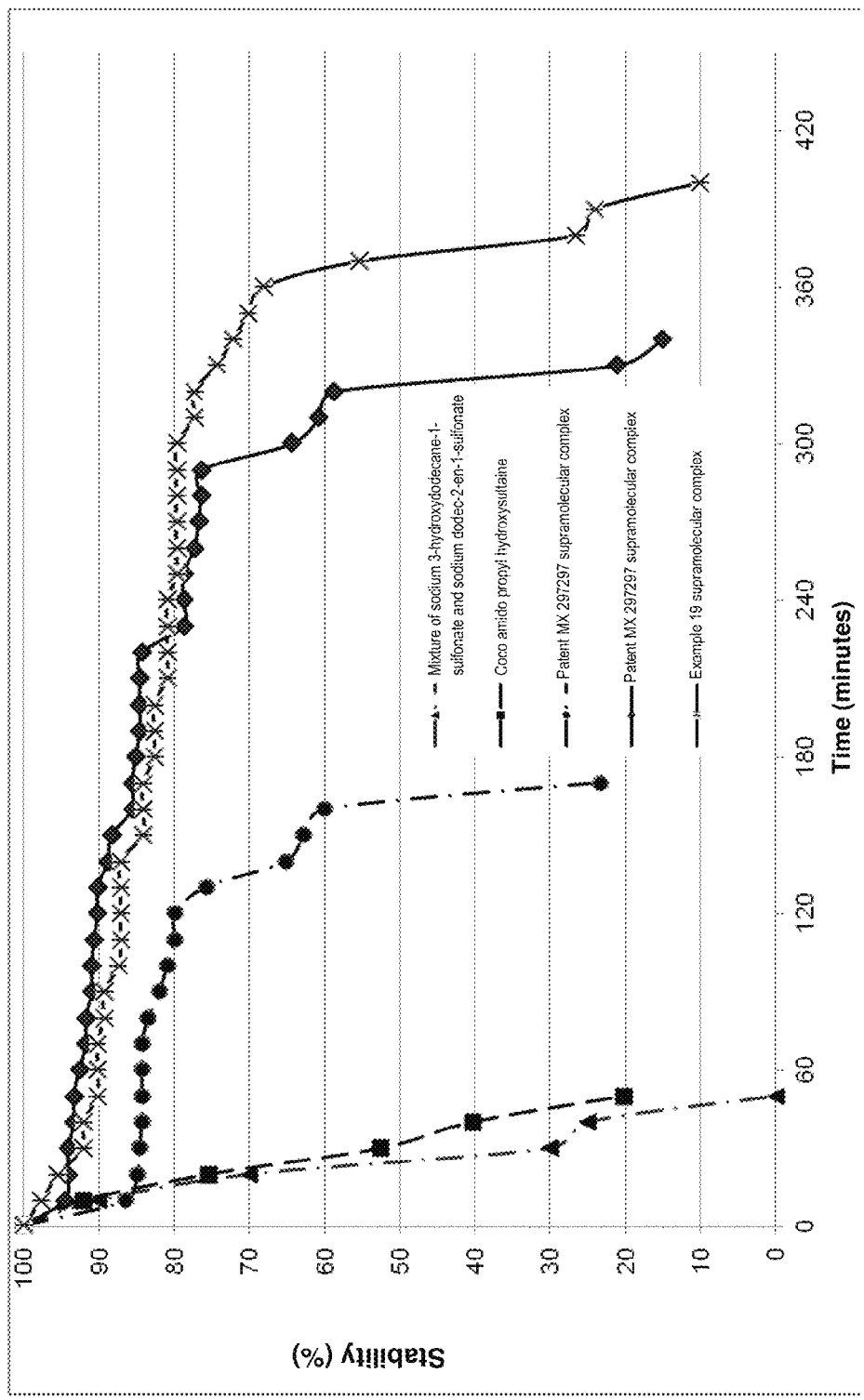
FIG. 11. Stability behaviors of the foams at 1 kg/cm$^2$ and 70° C. dependent on time, prepared with the brine described in example 23 at 0.2% by weight of the coco amido propyl hydroxysultaine, of the mixture of sodium 3-hydroxydodecane-1-sulfonate and sodium dodec-2-en-1-sulfonate, of supramolecular complexes described in Mexican patent MX 297297 and of supramolecular complex described in example 19.

The results obtained for the foam stability on the foaming test at atmospheric pressure and a concentration of 0.2% by weight of cocoamido propyl hydroxysultaine, mixture of sodium de 3-hydroxydodecane-1-sulfonate and sodium dodec-2-en-1-sulfonate and supramolecular complexes from Mexican patent MX 297297 are shown in FIG. 11, which reveals that the minimum stability of 30% is reached in a time of 60, 30, 170 and 330 minutes, respectively.

The results indicate that the foam generated by supramolecular complexes described in examples 19, 20 and 21 and whose basic structural formula is indicated in (36), is at least 10-fold more stable than the foams generated by the mixture of sodium 3-hydroxydodecane-1-sulfonate and sodium dodec-2-en-1-sulfonate, 7-fold more stable than those generated by coco amido propyl hydroxysultaine and 2-fold more stable than those generated by the coco amido propyl betaine-, sodium alpha olefin sulfonate- and dodecyl trimethyl ammonium chloride-derived supramolecular complex. On the other hand, the stability of the foam generated by the supramolecular complex described in example 19 is 17% more stable than that generated by the coco amido propyl betaine-, sodium alpha olefin sulfonate-, dodecyl trimethyl ammonium chloride- and poly(itaconic acid)-derived complex.

This results demonstrate the technological advantage of using the supramolecular complexes based on the interaction of sodium alkyl hydroxysulfonates, sodium alkenyl sulfonates with alkyl amido propyl hydroxysultaines or alkyl hydroxysultaines whose basic structural formula is indicated in (36) as foaming agents at atmospheric pressure, temperature of 70° C. and high concentration of total solids and divalent ions.

On the other hand, in order to determine the effect on the supramolecular complexes (36) foam stability of adding corrosion inhibitors based on zwitterionic geminal liquids, viscosifying agents and foam stabilizers, formulations 1, 2, 3 and 4 described in Example 23 were then evaluated under the same conditions of Example 24.

Example 26

A foam stability study was conducted for formulations 1, 2, 3 and 4 described in Example 23, under the same conditions of Example 24.

Figure 12:
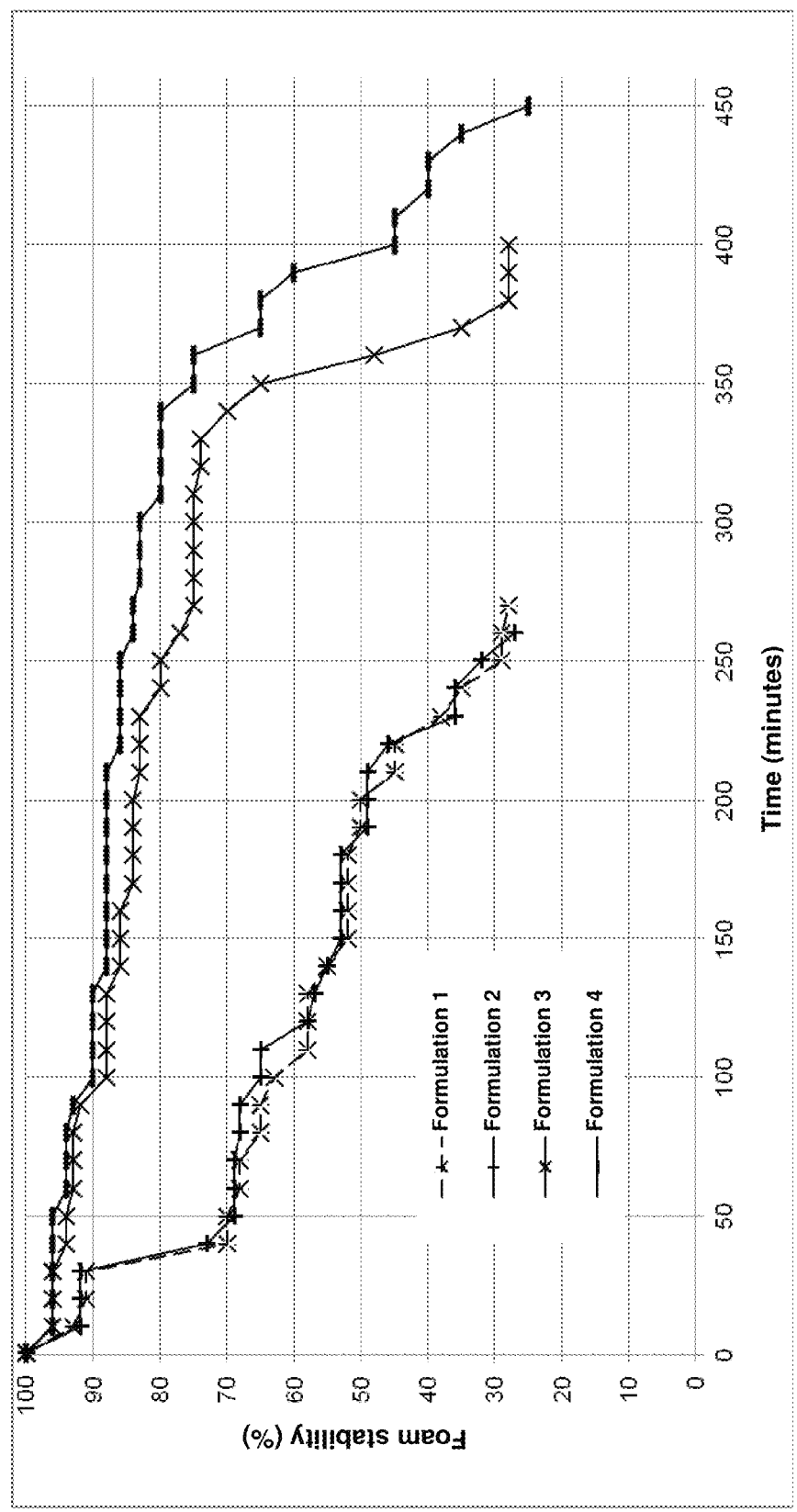
FIG. 12. Stability behavior of the foam at 1 kg/cm$^2$ and 70° C. dependent on time, prepared with the brine described in example 23 at 0.2% by weight of formulations 1, 2, 3 and 4.

FIG. 12 shows the time versus stability graph of the foam obtained with formulations 1, 2, 3 and 4, which reveals that the minimum stability of 30% is reached in a time of 240, 250, 375 and 440 minutes, respectively.

The results indicate that the foam stability generated by formulations 1 and 2, which contain polymeric viscosifying agents is about 38 and 35%, respectively, less stable tan that with supramolecular complex described in Example 19; hence, the addition of this type of compounds to the supramolecular complex induces an antagonistic effect on the foaming properties. The stability of the foam generated by formulation 3, which contains a corrosion inhibitor based on zwitterionic geminal liquid, does not affect the performance of the foaming additive derived from the supramolecular complex described in Example 19. On the other hand, the stability of formulation 4, which contains a foam stabilizer, increases by 14% the stability of the foam of supramolecular complex described in Example 19 and, therefore, a synergistic effect is observed.

In order to determine the effect of salinity and content of divalent ions on the stability of the foam generated by the supramolecular complex described in Example 19 and whose basic structural formula is indicated in (36), a stability study was conducted on three different reservoir-characteristic formation waters with high contents of divalent ions (calcium, magnesium, barium and strontium) and salinity as NaCl.

Example 27

An assessment was conducted of the stability of the foam generated by the supramolecular complex described in Example 19 and whose basic structural formula is indicated in (36), in three different brines whose characteristics are shown in Table 38.

TABLE 38

|  | BRINE 2 | BRINE 3 | BRINE 4 |
|---|---|---|---|
|  |  | pH |  |
|  | 7.33 | 6.38 | 4.96 |
|  | mg/L | mg/L | mg/L |
| CATIONS |  |  |  |
| SODIUM | 44223.39 | 59809.46 | 52559 |
| CALCIUM | 12720 | 31880 | 56800 |
| MAGNESIUM | 826.54 | 1944.8 | 2917 |
| STRONTIUM | 710 | 1450 | ND |
| BARIUM | 1.84 | 25.33 | ND |
| ANIONS |  |  |  |
| CHLORIDES | 92800 | 154000 | 190000 |
| SULFATES | 225 | 300 | 5 |
| CARBONATES | 0 | 0 | 0 |
| BICARBONATES | 256.2 | 148.84 | 82.96 |
| Total hardness as CaCO$_3$ | 35200 | 87700 | 154000 |
| Total salinity as NaCl | 152974.86 | 253859.14 | 313203 |

Figure 13:
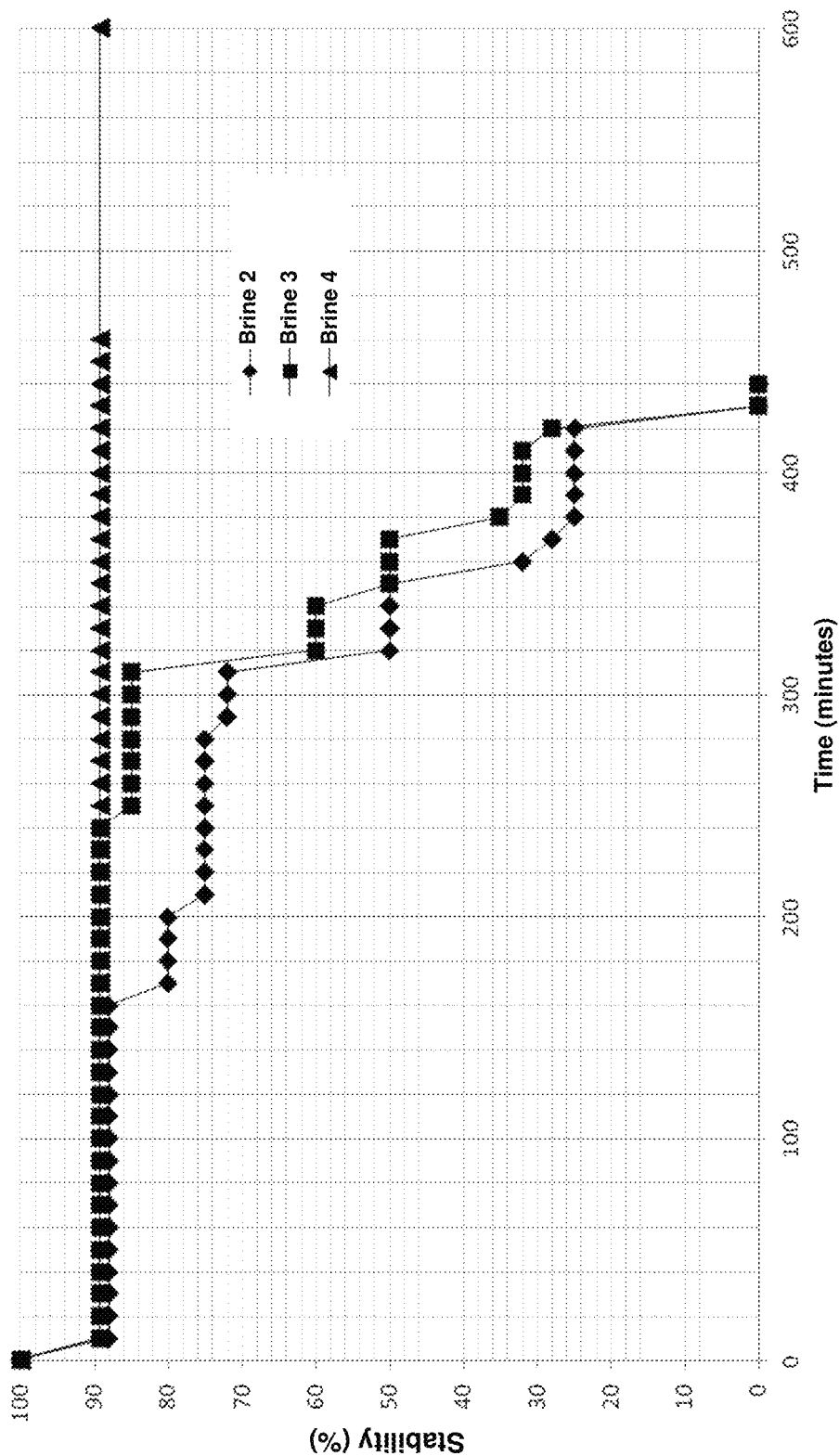
FIG. 13. Stability behaviors of the foams at 1 kg/cm$^2$ and 70° C. dependent on time, prepared with brines 2, 3 and 4 described in example 27 and supramolecular complex described in example 19.

A comparison of the stability results obtained for the foam generated by supramolecular complex described in example 19 and whose basic structural formula is indicated in (36) in three different brines is shown in FIG. 13. The minimum stability of 30% is reached in a time of 50, 30, 170 and 330 minutes. The results indicate that the foam generated by the complex shows a minimum stability of 30% in times of 360, 400 and 600 minutes in brines with salinity as sodium chloride of 152974, 253859 and 313203 ppm, respectively. These results show that very stable complexes are formed as salinity increases.

This demonstrates the advantage of using the supramolecular complexes (36) object of the present invention in brines with ultra-high salinity and high levels of hardness.

In order to determine which would be the effect of the type of gas on the stability of the foam in the generation of foam with supramolecular complex described in Example 19 and whose basic structural formula is indicated in (36), a foam stability study was carried out in nitrogen, carbon dioxide and methane.

Example 28

The stability assessment of the foam generated by supramolecular complex described in Example 19 and whose basic structural formula is indicated in (36) was carried out by means of the foaming test at atmospheric pressure, at a temperature of 70° C., using a brine containing 313203 ppm of salinity as NaCl, out of which 154000 ppm corresponded to divalent ions (Calcium and Magnesium), a concentration of supramolecular complex of 0.2% by weight, and methane ($CH_4$), carbon dioxide ($CO_2$) and nitrogen ($N_2$) as gases.

Figure 14:
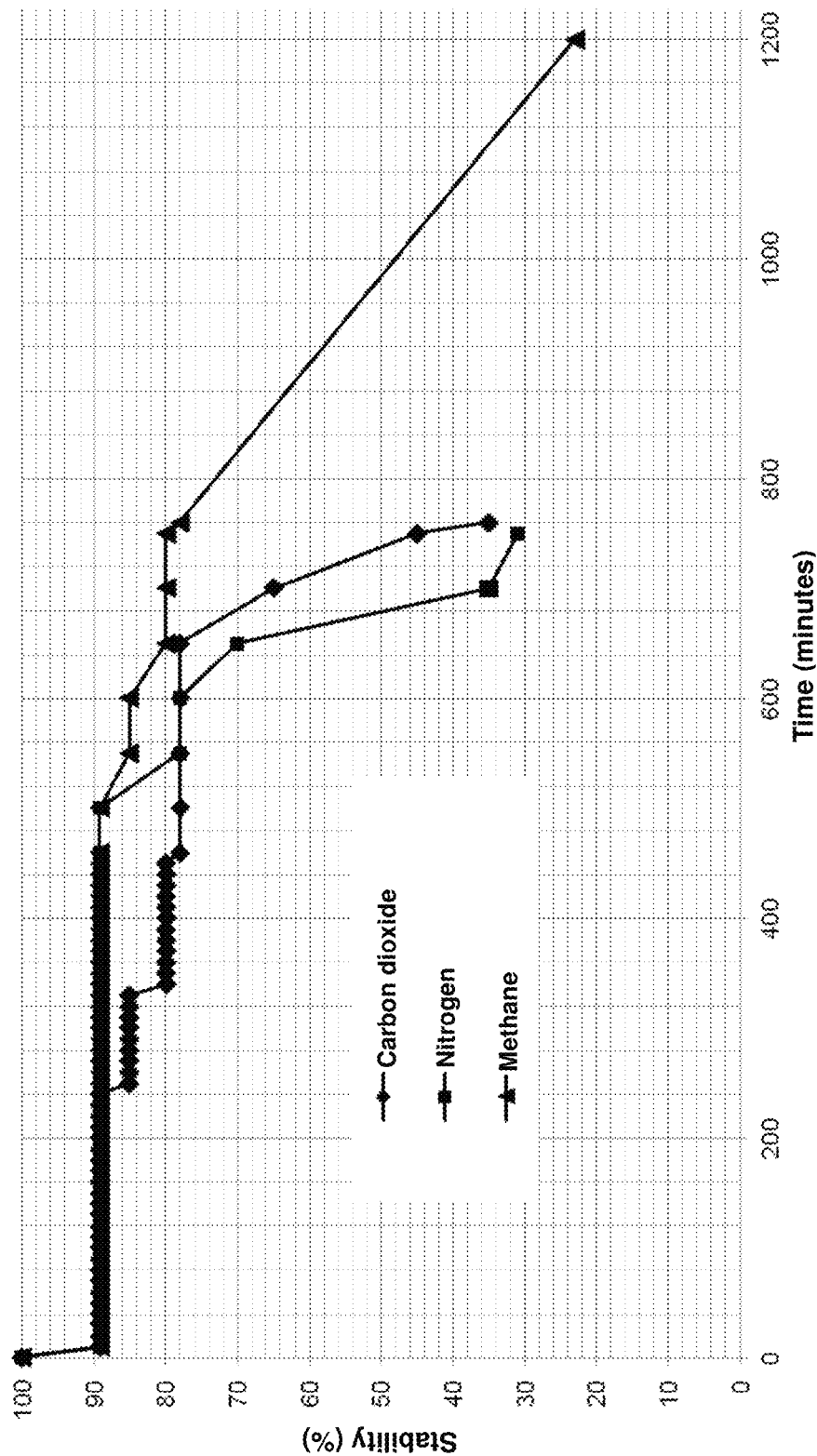
FIG. 14. Stability behaviors of the foams at 1 kg/cm$^2$ and 70° C. dependent on time, prepared with brine 4 described in example 27 and using as gases nitrogen, carbon dioxide and methane.

The foam stability results obtained in the foaming test at atmospheric pressure and at a concentration by weight of 0.2% of the supramolecular complex described in Example 19 and whose basic structural formula is indicated in (36) with methane, carbon dioxide and nitrogen gas are shown in FIG. 14. The analysis of the results indicates that the minimum stability of 30% is reached in a time of 750 minutes for nitrogen, 760 minutes for carbon dioxide and more than 800 minutes for methane.

This demonstrates the technological advantage of using the supramolecular complexes (36) object of the present invention in brines with ultra-high salinity and high levels of hardness and the versatility of using different gases to produce the foam.

II) Foaming Test at High Pressure.

Figure 15:
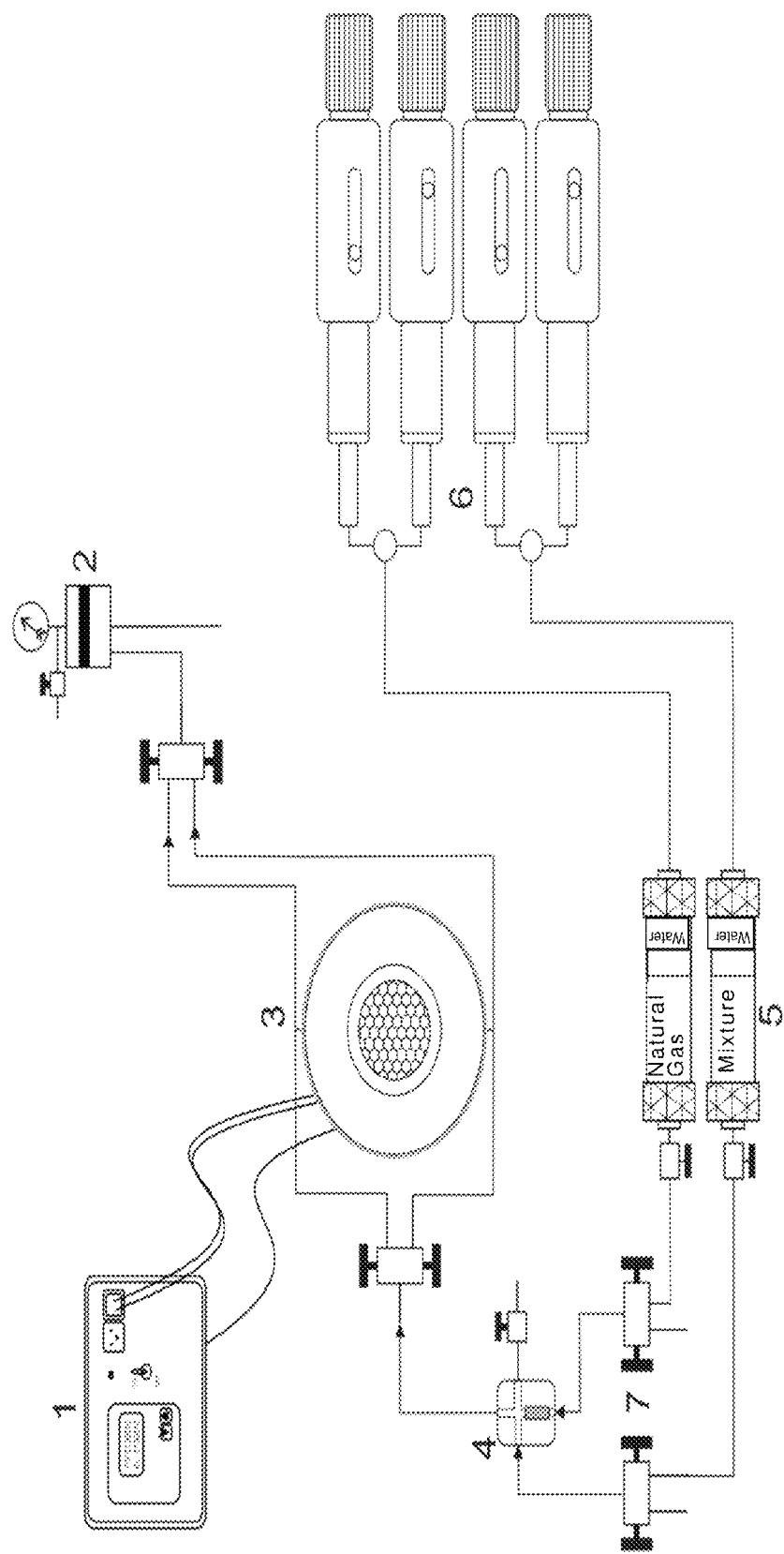
FIG. 15. Equipment for assessment of foam stability at high pressure and high temperature, where: 1) Temperature controller, 2) IPR (Inverse pressure regulator), 3) Window, 4) Filter, 5) Transfer cylinders, 6) Injection pumps and 7) Valves.

The foam generation system at high pressure and high temperature that was used was developed at the hydrocarbon recovery laboratory of the Instituto Mexicano del Petróleo and it is designed to assess the stability of surfactant-generated foams at temperatures up to 170° C. and pressures as high as 6000 psi and it is shown in FIG. 15. It comprises injection pumps, transfer cylinders, inverse pressure regulator (IPR), temperature control system, pressure monitoring system, digital camera, filter (foam generator) and experimental cell.

1) Conditions of the Test
Temperature: 150° C.
Pressure: 3,500 psi
Gas: Methane
Brine
Test time: 7 days
Liquid Flow: 0.6 ml/min
Gas Flow: 2.4 ml/min
2) Methodology:
1) Conditioning of the system:
Window
IPR
Transfer cylinders
2) The pressure transducer and the thermocouples are calibrated.
3) The temperature is elevated to the level desired for the experiment and the pressure is maintained by means of the IPR.
4) The liquid with the added chemical product and the gas are injected to generate the foam at a 1 to 4 ratio, respectively, under reservoir conditions.
5) Once the foam is formed and the cell is saturated, the system is isolated, while maintaining pressure and temperature monitoring.
6) Photographic pictures are taken at different times during the test to observe the stability of the foam.

Determination of Foam Stability.

The methodology developed for the determination of foam stability is the following:
1. A color scale-to-gray scale is elaborated for the photographic images.
2. The window area is calculated in pixels.
3. The lamella-free area is calculated.
4. The percentage of lamella-free area is calculated.

% of Lamella-free Area=Lamella-free Area/Window Area  (Equation 3)

5. The percentage of area with lamellae is calculated.

% Area with Lamellae=1−% Lamella-free Area  (Equation 4)

Example 29

The stability assessment of the foam generated by supramolecular complex described in Example 19 and whose basic structural formula is indicated in (36), was carried out by means of the foaming test at high pressure, whose conditions are 3500 psi of pressure and a temperature of 150° C., using a brine containing 313203 ppm of salinity as NaCl, out of which 154000 ppm corresponded to divalent ions (Calcium and Magnesium), a concentration of supramolecular complex of 0.2% by weight and methane ($CH_4$) as gas.

Figure 16:
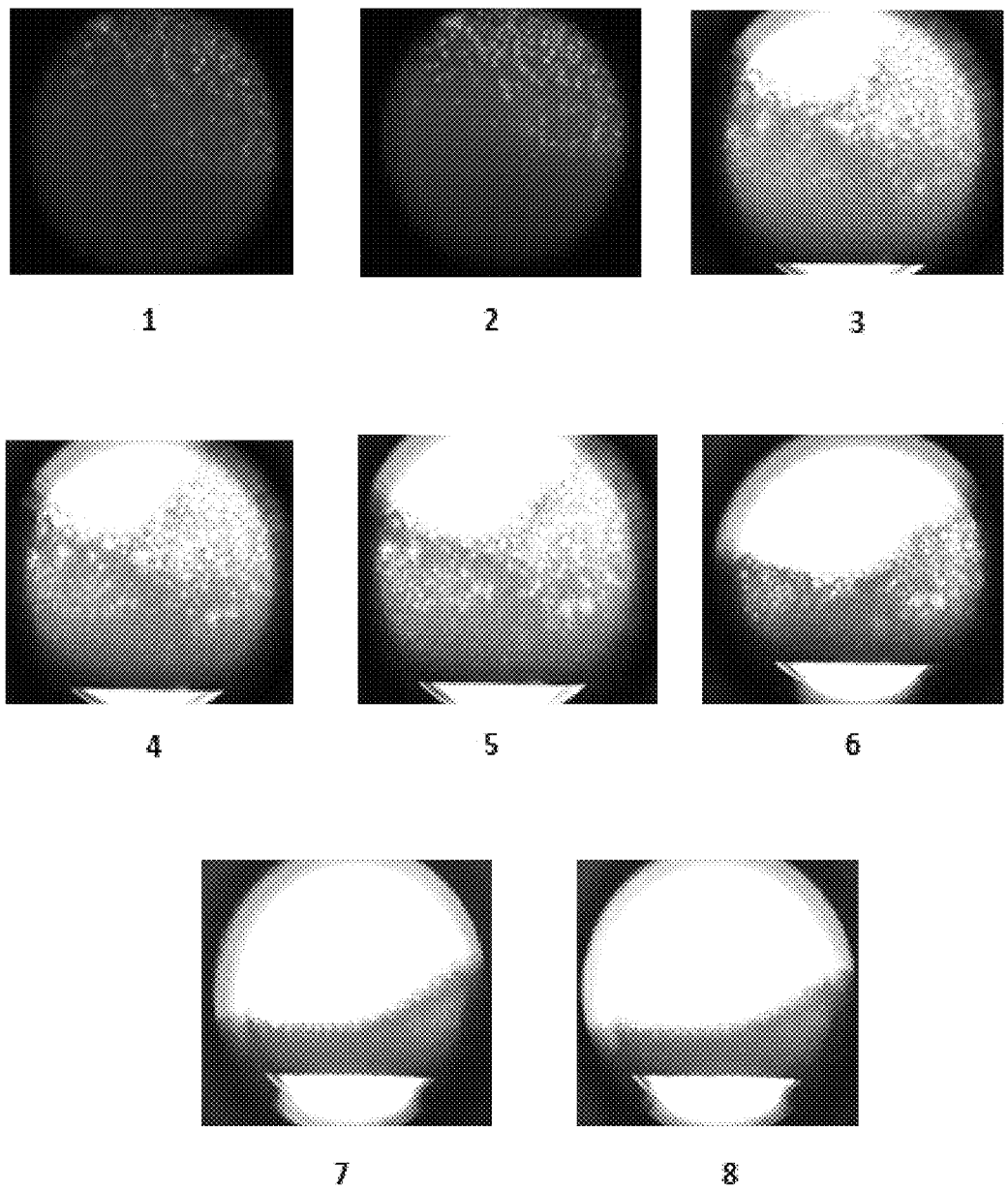
FIG. 16. Foam stability images sequence for the supramolecular complex described in example 19 using brine 4 whose composition is described in example 27 at high pressure and high temperature conditions, where: 1) At the beginning of the test, 2) 1 h, 3) 18 h, 4) 24 h, 5) 36 h, 6) 72 h, 7) 154 h and 8) 168 h.

FIG. 16 shows the photographic images sequence of the foam formed by brine plus supramolecular complex at a concentration of 0.2% by weight, by means of which the behavior of the foam is observed during the test. Its duration was about 168 h, time during which the conditions of the system were maintained constant at a temperature of 150° C. and 3500 psi of pressure.

The results of the test are shown in Table 39 and indicate that the foam is stable under high pressure, ultra-high salinity and high temperature conditions and it did not get to coalesce completely during the 168 h.

TABLE 39

| % Area of lamellae | Time (h) |
| --- | --- |
| 100 | 0 |
| 90 | 12 |
| 80 | 24 |
| 75 | 36 |
| 68 | 65 |
| 68 | 66 |
| 68 | 67 |
| 65 | 68 |
| 65 | 69 |
| 65 | 69.2 |

TABLE 39-continued

| % Area of lamellae | Time (h) |
|---|---|
| 60 | 70.2 |
| 60 | 70.8 |
| 55 | 72.3 |
| 55 | 73.5 |
| 55 | 73.9 |
| 52 | 89 |
| 50 | 94 |
| 44 | 98 |
| 44 | 116 |
| 44 | 118 |
| 40 | 122 |
| 38 | 137 |
| 33 | 144 |
| 31 | 146 |
| 28 | 161 |
| 27 | 164 |

Figure 17:
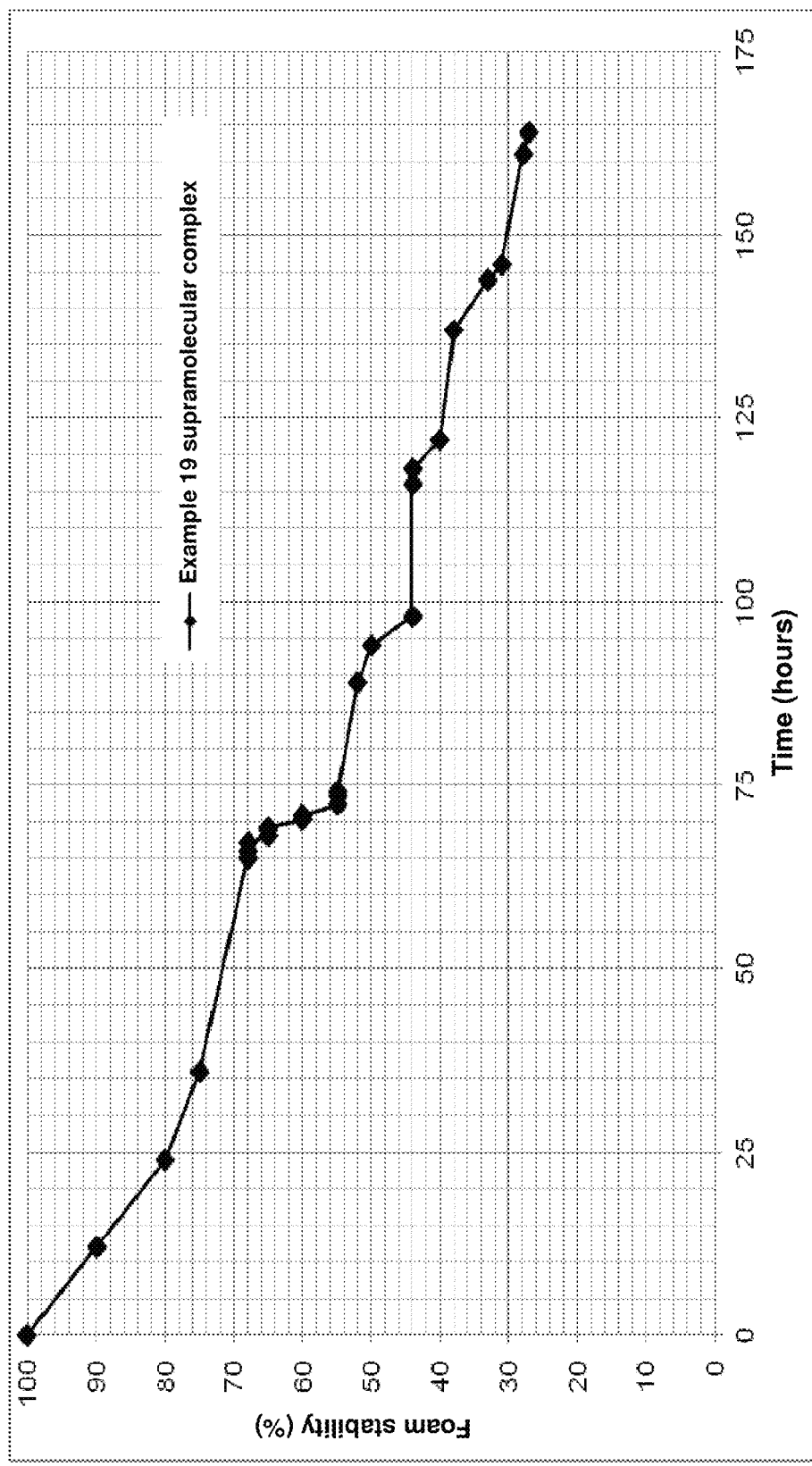
FIG. 17. Stability behavior of the foam of supramolecular complex described in example 19 at 3500 psi and 150° C. dependent on time, prepared with brine 4 described in example 27.

FIG. 17 shows the behavior of time against foam stability under formation conditions.

This demonstrates the technological advantage of using the supramolecular complexes (36) object of the present invention at conditions of high pressure (3500 psi), high temperature (150° C.) and brines with ultra-high salinity and high levels of hardness and the versatility of using different gases to produce the foam.

Determination of Rheological Behavior in a Capillary Rheometer at Reservoir Conditions.

The testing method consists in determining the rheological behavior of foams generated by the supramolecular complexes object of the present invention, with ultra-high salinity and high hardness water under reservoir conditions using a capillary rheometer for high pressures and high temperatures by means of an experimental method developed at the well productivity laboratory of the Instituto Mexicano del Petróleo, which determines the pressure drop between two points of the capillary tube as a function of the flow of foam.

Elements Required for the Test:

Capillary rheometer for high pressures and temperatures.
Nitrogen Tank.
1 L of foaming agent solution in characteristic brine.

Test Procedures:

1) Bring the capillary rheometer system to the temperature and pressure of the test.
2) Fix total flow or foam flow according to the dimensions of the capillary in order to obtain the maximum shear rate desired; the flow of nitrogen gas and foaming solution will be defined to obtain the required quality. This ratio must be adjusted to the following equation:

$$\text{quality} = \frac{Qgas}{Qgas + Qliq} \quad \text{(Equation 5)}$$

where total flow is given by the sum of gas and liquid flows.

3) At a fixed total flow, record the corresponding values of pressure drop in a 10-minute time interval.
4) Modify total flow to an inferior value and record again the pressure drop values for the same period of time as in the previous point.
5) Repeat the procedure until at least 7 points or 7 different flows are obtained.
6) Based on the experimental data on total volumetric flow and pressure drop, calculate the shear stress and the corresponding shear rate, in order to obtain the shear stress versus shear rate graph, where the rheological behavior of the foam can be observed and determined.
7) Make a mathematical adjustment according to the observed curve to obtain the equation for the rheological model of the foam where the apparent viscosity can be calculated as a function of the shear rate.

Example 30

Figure 18:
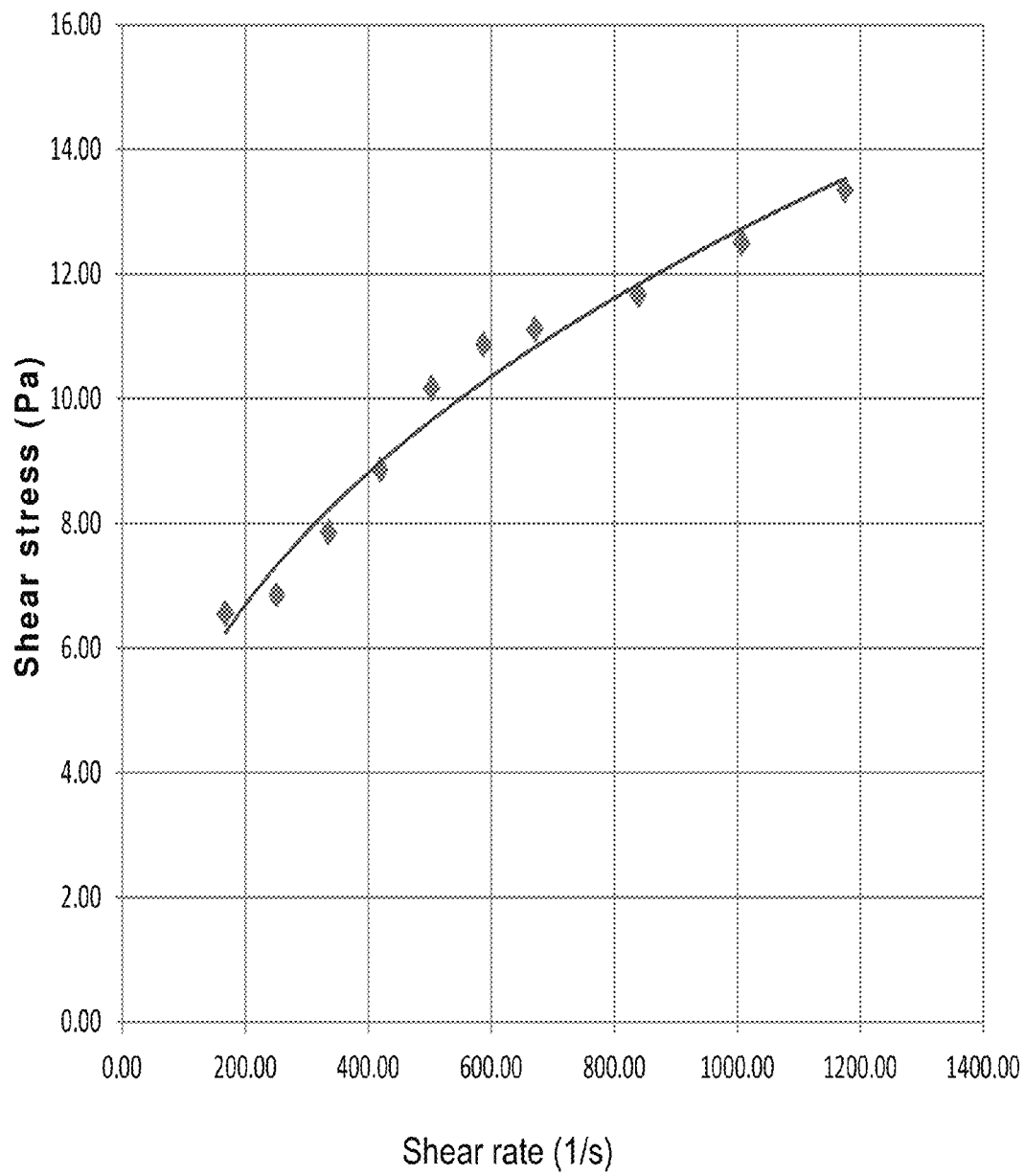
FIG. 18. Shear rate versus shear stress graph for supramolecular complex described in example 19 at 3500 psi and 150° C.

A determination of the rheological behavior of a foam generated by supramolecular complex described in example 19 and whose basic structural formula is indicated in (36) was carried out at a temperature of 150° C. and a pressure of 3500 psi, at a concentration of 0.2% by weight in brine 4 described in example 27 and employing as gas nitrogen to reach a quality of 80% and in a range of high shear rates. Table 40 summarizes the most relevant conditions of the experiment and the capillary dimensions. Table 41 and FIG. 18 below show the results obtained.

TABLE 40

| | |
|---|---|
| Temperature: | 150° C. |
| Pressure: | 3500 psi |
| Shear rate interval: | 160-1200 s$^{-1}$ |
| Inner diameter: | 0.119 cm |
| Length: | 60 cm |
| Foam quality: | 80% |

TABLE 41

| Q (cm³/h) | ΔP (Pa) | Shear rate (1/s) | Shear stress (Pa) |
|---|---|---|---|
| 699.99 | 26900.00 | 1175.30 | 13.34 |
| 600.00 | 25200.00 | 1007.41 | 12.50 |
| 500.00 | 23500.00 | 839.51 | 11.65 |
| 400.00 | 22400.00 | 671.61 | 11.11 |
| 350.00 | 21900.00 | 587.66 | 10.86 |
| 299.99 | 20500.00 | 503.69 | 10.16 |
| 250.00 | 17850.00 | 419.75 | 8.85 |
| 200.00 | 15830.00 | 335.81 | 7.85 |
| 150.00 | 13800.00 | 251.85 | 6.84 |
| 100.01 | 13200.00 | 167.92 | 6.55 |

From the results obtained and when making the mathematical adjustment of the rheological behavior for this foam with a correlation ratio $R^2=0.9706$ the following equation was found, which is characteristic of a pseudoplastic fluid:

$$82 = 813.3 \cdot \gamma^{0.3977-1} \quad \text{(Equation 6)}$$

Based on the equation above, viscosity can be calculated as a function of the shear rate, and the results are shown in Table 42.

TABLE 42

| Shear rate (1/s) | Experimental Apparent Viscosity (cP) | Calculated Apparent Viscosity (cP) |
|---|---|---|
| 1175.30 | 11.32 | 11.51 |
| 1007.41 | 12.36 | 12.63 |
| 839.51 | 13.85 | 14.10 |
| 671.61 | 16.51 | 16.12 |
| 587.66 | 18.49 | 17.47 |
| 503.69 | 20.12 | 19.18 |
| 419.75 | 21.02 | 21.40 |
| 335.81 | 23.31 | 24.48 |
| 251.85 | 27.14 | 29.11 |
| 167.92 | 38.98 | 37.16 |

The results obtained in this assessment for the foam generated by supramolecular compound described in example 19 reveal that even at high shear rates of 1175 s$^{-1}$ under reservoir conditions of pressure and temperature it is possible to reach viscosity values of 11 cP, i.e., 60-fold higher than water and 500-fold the viscosity of nitrogen.

Example 31

Figure 19:
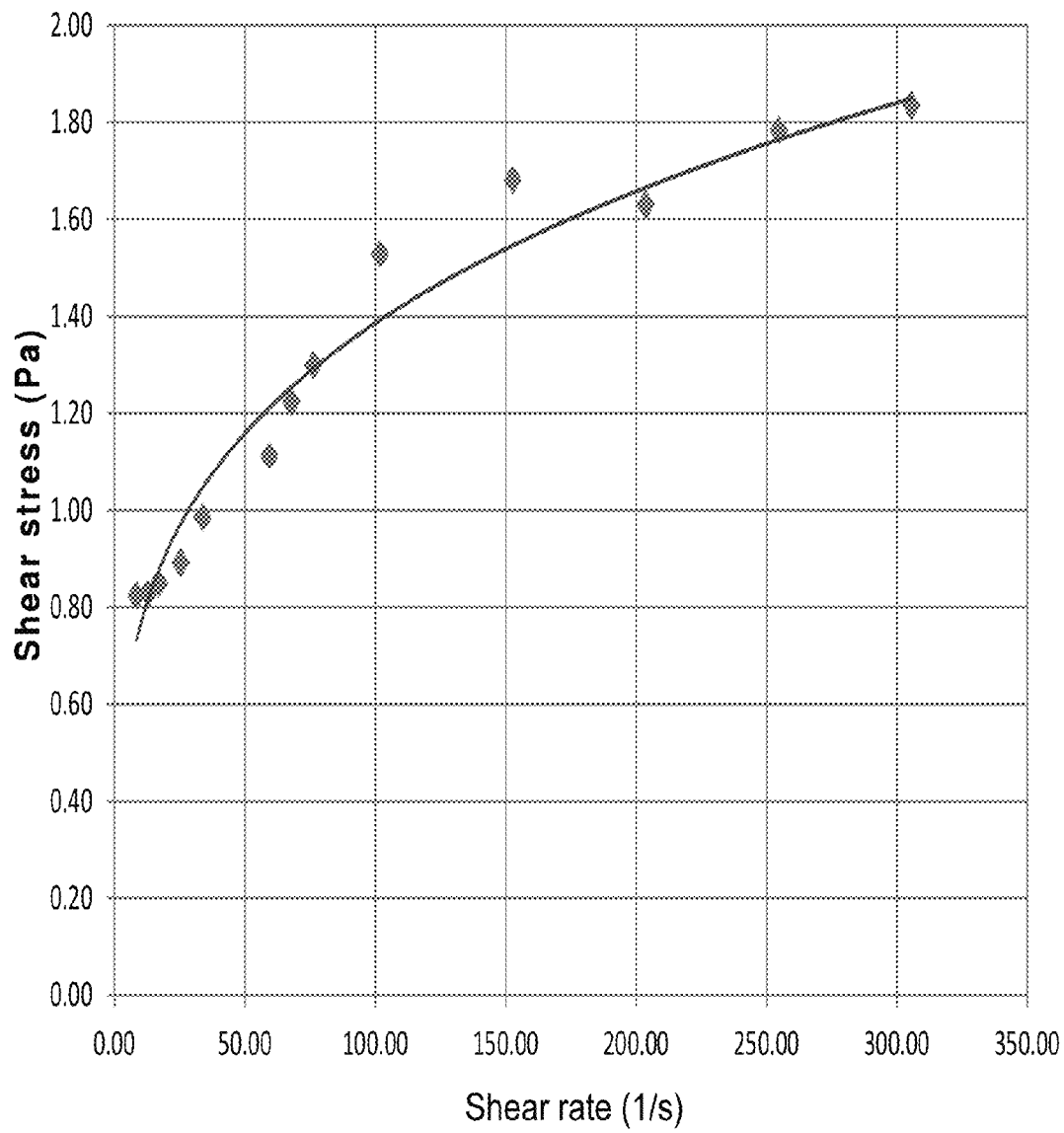
FIG. 19. Shear rate versus shear stress graph for supramolecular complex described in example 19 at 3500 psi and 150° C.
Figure 21:
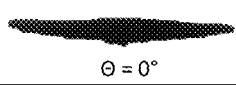
FIG. 21. Contact angle just before the detachment of the oil drop at different concentrations of supramolecular complexes described in example 19.
Figure 21:
Figure 21:
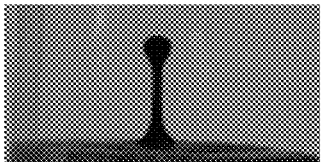
Figure 21:
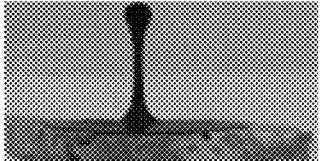
Figure 21:
Figure 21:
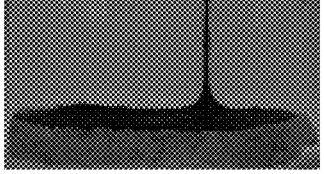
Figure 22:
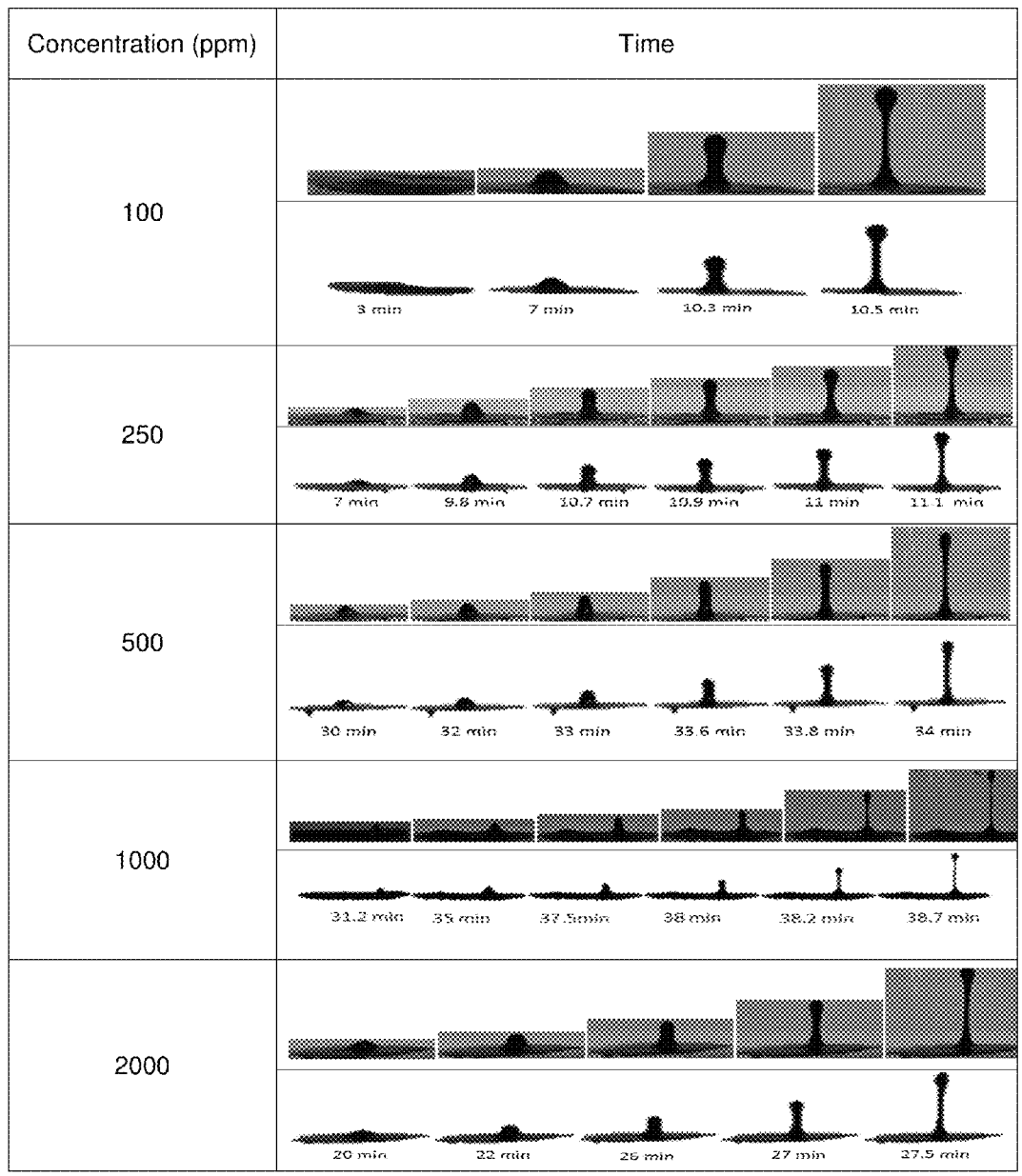
FIG. 22. Photographic sequence of the detachment of oil drops at different concentrations of supramolecular complex described in example 19.

The determination of the rheological behavior of a foam generated by supramolecular complex described in Example 19 and whose basic structural formula is indicated in (36) was carried out at a temperature of 150° C. and a pressure of 3500 psi at a concentration of 0.2% by weight in brine 4 whose composition is described in Example 27, employing as gas nitrogen in order to reach a quality of 80% and within a range of low shear rates. Table 43 summarizes the most relevant conditions of the experiment and the capillary dimensions. Table 44 below and FIG. 19 show the results obtained.

TABLE 43

| Temperature: | 150° C. |
|---|---|
| Pressure: | 3500 psi |
| Shear rate interval: | 12-300 s$^{-1}$ |
| Inner diameter: | 0.255 cm |
| Length: | 610 cm |
| Foam quality: | 80% |

TABLE 44

| Q (cm$^3$/h) | ΔP (Pa) | Shear rate (1/s) | Shear stress (Pa) |
|---|---|---|---|
| 1800 | 20,030 | 305.71 | 1.83 |
| 1500 | 17,500 | 254.76 | 1.78 |
| 1200 | 16,900 | 203.81 | 1.63 |
| 900 | 15,800 | 152.85 | 1.68 |
| 600 | 14,700 | 101.90 | 1.53 |
| 450 | 12,400 | 76.43 | 1.30 |
| 400 | 11,700 | 67.94 | 1.22 |
| 350 | 10,390 | 59.44 | 1.11 |
| 200 | 8,980 | 33.97 | 0.99 |
| 150 | 8,790 | 25.48 | 0.89 |
| 100 | 8,010 | 16.98 | 0.85 |
| 75 | 7,860 | 12.74 | 0.83 |

Based on the results obtained and applying the mathematical adjustment of the rheological behavior for this foam with a correlation ratio R$^2$=0.9581, the following equation was found, which is characteristic of a pseudoplastic fluid:

$$\mu = 428.6 \cdot \gamma^{0.2527-1} \quad \text{(Equation 7)}$$

Based on the above equation, viscosity can be calculated as a function of shear rate and the results are shown in Table 45.

TABLE 45

| Shear rate (1/s) | Experimental Apparent Viscosity (cP) | Calculated Apparent Viscosity (cP) |
|---|---|---|
| 305.71 | 6.00 | 5.95 |
| 254.76 | 7.00 | 6.82 |
| 203.81 | 8.00 | 8.06 |
| 152.85 | 11.00 | 9.99 |
| 101.90 | 15.00 | 13.53 |
| 76.43 | 17.00 | 16.78 |
| 67.94 | 18.00 | 18.32 |

TABLE 45-continued

| Shear rate (1/s) | Experimental Apparent Viscosity (cP) | Calculated Apparent Viscosity (cP) |
|---|---|---|
| 59.44 | 18.70 | 20.24 |
| 33.97 | 29.00 | 30.75 |
| 25.48 | 35.00 | 38.13 |
| 16.98 | 50.00 | 51.62 |
| 12.74 | 65.00 | 64.01 |

The results obtained in this assessment for the foam generated with supramolecular complex 37 shows that at low shear rates close to those found in the reservoir around 12 s$^{-1}$ under reservoir conditions of pressure and temperature, it is possible to reach viscosity values of 64 cP, i.e., 300-fold more than water and 2700-fold the viscosity of nitrogen.

This demonstrates the technological advantage of using the supramolecular complexes (36) object of the present invention as foaming additives under conditions of high pressure (3500 psi), high temperature (150° C.) and with brines with ultra-high salinities and high levels of hardness.

III) Assessment of Wettability-Modifying Properties.

The following examples will help to demonstrate the use of the supramolecular complexes (36) object of the present invention as wettability modifiers.

This assessment was carried out in 4 ways: a) Determination of contact angle changes at atmospheric conditions, b) Determination of spontaneous imbibition in small fragments of dolostone and limestone in Amott cells, c) Determination of spontaneous imbibition in limestone cores in Amott cells and d) Determination of spontaneous imbibition in limestone cores in a high temperature glass-lined reactor.

a) Determination of Contact Angle Changes at Atmospheric Conditions.

The testing method comprises a procedure to observe how the contact angle of a rock/oil system immersed in brine with high contents of total solids dissolved and divalent ions such as calcium and magnesium with or without the presence of chemical product is modified at environmental conditions in order to determine the time that it takes for small proportions of oil to detach in the system.

Elements Required for the Test:
50-milliliter glass beakers.
Small fragments of dolomite, limestone or sandstone.
Photographic camera.
Crude oil, typical of carbonate reservoirs.
Brine.
Test Procedure 1.—Prepare 100 mL of the aqueous solution (brine) to be evaluated at the concentration of chemical product required in the test.

2.—Place a small fragment of rock (dolostone, limestone or sandstone) of 2×2×1 cm dimensions in a 50 mL glass beaker.

3.—Place carefully two drops of crude oil on the surface of the small rock fragment.

4.—Allow for the rock-oil system to balance, letting it rest for 30 minutes.

5.—Verify if the surface of the rock is wettable to the oil.

6.—Add carefully 25 mL of the aqueous solution to be assessed at the concentration of chemical product required in the test. Make sure that the rock-oil system is completely submerged in the aqueous solution to be evaluated.

7.—Observe the changes occurring to the contact angle in the rock-oil-aqueous solution system and document them with photographs.

8.—Determine the time at which the detachment of oil in the system begins due to the effect of the chemical product.

9.—The time duration of the test is one hour.

Example 32

The determination of the change of contact angle was carried out for supramolecular complex described in Example 19 and whose basic structural formula is indicated in (36) at different concentrations.

Brine 1 whose composition is described in Example 24 was used, as well as rock plates composed by 99% of dolomite and 1% of limestone and the oil whose composition is shown in Table 46.

TABLE 46

| Fraction | |
|---|---|
| Saturated (% weight) | 18.7 |
| Aromatics (% weight) | 31.8 |
| Resins (% weight) | 37.8 |
| Asphaltenes (% weight) | 11.7 |
| Acid number (mg KOH/g) | 0.5 |

Tables 47, 48 and 49 show the results of the contact angle change experiment using the supramolecular complex described in Example 19 at different concentrations.

The results show that supramolecular complex described in example 19 favorably modifies the contact angle and detaches the oil in less than 1 hour of having contact with the oil adsorbed on the rock under environmental conditions and using high-salinity brines, as well as oils with high contents of asphaltenes.

This demonstrates the technological advantage of using the supramolecular complexes (36) object of the present invention as wettability modifiers under environmental conditions of temperature and pressure and using brines with ultra-high salinity and high levels of hardness.

b) Determination of Recovery Factor in Small Fragments of Dolostone and Limestone in Amott Cells.

The testing method consists in determining the oil recovery factor at different temperatures, due to spontaneous water imbibition processes in small fragments of carbonate rock and/or nuclei with known permeability and porosities.

Elements Required for the Test:
Amott cells.
Controlled temperature recirculation device.
Small fragments of dolostone, limestone or sandstone.
Photographic camera.
Crude oil typical from carbonate reservoirs.
Brine typical from reservoirs with high salinities.
Supramolecular complex or chemical product to be assessed.
Analytical Balance.
Glass equipment for SOXHLET extraction.
Glass volumetric materials.
Convection oven.

Test Procedures:
1) Submit small fragments of rock (dolostone, limestone or sandstone) from the reservoir for which the study is intended to hydrocarbon extraction processes with different organic solvents in a SOXHLET system. The extraction processes are carried out continuously, sequentially or by reflux, using as solvents: a) Hexane b) Xylene, c) Chloroform, d) Methanol, e) Hexane, f) Xylene and g) Chloroform. The duration of each extraction stage is one day and the time for the entire process is 7 days.

2) Dry the small fragments of rock in a stove at a temperature of 100° C. and record the weight once a constant weight is reached.

3) Put the small fragments of rock in contact with dead oil originating from the reservoir of interest for 24 hours at the required temperature and at a pressure of 140±5 psi, in an aging cell.

4) Strain the small rock fragments saturated with dead oil at atmospheric temperature and pressure until no dropping is observed. The straining process lasts about 12 hours and a number 200 wire mesh is used for this purpose.

5) Weigh the small fragments of rock soaked with dead oil and, by weight difference, obtain the amount of oil adsorbed by the porous medium.

6) Prepare 400 mL of the aqueous solution (brine) to be assessed at the concentration of chemical product required in the test.

7) Place 60 grams of small rock fragments in the Amott cell and add carefully 350 mL of the chemical product to be assessed at the required concentration.

8) Increase the temperature of the system to the temperature desired for the assessment of the performance of the chemical product or sample under study and maintains the same for the period of time at which the recovery factor is intended to be determined under the temperature and salinity conditions.

9) Quantify the amount of oil produced due to spontaneous water imbibition processes under study conditions and determine the recovery factor according to the following equation:

$$Rf = (Ro \times 100)/Oopm \qquad \text{(Equation 8)}$$

Where:
Rf=Recovery factor
Ro=Recovered oil
Oopm=Original oil adsorbed in the porous medium.

Example 33

The assessment of total recovery factor was carried out for supramolecular complexes described in Examples 19 and 20 and whose basic structural formula is indicated in (36), at a concentration of 0.2% by weight, using as test medium the brine described in Example 24, fragments of limestone and oil whose characteristics are shown in Table 50, for a temperature range of 80, 90 and 100° C. and at atmospheric pressure.

TABLE 50

| Fraction | |
|---|---|
| Saturated (% weight) | 31.88 |
| Aromatics (% weight) | 48.84 |
| Resins (% weight) | 18.81 |
| Asphaltenes (% weight) | 0.38 |
| Acid number (mg KOH/gr) | 0.29 |
| Basic number (mg KOH/gr) | 1.33 |

Table 51 shows the cumulative results of the recovery factor along the range of temperatures.

TABLE 51

| PRODUCT | IMBIBED OIL (gr) | RECOVERED OIL (gr) | CUMULATIVE RECOVERY FACTOR (%) |
|---|---|---|---|
| BRINE 1 | 4.677 | 1.045 | 23.0 |
| Supramolecular complex described in Example 19 | 4.583 | 1.902 | 40.7 |

TABLE 51-continued

| PRODUCT | IMBIBED OIL (gr) | RECOVERED OIL (gr) | CUMULATIVE RECOVERY FACTOR (%) |
|---|---|---|---|
| Supramolecular complex described in Example 20 | 4.446 | 1.413 | 31.8 |

The results show that supramolecular complexes described in Examples 19 and 20 recover 77 and 38% more oil with regard to the recovery obtained using exclusively brine.

Example 34

The assessment of total recovery factor was carried out for supramolecular complexes described in Examples 19 and 20, at a concentration of 0.2% by weight, using as test medium brine 1 whose composition is described in Example 24, fragments of rock composed by 99% of dolostone and 1% of limestone, the oil whose composition is shown in Table 52 and at a temperature range of 80, 90 and 100° C.

TABLE 52

| Fraction | |
|---|---|
| Saturated (% weight) | 38.32 |
| Aromatics (% weight) | 45.98 |
| Resins (% weight) | 15.63 |
| Asphaltenes (% weight) | 0.07 |
| Acid number (mg KOH/gr) | 0.14 |
| Basic number (mg KOH/gr) | 0.40 |

Table 53 shows the result of the cumulative recovery factor within the range of temperatures for supramolecular complexes described in Examples 19 and 20.

TABLE 53

| PRODUCT | IMBIBED OIL (g) | RECOVERED OIL (g) | CUMULATIVE RECOVERY FACTOR (%) |
|---|---|---|---|
| BRINE 1 | 1.544 | 0.080 | 5.2 |
| Supramolecular complex described in Example 19 | 1.479 | 0.144 | 9.7 |
| Supramolecular complex described in Example 20 | 1.511 | 0.129 | 8.6 |

Figure 23:
FIG. 23. Amott Cell containing pieces of dolomite type rock and the supramolecular complex derived from example 19.

FIG. 23 shows the Amott cell containing the supramolecular derived from Example 19.

The results show that supramolecular complexes from Examples 19 and 20 recover 87 and 65% more oil with regard to the recovery obtained using exclusively brine.

On the other hand, in order to determine what would be the effect of adding corrosion inhibitors based on zwitterionic geminal liquids on the recovery factor of supramolecular complex described in example 19, formulation 3 described in Example 23 was then assessed under the same conditions described in this example.

Table 54 shows the result of the cumulative recovery factor within the temperature interval for formulation 3 whose composition is described in Example 23.

TABLE 54

| PRODUCT | IMBIBED OIL (g) | RECOVERED OIL (g) | CUMULATIVE RECOVERY FACTOR (%) |
|---|---|---|---|
| BRINE 1 | 1.544 | 0.080 | 5.2 |
| Formulation 3 | 1.900 | 0.299 | 15.7 |

With regard to formulation 3, a synergistic effect is observed between supramolecular complex described in Example 19 and the zwitterionic geminal liquid, which reflects in a 62% increase in the oil recovery factor, with regard to when only the supramolecular complex is used.

This demonstrates the technological advantage of using the supramolecular complexes whose structural formula is shown in (36) object of the present invention as wettability modifiers under conditions of environmental pressure, temperature range from 80 to 100° C., brines with high salinities and high levels of hardness, as well as oils and rock fragments with different compositions.

c) Determination of Spontaneous Imbibition in Limestone Cores in Amott Cells.

The testing method consists in determining the oil recovery factor at different temperatures, due to spontaneous water imbibition processes in small nuclei of carbonate rock with known permeability and porosities.

Elements Required for the Test

Amott cells.

Controlled temperature recirculation device.

Limestone nuclei of 3.81 cm diameter×7 cm length with known permeability and porosities.

Photographic camera.

Crude oil typical from carbonate reservoirs.

Brine typical from reservoirs with high salinities.

Supramolecular complex or chemical product to be assessed.

Analytical Balance.

Glass equipment for SOXHLET extraction.

Volumetric glass materials.

Convection oven.

Test Procedures:

1) Submit nuclei of carbonate rock (dolostone or limestone) or sandstone originating from the reservoir for which the study is intended to hydrocarbon extraction processes with different organic solvents in a SOXHLET system. The extraction processes are carried out continuously, sequentially or by reflux, using as solvents: a) Xylene b) Chloroform, c) Methanol, d) Xylene, e) Chloroform, f) Methanol and g) Xylene. The duration of each extraction stage is one day and the time of the entire process is 7 days.

2) Determine the absolute permeability of the nuclei to helium, as well as their effective porosity.

3) Dry the core in a stove at a temperature of 100° C. and record the weight once a constant weight is reached.

4) Put the nuclei in contact with dead oil originating from the reservoir of interest for 5 days at the temperature of interest and at a pressure of 140±5 lb, in an aging cell.

5) Strain the saturated core with dead oil at atmospheric temperature and pressure until no dropping is observed. The straining process lasts about 12 hours and a number 200 wire mesh is used for this purpose.

6) Weigh the small fragments of rock saturated with dead oil and, by weight difference, obtain the amount of oil adsorbed by the porous medium.

7) Prepare 500 milliliter of the aqueous solution (brine) to be assessed at the concentration of chemical product required in the test.

8) Place the nucleus soaked with dead oil in the Amott cell and carefully add 350 milliliter of the chemical product to be assessed at the required concentration.

9) Increase the temperature of the system to the desired temperature for the assessment of the performance of the chemical product or sample under and maintain the same for the period of time at which the recovery factor is intended to be determined under the temperature and salinity conditions.

10) Quantify the amount of oil produced due to spontaneous water imbibition processes under study conditions and determine the recovery factor according to the following equation:

$$Rf=(Ro\times 100)/Oopm \quad \text{(Equation 9)}$$

where:
Rf=Recovery factor
Ro=Recovered oil
Oopm=Original oil adsorbed in the porous medium.

Example 35

The assessment of the recovery factor was carried out for supramolecular complex described in example 19 and whose basic structural formula is indicated in (36) at a concentration of 0.2% by weight, using as test medium brine 4 whose composition is shown in Example 27, crude oil and a limestone cores for a temperature range of 80, 90 and 100° C.

Tables 55 and 56 show the characteristics of the oil and the limestone cores used.

TABLE 55

| Nucleus dimensions (cm) | Absolute permeability to helium (mD) | Nucleus porosity (%) |
| --- | --- | --- |
| 3.8 × 7 | 115 | 20 |

TABLE 56

| Fraction | |
| --- | --- |
| Saturated (% weight) | 40.91 |
| Aromatics (% weight) | 36.13 |
| Resins (% weight) | 22.30 |
| Asphaltenes (% weight) | 0.20 |

Table 57 shows the result of total recovery factor for supramolecular complex described in example 19 at a concentration of 0.2% by weight.

TABLE 57

| PRODUCT | IMBIBED OIL (g) | RECOVERED OIL (g) | CUMULATIVE RECOVERY FACTOR (%) |
| --- | --- | --- | --- |
| BRINE 4 | 10.0323 | 0.5911 | 5.9 |
| Supramolecular complex described in Example 19 | 10.2047 | 1.6990 | 16.7 |

Figure 24:
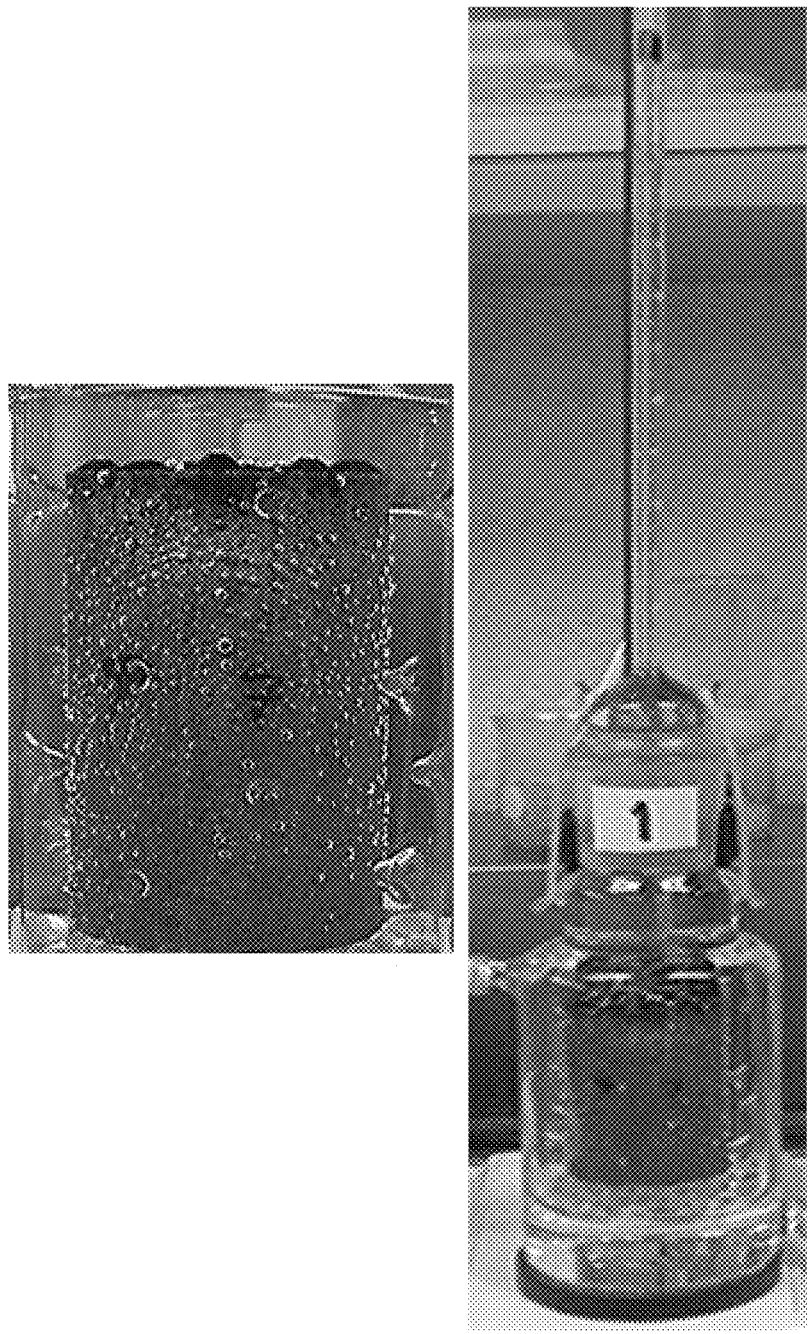
FIG. 24. a) Limestone core saturated with oil inside amott cell at 80° C. and atmospheric pressure and b) Oil recovery in amott cell at 80° C. and atmospheric pressure.

FIG. 24 shows the saturated core and the detachment of oil.

The results shown in Table 57 indicate that supramolecular complex described in Example 19 recovers 2.8-fold more oil with regard to the recovery obtained using exclusively brine.

This demonstrates the technological advantage of using the supramolecular complexes object of the present invention and whose structural formula is shown (36) as wettability modifiers under conditions of environmental pressure, temperature range of 80 to 100° C., brines with ultra-high salinity and high levels of hardness, oil and carbonate-type rock (limestone) cores.

d) Determination of Recovery Factor in a High Temperature Glass-Lined Reactor.

The equipment comprises a glass-lined reactor where a nucleus, previously soaked with oil, is introduced and gets in contact with an aqueous medium with chemical product. The experimental conditions are the following:

Pressure of the experiment: 140 psi
Temperature of the experiment: 150° C.
Injection gas: Nitrogen
Procedure:
Elements Required for the Test:
Glass-lined reactor
Controlled temperature recycling device.
Limestone nuclei with known permeability and porosities.
Photographic camera.
Crude oil typical from carbonate reservoirs.
Brine typical from reservoirs with ultra-high salinities.
Supramolecular complex or chemical product to be assessed.
Analytical Balance.
Glass equipment for SOXHLET extraction.
Glass volumetric materials.
Convection oven.

Test Procedures:
1) Submit the carbonate rock (dolostone or limestone) or sandstone core originating from the reservoir for which the study is intended to hydrocarbon extraction processes with different organic solvents in a SOXHLET system. The extraction processes are carried out continuously, sequentially and by reflux, using as solvents: a) Xylene, b) Chloroform, c) Methanol, d) Xylene, e) Chloroform, f) Methanol and g) Xylene. The duration of each extraction stage is one day and the time of the entire process is 7 days.

2) Determine the absolute permeability of the core to helium, as well as their effective porosity.

3) Dry the core in a stove at a temperature of 100° C. and record the weight once a constant weight is reached.

4) Put the core in contact with dead oil originating from the reservoir of interest for 5 days at the temperature of interest and at a pressure of 140±5 lb, in an aging cell.

5) Strain the core saturated with dead oil at atmospheric temperature and pressure until no dropping is observed. The straining process lasts about 12 hours and a number 200 wire mesh is used for this purpose.

6) Weigh the core saturated with dead oil and, by weight difference, obtain the amount of oil adsorbed by the porous medium.

7) Prepare 500 mL of the aqueous solution (brine) to be assessed at the concentration of chemical product required in the test.

8) Place the core saturated with dead oil in the glass-lined reactor and carefully add 500 mL of the chemical product to be assessed at the required concentration.

9) Pressurize with nitrogen until 140 psi are reached.

10) Increase the temperature of the system to the desired temperature for the assessment of the performance of the chemical product or sample under study and maintain the same for the period of time at which the recovery factor is intended to be determined under the temperature and salinity conditions.

11) Quantify the amount of oil produced due to spontaneous water imbibition processes under the study conditions and determine the recovery factor according to the following equation:

$$Rf=(Ro\times100)/Oopm \quad \text{(Equation 10)}$$

where:

Rf=Recovery factor

Ro=Recovered oil

Oopm=Original oil adsorbed in the porous medium.

Figure 25:
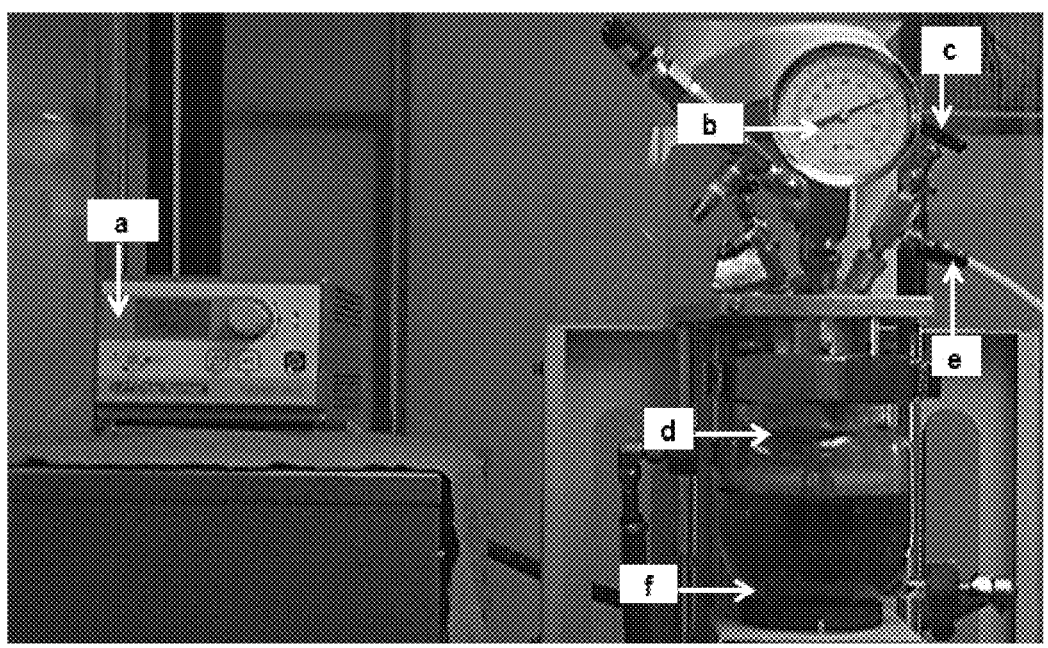
FIG. 25. Glass-lined reactor used for the imbibition process at high temperatures, where: a) Heating recycling device, b) Manometer, c) Security valve, d) Gas inlet, e) Glass container and f) Reactor base.

FIG. 25 shows the equipment used.

Example 36

The assessment of the recovery factor was carried out at a temperature of 150° C. and a pressure of 140 psi for supramolecular complex described in example 19 and whose structural formula is shown in (36) at a concentration of 0.2% by weight, using as test medium brine 4 and crude oil whose compositions are described in Examples 27 and 35, respectively, and a limestone nucleus whose characteristics are shown in Table 58.

TABLE 58

| Nucleus dimensions (cm) | Absolute permeability to helium (mD) | Nucleus porosity (%) |
| --- | --- | --- |
| 3.8 × 4.8 | Nucleus 1 | Nucleus 1 |

Table 59 shows the result of the recovery factor at a temperature of 150° C. and pressure of 140 psi for supramolecular complex described in Example 19.

TABLE 59

| PRODUCT | IMBIBED OIL (g) | RECOVERED OIL (g) | RECOVERY FACTOR (%) |
| --- | --- | --- | --- |
| BRINE 4 | 10.7448 | 1.2 | 11.2 |
| Supramolecular complex described in Example 19 | 10.2046 | 3.25 | 31.9 |

These results show that supramolecular complex described in Example 19 increased nearly three times the recovery factor with regard to the system that uses exclusively brine, under conditions of high temperature (150° C.).

Figure 26:
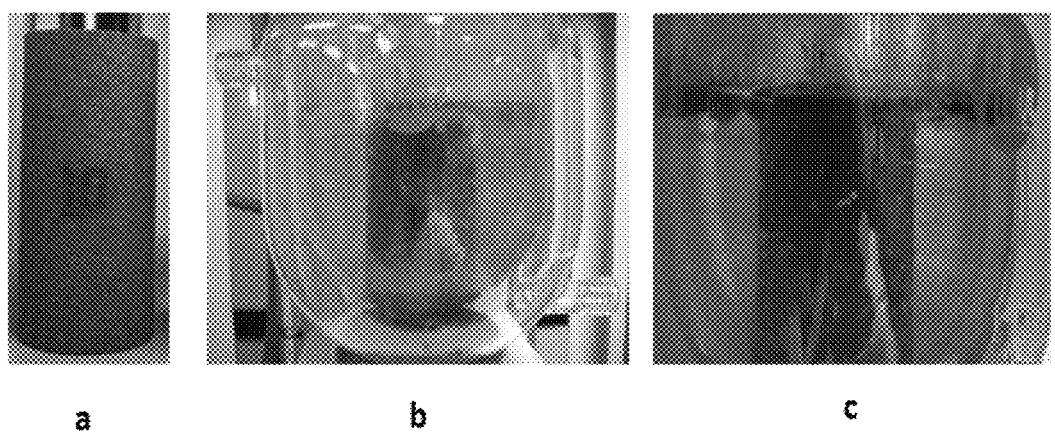
FIG. 26. Imbibition system at high temperature with supramolecular complex derived from example 19, where: a) Limestone core saturated with crude oil, b) Limestone core saturated with crude oil at the beginning of the test and c) Limestone core saturated with crude oil and oil recovery.
Figure 27:
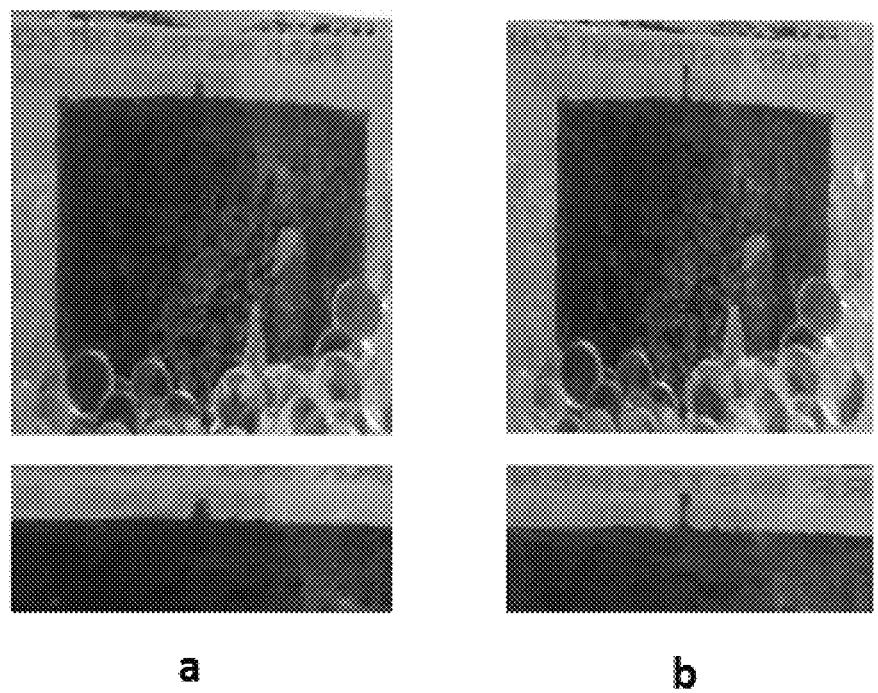
FIG. 27. Limestone core saturated with crude oil at high temperature with brine added supramolecular complex derived from example 19 where, A) Formation of the first drop of oil and b) Detachment of the first drop of oil at 150° C.

FIGS. 26 and 27 show the rock core used inside the reactor, as well as the detachment of oil due to the effect of the supramolecular complex, respectively.

Example 37

The assessment of the recovery factor was carried out at a temperature of 150° C. and pressure of 140 psi for supramolecular complex described in Example 19 and whose structural formula is shown in (36) at a concentration of 0.2% by weight, using as test medium brine 4 and crude oil whose compositions are described in Examples 27 and 35, respectively, and a limestone cores whose characteristics are shown in table 60, used to assess supramolecular complex from Example 19.

TABLE 60

| Nucleus dimensions (cm) | Absolute permeability to helium (mD) | Nucleus porosity (%) |
| --- | --- | --- |
| 8.5(diameter) × 10(length) | 100 | 20 |

Table 61 shows the recovery factor result at a temperature of 150° C. and a pressure of 140 psi for supramolecular complex described in Example 19.

TABLE 61

| PRODUCT | IMBIBED OIL (g) | RECOVERED OIL (g) | RECOVERY FACTOR (%) |
| --- | --- | --- | --- |
| BRINE 4 | 57.1 | 7.81 | 13.7 |
| Supramolecular complex described in Example 19 | 63.0 | 17.39 | 27.6 |

The above results show that supramolecular complex described in Example 19 increased more than two-fold the recovery factor with regard to the system that uses exclusively brine, under conditions of high temperature (150° C.).

Figure 28:
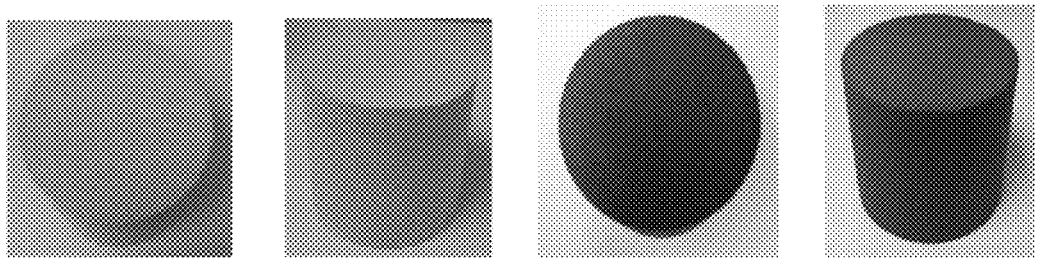
FIG. 28. Limestone cores, where: a) Limestone cores unsaturated of oil and b) Limestone cores saturated with crude oil.
Figure 29:
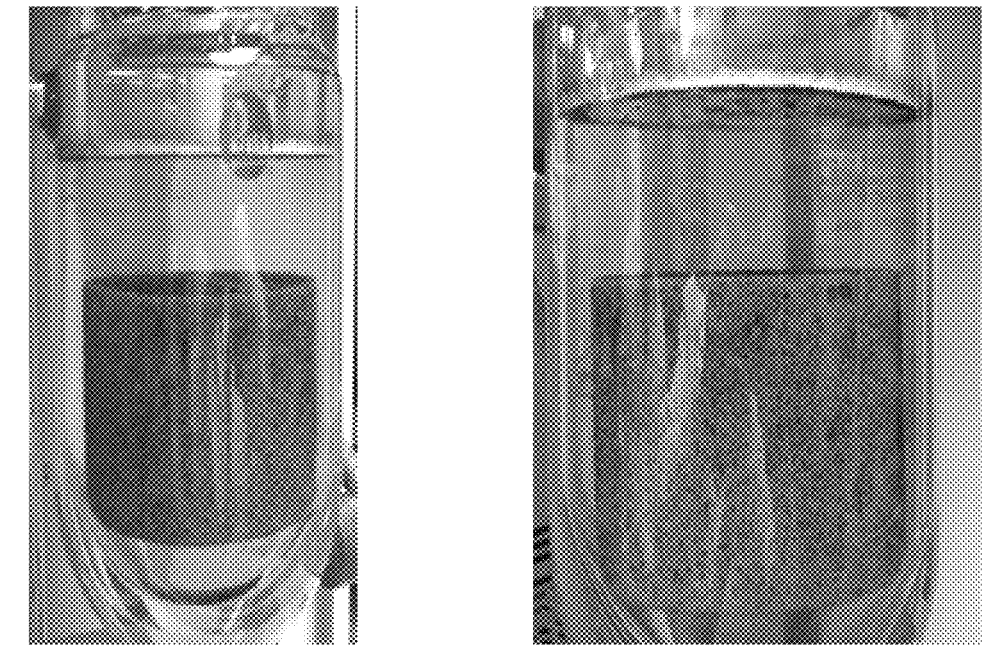
FIG. 29. Imbibition system at high temperature with images of cores with measures and saturated with crude oil with a brine with added supramolecular complex described in example 19, as well as a sequence of images of the recovery of oil in the imbibition system at high temperature for supramolecular complex described in example 19.
Figure 29:
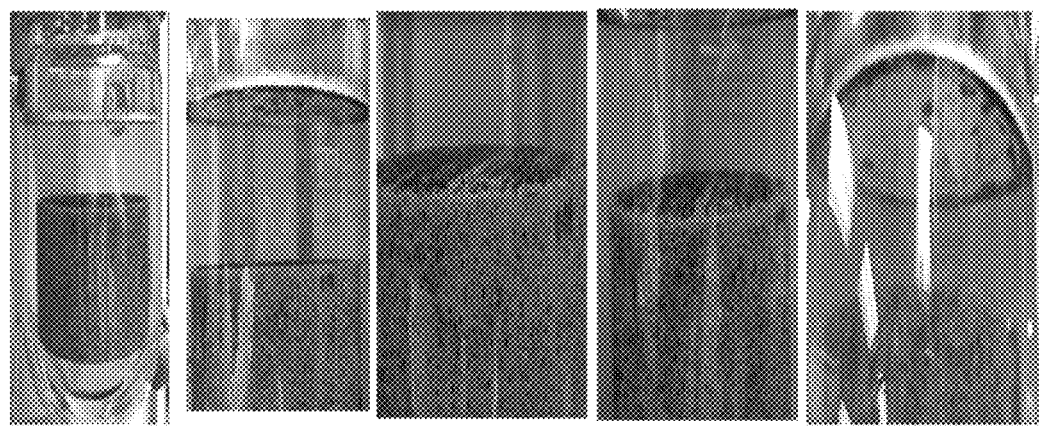

FIG. 28 shows the rock nucleus used inside the reactor and FIG. 29 shows the detachment of crude oil due to the effect of supramolecular complex described in Example 19.

This demonstrates the technological advantage of using the supramolecular complexes object of the present invention and whose structural formula is shown in (36) as wettability modifiers under conditions of high pressure, high temperature (150° C.), brines with ultra-high salinities and high levels of hardness, as well as oils and carbonate rock cores of different characteristics.

On the other hand, in order to determine what would be the effect of adding corrosion inhibitors based on zwitterionic geminal liquids on the recovery factor of supramolecular complex described in example 19, formulation 3 described in Example 23 was then assessed, under the same conditions described in this example and a limestone nucleus whose characteristics are shown in Table 62, used to assess formulation 3.

TABLE 62

| Nucleus dimensions (cm) | Absolute permeability to helium (mD) | Nucleus porosity (%) |
| --- | --- | --- |
| 8.5(diameter) × 10(length) | 96 | 19.8 |

Table 63 shows the results of the recovery factor at a temperature of 150° C. and a pressure of 140 psi for formulation 3.

TABLE 63

| PRODUCT | IMBIBED OIL (g) | RECOVERED OIL (g) | RECOVERY FACTOR (%) |
| --- | --- | --- | --- |
| BRINE 4 | 57.1 | 7.81 | 13.7 |
| Formulation 3 | 52.4 | 15.85 | 30.3 |

The above results show that formulation 3 described in Example 23 increased almost 3% more the recovery factor obtained with supramolecular complex described in example 19, under conditions of high temperature (150° C.).

Determination of Adsorption on Carbonate-Type Mineral.

The methodology consists in the quantitative determination of adsorption my means of high performance liquid chromatography of a chemical product in contact with carbonate-type mineral.

Procedure:
a) The rock (limestone) is fragmented in 1 m²/g.
b) Small fragments of rock are washed sequentially and at reflux temperature of the following solvents: a) Hexane b) Toluene c) Chloroform and d) Methanol.
c) The rock fragments are dried in a stove at a temperature of 100° C. until a constant weight is reached.
d) A 5000 ppm solution of the chemical product is prepared in the desired brine making dilutions with the same solvent for concentrations of 4000, 3000, 2000, 1000, 500, 200 and 100 ppm.
e) 4 g of rock are weighed adding 20 mL of the different concentrations prepared of the chemical product.
f) The solution rock/chemical product is stirred for 12 h at room temperature.
g) Once the stirring time is over, the sample is filtered in a glass funnel with #2 filters, followed by 0.5 mm filters.
h) Afterwards, a 15 ml injection was carried out in the HPLC for each prepared concentration.

Example 38

The determination of adsorption of supramolecular complex described in Example 19 was carried out on limestone at a concentration of 0.2% by weight (2000 ppm) using brine 4, whose characteristics are presented in Example 27.

The adsorption result for supramolecular complex derived from example 19 for a concentration of 2000 ppm was 5.0 mg of supramolecular complex/g of rock.

Additionally, in order to determine the effect on corrosion when using supramolecular complexes whose structural formula is described in (36) in conjunction with ultra-high salinity brines, the determination of the inhibition efficiency was carried out according to the description below.

Determination of Apparent Viscosity at Different Temperatures and Atmospheric Pressure.

The tests for the determination of viscosity according to shear rate at 25 and 40° C. were performed in a rheometer using concentric cylinder geometry.

Test System:
An Anton Parr model Physica MCR 301 rheometer.
Concentric cylinders
Photographic camera.
Typical brine from reservoirs with high salinities.
Supramolecular or chemical product to be assessed.
Test Procedures
1.—Prepare 25 mL of the sample to be assessed at the required concentration of chemical product.
2.—Pour 7 mL in the concentric cylinders.
3.—Adjust the rheometer to the temperature desired for the assessment.
4.—Determine the apparent viscosity within the shear rates range from 1 to 20 s⁻¹.
5.—Save the results obtained for the determinations in the hard disk of the workstation assigned to the rheometer.

Under the described procedure, the determination of viscosity according to shear rate of supramolecular complex described in Example 19 was carried out at different temperatures.

Example 39

The determination of viscosities according to shear rate of the crude oil described in Example 32 with 2000 ppm of supramolecular complex described in Example 19 added was carried out at temperatures of 25 and 40° C. and at atmospheric pressure. Table 64 shows the viscosity and shear rate results at two different temperatures.

TABLE 64

| | Viscosity (cps) at 25° C. | | Viscosity (cps) at 40° C. | |
|---|---|---|---|---|
| Shear rate (1/s) | Non-additivated oil | Oil with Example 19 supramolecular complex added | Non-additivated oil | Oil with Example 19 supramolecular complex added |
| 1.00 | 1236.24 | 330.77 | 979.24 | 316.40 |
| 2.16 | 1229.75 | 329.19 | 981.98 | 316.30 |
| 3.33 | 1222.97 | 325.74 | 982.08 | 313.64 |
| 4.10 | 1218.17 | 324.55 | 982.24 | 312.95 |
| 5.27 | 1211.14 | 323.61 | 980.11 | 312.35 |
| 6.04 | 1207.13 | 323.07 | 980.50 | 312.19 |
| 7.20 | 1200.16 | 322.15 | 979.45 | 311.57 |
| 8.37 | 1193.50 | 321.66 | 978.66 | 311.47 |
| 9.14 | 1190.68 | 320.87 | 978.10 | 310.79 |
| 10.30 | 1184.91 | 320.33 | 978.30 | 310.66 |
| 11.10 | 1181.67 | 319.88 | 977.45 | 310.57 |
| 12.20 | 1177.29 | 319.30 | 976.82 | 310.24 |
| 13.00 | 1174.79 | 318.96 | 976.16 | 309.89 |
| 15.00 | 1167.09 | 318.32 | 975.21 | 309.54 |
| 16.10 | 1162.79 | 317.96 | 974.38 | 309.44 |
| 17.30 | 1157.69 | 317.72 | 974.31 | 309.45 |
| 18.10 | 1155.14 | 317.14 | 973.82 | 309.23 |
| 19.20 | 1152.72 | 317.05 | 972.62 | 308.86 |
| 20.00 | 1150.36 | 316.79 | 972.24 | 308.75 |

The above results show that Example 19 supramolecular complex reduces the viscosity of crude oil by approximately 20 and 4% at 25 and 40° C., respectively.

Figure 30:
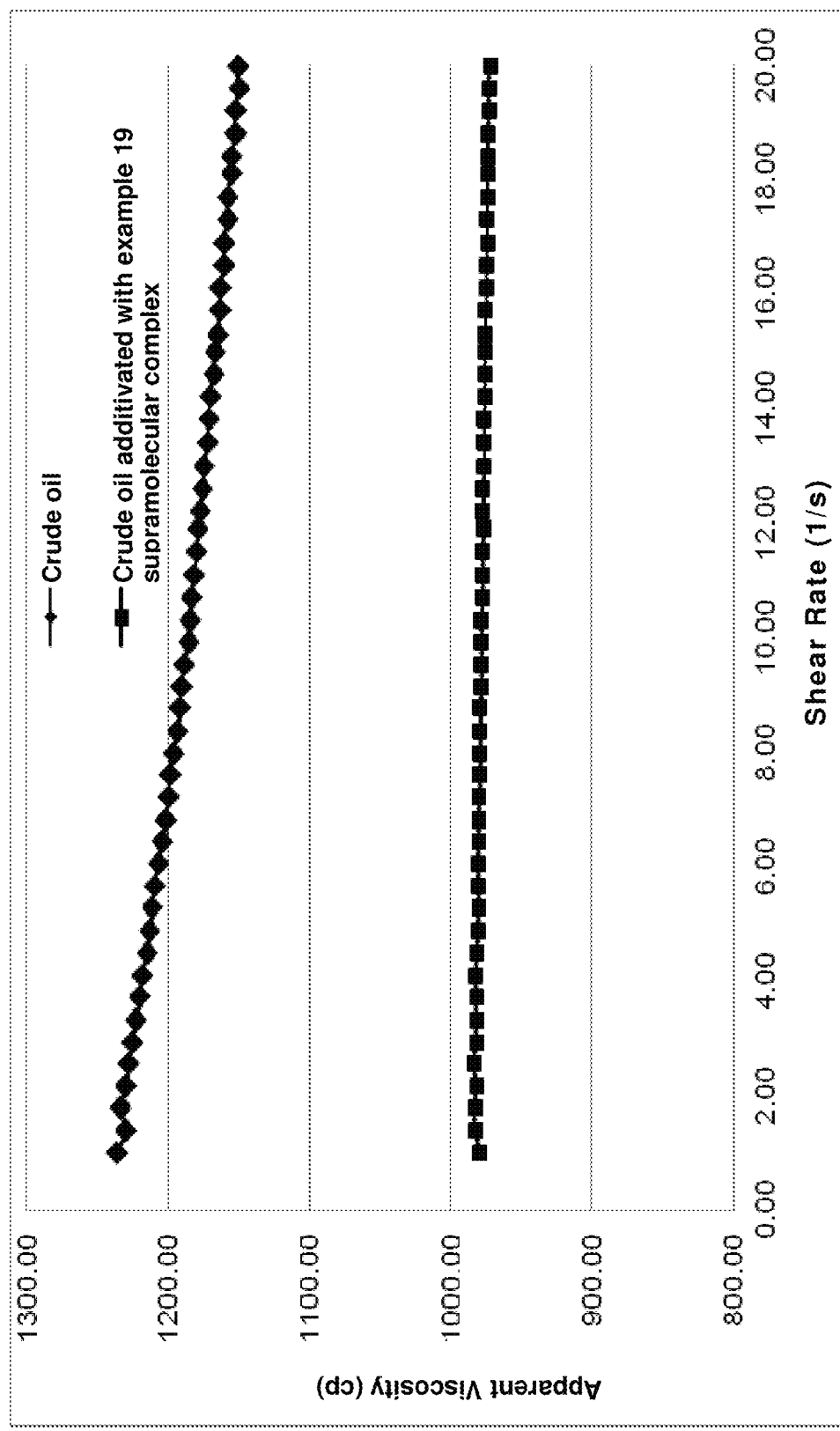
FIG. 30. Shear rate behavior versus viscosity graph for crude oil and crude oil with added supramolecular complex derived from example 19 at a temperature of 25° C.
Figure 31:
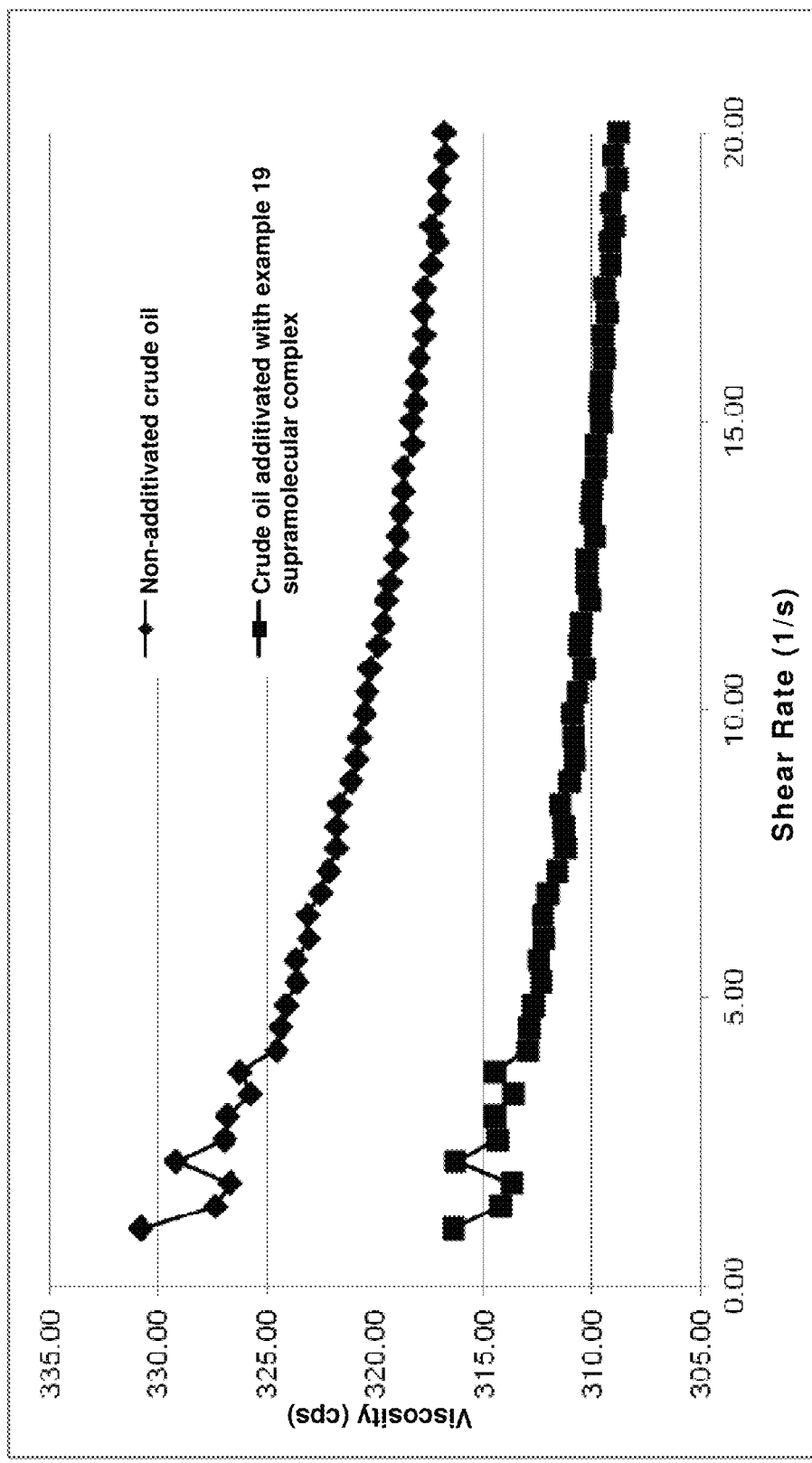
FIG. 31. Shear rate behavior-versus-viscosity graph for crude oil and crude oil with added supramolecular complex derived from example 19 at a temperature of 40° C.

FIGS. 30 and 31 show the shear rate versus viscosity graphs for non-additivated oil and for oil with example 19 supramolecular complex added at 25 and 40° C.

Determination of Corrosion Inhibition Efficiency.

It is a gravimetric test commonly known as Wheel Test, which simulates the corrosive medium characteristic of the production of oil; it is a dynamic procedure developed for fluids (oil, water and inhibitor).

Test Equipment and Reagents
a) Corrosion inhibitor dynamic evaluation system with temperature controller, stirring speed of 30 rpm and with capacity for 52 180 mL bottles.
b) 200 mL capacity bottles.
c) Carbon steel coupons SAE 1010, with 1"×0.5"×0.010" dimensions.
d) Glass equipment for the preparation of the corrosive media. This comprises a 2 L-capacity glass reactor supplied with a cooling bath, a mechanical stirrer, a gas sparger (for nitrogen and hydrogen sulfide), it has a blow-down valve attached to two charged traps (the first one with sodium hydroxide in lentils and the second with sodium hydroxide solution at 20%) connected in series in order for the hydrogen sulfide not to contaminate the environment.
e) Potentiometer for the measurement of pH.

Example 40

The assessment of the efficiency as corrosion inhibitor was carried out for supramolecular complex described in Example 19 at a concentration of 0.2% by weight (2000 ppm), using as test medium brine 4 and crude oil whose compositions are described in Examples 27 and 35, respectively.

The conditions of the test are shown in Table 65.

TABLE 65

| | |
|---|---|
| Temperature | 70° C. |
| Aqueous Medium | Brine with 600 +/− 50 ppm of $H_2S$ |
| Duration of the test | 46 hours |
| Organic medium | Crude oil |
| Brine/Organic medium ratio by weight | 90/10 |
| Volume of the test | 180 mL |
| Medium pH | 4.8 |
| Corrosion witness (metal coupons) | SAE 1010 Steel |

The compositions of the brine and the crude oil are described in Examples 27 and 35.

Generation of Results.

The weight difference of the coupons before and after having been exposed to the corrosive medium for 46 hours is a direct indication of the metal lost due to corrosion.

The efficiency as corrosion inhibitor is established by comparing the corrosion rates of the witness or blank with the rates of the witnesses with a determined concentration of inhibitor product as shown in the following formula:

$$\% \text{ of efficiency} = ((Ro-R)/Ro) \times 100 \quad \text{(Equation 11)}$$

Where:
Ro=Corrosion rate of the witness coupon (Reference).
R=Corrosion rate of the coupon with corrosion inhibitor.

Table 66 shows the results for supramolecular complex 37 and formulation 40, at a concentration of 2000 ppm.

Figure 32:
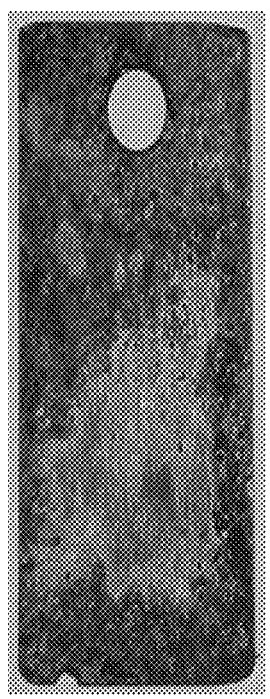
FIG. 32. Appearance of metal coupons used in the dynamic wheel test, where: 1) Reference, 2) Supramolecular complex described in example 19 and 3) Formulation 3 described in example 23.
Figure 32:
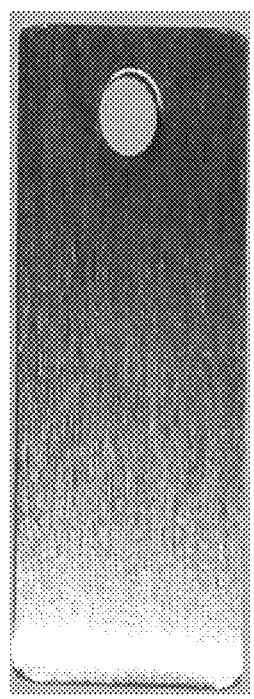
Figure 32:
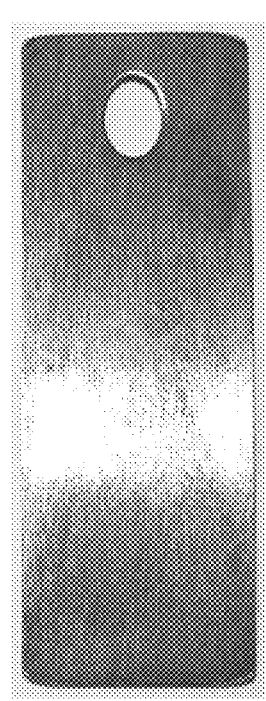

FIG. 32 shows the metal coupons used in the test.

TABLE 66

| Product | Corrosion rate (mpy) | Efficiency (%) |
|---|---|---|
| Reference | 35.0 | — |
| Supramolecular complex described in Example 19 | 4.3 | 87.7 |

*mpy: milli-inches per year

The results show that the supramolecular complex described in Example 19 of the present invention has anti-corrosive properties in acidic environments and with high salinity, characteristic of crude oil production pipelines.

On the other hand, in order to determine what would be the effect of adding corrosion inhibitors based on zwitterionic geminal liquids on the recovery factor of supramolecular complex described in Example 19, formulation 3 described in Example 23 was then assessed under the same conditions described in this example.

Table 67 shows the results of corrosion inhibition efficiency for formulation 3.

TABLE 67

| Product | Corrosion rate (mpy) | Efficiency (%) |
|---|---|---|
| Reference | 35.0 | — |
| Formulation 3 | 3.2 | 91.0 |

*mpy: milli-inches per year

The above results show that formulation 3 described in Example 23 increased by 3.3% the efficiency as corrosion inhibitor of supramolecular complex described in Example 19 in acidic and high-salinity environments, characteristic of crude oil production pipelines.

This demonstrates the technological advantage of using the supramolecular complexes object of the present invention and whose structural formula is shown in (36), because they exhibit anti-corrosive properties when supplied in ultra-high salinity brines and in acidic environments that are characteristic of crude oil production pipelines.

Determination of Acute Toxicity.

The determination of acute toxicity was carried out using two methods widely used throughout the world to measure the level of a pure substance or mixtures: I) Determination of acute toxicity by means of the Microtox® method and II) Assessment of acute toxicity with *Daphnia Magna*.

I) Determination of acute toxicity by means of the Microtox® method

The Microtox® bacterial bio-assay, designed by Strategic Diagnostic Inc. (Azur Environmental) is based on monitoring changes in the emissions of natural light by a luminescent bacteria, *Vibrio fischeri* (*Photobacterium phosphoreum*).

The Microtox assay measures the acute toxicity of the test substance present in aqueous solution that uses a suspension of approximately one million of luminescent bacteria (*Photobacterium Phosphoreum*) as test organism. The suspension of micro-organisms is added to a series of tubes of dilutions at controlled temperature with different concentrations of the test substance, to subsequently read, in a photometric device, the intensity of light emitted by each dilution, considering a reference blank where the test substance is not present.

With the obtained data, a dose-response graph can be drawn, by means of which the $CE_{50}$ value is calculated. The $CE_{50}$ is a measure of the decrease in the light emitted by the bioluminescent bacteria by means of the analyzing equipment, and specifically represents the concentration at which a 50 percent decrease of the light was obtained, with regard to a reference blank. Concretely, the $CE_{50}$ value indicates the relative toxicity of the test substance.

Example 41

The determination of acute toxicity was carried out with *Vibrio fischeri* (*Photobacterium phosphoreum*) for supramolecular complex derived from example 19 using the test procedure established and described in the NMX-AA-112-1995-SCF1 Mexican standard, used for the assessment of toxicity of natural and residual waters, as well as pure or combined substances, by means of the bio-luminescent bacteria photobacterium phosphoreum.

Table 68 shows the average toxicity results of a total of three repetitions.

The toxicity results shown in table 68 indicate that supramolecular complex derived from example 19 is slightly toxic to luminescent bacteria photobacterium phosphoreum.

II) Assessment of acute toxicity with *Daphnia Magna*.

This method is applicable to acute toxicity assessment in water and water-soluble substances. In fresh water bodies, industrial and municipal wastewater, agricultural runoff and pure or combined substances or lixiviates and the solubilizable fraction in soils and sediments.

Within the cladocera group, the *Daphnia* gender species are the most widely used as bio-indicators in toxicity tests, due to their wide geographic distribution, the important role they play within the zooplankton community, and because they are easy to culture in laboratory and they are responsive to a wide range of toxics.

The determination of acute toxicity was carried out by means of the Mexican NMX-AA-087-SCFI-2010 standard, which establishes the method for measuring acute toxicity, using the freshwater organism *Daphnia magna* (Crustacea—Cladocera).

TABLE 68

| Chemical product | $CE_{50}$ 5 min. (ppm) | *Toxicity Category | $CE_{50}$ 15 min. (ppm) | *Toxicity Category |
|---|---|---|---|---|
| Supramolecular complex derived from Example 19 | 53.1 | Slightly toxic | 37.9 | Slightly toxic |
|  | 49.3 | Slightly toxic | 38.1 | Slightly toxic |
| Average | 51.2 | Slightly toxic | 38.0 | Slightly toxic |

*Concentration range in ppm, classification[a], category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000, non-toxic.
[a]CNS (UK) toxicity category for the application of chemical products used in hydrocarbon production in the North Sea.

Example 42

The determination of acute toxicity was carried out with *Daphnia magna* for supramolecular complex derived from example 19, using the testing procedure established and described in the NMX-AA-087-2010 standard.

Table 69 shows the average toxicity results of a total of three repetitions, out of which a standard deviation of 0.15 and a variation coefficient of 1.92% were obtained.

TABLE 69

| Chemical product | $CE_{50}$ (ppm) | *Toxicity category |
|---|---|---|
| Supramolecular complex derived from example 19 | 8.18 | Moderately toxic |
|  | 8.10 | Moderately toxic |
|  | 7.82 | Moderately toxic |
| Average | 8.03 | Moderately toxic |

*Concentration range in ppm, classification[a], category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000, non-toxic.
[a]CNS (UK) toxicity category for the application of chemical products used in hydrocarbon production in the North Sea.

The acute toxicity results indicate that supramolecular complex derived from Example 19 is moderately toxic to the freshwater organism *daphnia magna*.

What is claimed is:

1. A foaming composition with wettability-modifying and corrosion inhibitory properties at high temperature and ultra-high salinity conditions, comprising a supramolecular complex as active component resulting from the interaction of alkyl amido propyl hydroxysultaines or alkyl hydroxysultaines with sodium alkyl hydroxysulfonates and sodium alkenyl sulfonates.

2. A foaming composition with wettability-modifying and corrosion inhibitory properties for high temperature and ultra-high salinity, according to claim 1, wherein the active component supramolecular complex has the following structural formula:

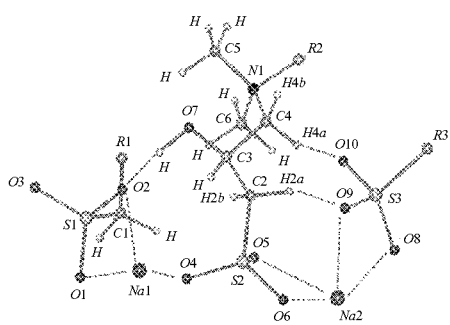

wherein R1, R2 and R3 are alkyl, alkenyl linear or branched chains and whose length ranges from 1 to 30 carbon atoms.

3. A foaming composition with wettability-modifying and corrosion inhibitory properties according to claim 2, wherein the sodium alkenyl sulfonates is selected from the group consisting of sodium but-2-en-1-sulfonate, sodium pent-2-en-1-sulfonate, sodium hex-2-en-1-sulfonate, sodium hept-2-en-1-sulfonate, sodium oct-2-en-1-sulfonate, sodium non-2-en-1-sulfonate, sodium dec-2-en-1-sulfonate, sodium undec-2-en-1-sulfonate, sodium dodec-2-en-1-sulfonate, sodium tetradec-2-en-1-sulfonate, sodium hexadec-2-en-1-sulfonate, sodium octadec-2-en-1-sulfonate, sodium eicos-2-en-1-sulfonate, sodium docos-2-en-1-sulfonate, sodium tetracos-2-en-1-sulfonate, sodium hexacos-2-en-1-sulfonate, sodium octacos-2-en-1-sulfonate and the mixtures thereof.

4. A foaming composition with wettability-modifying and corrosion inhibitory properties according to claim 2, wherein the sodium alkyl hydroxysulfonates is selected from the group consisting of sodium 3-hydroxybutane-1-sulfonate, sodium 3-hydroxypentane-1-sulfonate, sodium 3-hydroxyhexane-1-sulfonate, sodium 3-hydroxyheptane-1-sulfonate, sodium 3-hydroxyoctane-1-sulfonate, sodium 3-hydroxynonane-1-sulfonate, sodium 3-hydroxydecane-1-sulfonate, sodium 3-hydroxyundecane-1-sulfonate, sodium 3-hydroxydodecane-1-sulfonate, sodium 3-hydroxytetradecane-1-sulfonate, sodium 3-hydroxyhexadecane-1-sulfonate, sodium 2-hydroxybutane-1-sulfonate, sodium 2-hydroxypentane-1-sulfonate, sodium 2-hydroxyhexane-1-sulfonate, sodium 2-hydroxyheptane-1-sulfonate, sodium 2-hydroxyoctane-1-sulfonate, sodium 2-hydroxynonane-1-sulfonate, sodium 2-hydroxydecane-1-sulfonate, sodium 2-hydroxyundecane-1-sulfonate, sodium 2-hydroxydodecane-1-sulfonate, sodium 2-hydroxytetradecane-1-sulfonate, sodium 2-hydroxyhexadecane-1-sulfonate, sodium 2-hydroxyoctadecane-1-sulfonate, sodium 2-hydroxyeicosane-1-sulfonate, sodium 2-hydroxydocosane-1-sulfonate, sodium 2-hydroxytetracosane-1-sulfonate, sodium 2-hydroxyhexacosane-1-sulfonate, sodium 2-hydroxyoctacosane-1-sulfonate and the mixtures thereof.

5. A foaming composition with wettability-modifying and corrosion inhibitory properties according to claim 2, wherein the alkyl amido propyl hydroxysultaine is selected from the group consisting of ethyl-amido-propyl-hydroxysultaine, propyl-amido-propyl-hydroxysultaine, butyl-amido-propyl-hydroxysultaine, pentyl-amido-propyl-hydroxysultaine, hexyl-amido-propyl-hydroxysultaine, heptyl-amido-propyl-hydroxysultaine, octyl-amido-propyl-hydroxysultaine, nonyl-amido-propyl-hydroxysultaine, decyl-amido-propyl-hydroxysultaine, undecyl-amido-propyl-hydroxysultaine, dodecyl-amido-propyl-hydroxysultaine, tetradecyl-amido-propyl-hydroxysultaine, hexadecyl-amido-propyl-hydroxysultaine, octadecyl-amido-propyl-hydroxysultaine, coco-amido-propyl hydroxysultaine, eucosyl-amido-propyl hydroxysultaine, docosyl-amido-propyl hydroxysultaine, tetracosyl-amido-propyl hydroxysultaine, hexacosyl-amido-propyl hydroxysultaine, octacosyl-amido-propyl hydroxysultaine and mixtures thereof.

6. A foaming composition with wettability-modifying and corrosion inhibitory properties according to claim 2, wherein the alkyl hydroxysultaine is selected from the group consisting of ethyl-hydroxysultaine, propyl-hydroxysultaine, butyl-hydroxysultaine, pentyl-hydroxysultaine, hexyl-hydroxysultaine, heptyl-hydroxysultaine, octyl-hydroxysultaine, nonyl-hydroxysultaine, decyl-hydroxysultaine, undecyl-hydroxysultaine, dodecyl-hydroxysultaine, tetradecyl-hydroxysultaine, hexadecyl-hydroxysultaine, coco-hydroxysultaine, octadecyl-hydroxysultaine, eucosyl-hydroxysultaine, docosyl-hydroxysultaine, tetracosyl-hydroxysultaine, hexacosyl-hydroxysultaine, octacosyl-hydroxysultaine and mixtures thereof.

7. A foaming composition with wettability-modifying and corrosion inhibitory properties according to claim 2, wherein the active component is obtained from a mixture of sodium alkyl hydroxysulfonates, sodium alkenyl sulfonates with alkyl amido propyl hydroxysultaines or alkyl hydroxysultaines.

8. A foaming composition with wettability-modifying and corrosion inhibitory properties according to claim 2, wherein the active component comprises a weight ratio of sodium alkyl hydroxysulfonates, sodium alkenyl sulfonates with alkyl amido propyl hydroxysultaines or alkyl hydroxysultaines within the range of 1:1:7 to 7:7:1.

9. A foaming composition with wettability-modifying and corrosion inhibitory properties according to claim 2, wherein the sodium alkenyl sulfonate is sodium dodec-2-en-1-sulfonate.

10. A foaming composition with wettability-modifying and corrosion inhibitory properties according to claim 2, wherein the sodium alkyl hydroxysulfonate is sodium 3-hydroxy-dodecyl-sulfonate.

11. A foaming composition with wettability-modifying and corrosion inhibitory properties according to claim 2, wherein the alkyl amido hydroxysultaine is coco amido propyl hydroxysultaine.

12. A foaming composition with wettability-modifying and corrosion inhibitory properties according to claim 2, wherein the alkyl hydroxysultaine is of the dodecyl hydroxysultaine.

13. A foaming composition with wettability-modifying and corrosion inhibitory properties according to claim 2, further comprising an aqueous solvent, alcohol or mixtures of aqueous solvents and alcohols.

14. A foaming composition with wettability-modifying and corrosion inhibitory properties according to claim 13, wherein the aqueous solvents is selected from the group consisting of fresh water, seawater, formation water and mixtures thereof.

15. A foaming composition with wettability-modifying and corrosion inhibitory properties according to claim 13, wherein the alcohol is selected from the group consisting of methanol, ethanol and isopropanol and mixtures thereof.

16. A foaming composition with wettability-modifying and corrosion inhibitory properties according to claim 13, wherein the percentage by weight of the supramolecular complexes in the aqueous solvent, alcohol or mixture thereof is in the range of 0.1 to 50.0% by weight.

17. A foaming composition with wettability-modifying and corrosion inhibitory and properties according to claim 2, further comprising a foam stabilizers.

18. A foaming composition with wettability-modifying and corrosion inhibitory properties according to claim 17 wherein the foam stabilizers is selected from the group consisting of itaconic acid- and sodium vinyl sulfonate-derived copolymers having an average molecular weight range of 200 to 20,000 Daltons.

19. A foaming composition with wettability-modifying and corrosion inhibitory properties according to claim 18 wherein the foam stabilizer is present in an amount of 0.5 to 10% by weight based on the weight of the supramolecular complex.

20. A foaming composition with wettability-modifying and corrosion inhibitory properties according to claim 2, further comprising a zwitterionic geminal liquids selected from the group consisting of bis-N-alkylpolyether or bis-N-alkenylpolyether, bis-N-arylpolyether bis-beta amino acids and the salts thereof.

21. A foaming composition according to claim 20, wherein the zwitterionic geminal liquid is present in an amount of 0.5 to 10% by weight based on the weight of the supramolecular complex.

22. A method of preparing a foam, comprising the step of foaming the foaming compositions with wettability-modifying and corrosion inhibitory properties according to claim 2 to a generate stable foam to modify wettability and inhibit corrosion at high temperature, high pressure, ultra-high salinity and high concentration of divalent ions in an oil well or reservoir.

23. A method of enhancing the recovery of crude oil from a well or reservoir comprising the step of injecting the foam of claim 22 into a carbonate or sandy-clayey well or reservoir.

24. The method of claim 23, wherein said foaming composition is injected in an amount to prevent and control generalized and pitting corrosion of ferrous metals in a crude oil production wells or reservoir.

25. The use of foaming compositions with wettability-modifying and corrosion inhibitory properties according to claim 23, wherein the temperature is up to 200° C.

26. The method of claim 23, wherein the pressure in the well or reservoir is up to 5500 psi.

27. The method of claim 23, wherein said well has a salt concentration of up to 400,000 ppm as sodium chloride.

28. The method of claim 23, wherein said well has a concentration of divalent ions of up to 250,000 ppm.

29. The method of claim 23, wherein said use of foaming compositions is injected into said well or reservoir at a concentration of 25-40,000 ppm based on the amount of the crude oil.

30. The method of claim 23, wherein said foaming composition is injected into said well at a concentration of from 500 to 10,000 ppm.

31. The method of claim 23, further comprising the step of generating a foam and injecting a gas as displacement fluid into said well or reservoir.

32. An enhanced recovery and/or production assurance process according to claim 31, comprising injecting the foam through an injection well and recovering the oil from a producing well.

33. The method of claim 31, wherein the method is performed through the same well that acts as injection and producing well.

34. A foaming composition comprising the foaming composition with wettability-modifying and corrosion inhibitory properties according to claim 1, wherein a gas used to generate the foam is selected from the group consisting of nitrogen, oxygen, carbon dioxide, natural gas, methane, propane, butane and mixtures thereof.

35. A process for enhancing hydrocarbon and crude oil recovery from a well in a naturally fractured reservoir that simultaneously acts as injection and producing well, said process comprising the steps of a) placing foaming composition with wettability-modifying and corrosion inhibitory properties in a high-conductivity zones of said reservoir; b) shutting-down said producing well for a time period of 6 to 9 days, and c) opening the well and launching of production, wherein said foaming composition includes a supramolecular complex having the formula

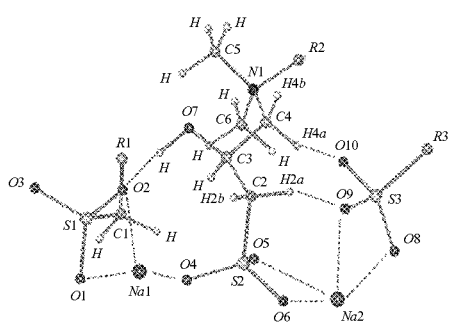

wherein R1, R2 and R3 are alkyl, alkenyl linear or branched chains having 1 to 30 carbon atoms, and wherein said supramolecular complex is obtained by the interaction of of alkyl amido propyl hydroxysultaines or alkyl hydroxysultaines with sodium alkyl hydroxysulfonates and sodium alkenyl sulfonates.

36. A process for enhancing hydrocarbon and crude oil recovery from a naturally fractured reservoir through an injection well and a producing well, the process comprising the steps of a) continuously supplying a foaming composition with wettability-modifying and corrosion inhibitory properties through the injection well; b) forcing displacement of the foaming composition with wettability-modifying and corrosion inhibitory properties through high-conductivity zones of the reservoir, and c) recovering crude oil and hydrocarbon through the producing well, wherein said foaming composition includes a supramolecular complex having the formula

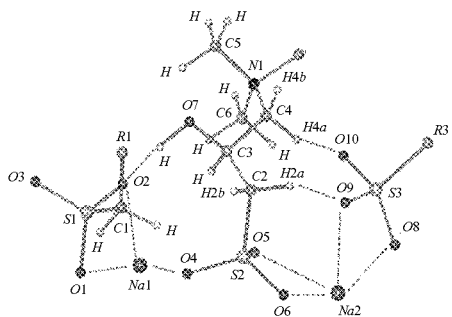

wherein R1, R2 and R3 are alkyl, alkenyl linear or branched chains having 1 to 30 carbon atoms, and wherein said supramolecular complex is obtained by the interaction of alkyl amido propyl hydroxysultaines or alkyl hydroxysultaines with sodium alkyl hydroxysulfonates and sodium alkenyl sulfonates.

* * * * *